United States Patent [19]
Kimura et al.

[11] Patent Number: 5,991,449
[45] Date of Patent: *Nov. 23, 1999

[54] METHOD AND APPARATUS FOR ENCODING AND DECODING AN IMAGE

[75] Inventors: Tomohiro Kimura; Ikuro Ueno; Taichi Yanagiya; Masayuki Yoshida; Fumitaka Ono; Naoto Tanabe, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,053

[22] Filed: Jul. 15, 1996

[30] Foreign Application Priority Data

Aug. 31, 1995 [JP] Japan .................................. 7-224092
Nov. 9, 1995 [JP] Japan .................................. 7-291329

[51] Int. Cl.$^6$ ..................................................... G06K 9/36
[52] U.S. Cl. .......................... 382/238; 382/234; 382/236; 358/430
[58] Field of Search ................................ 382/238, 247, 382/236, 234; 358/430

[56] References Cited

U.S. PATENT DOCUMENTS

| | | | |
|---|---|---|---|
| 5,157,743 | 10/1992 | Maeda et al. .............................. | 382/56 |
| 5,297,220 | 3/1994 | Nomizu ..................................... | 382/56 |
| 5,313,204 | 5/1994 | Semasa et al. ........................... | 341/107 |
| 5,524,067 | 6/1996 | Miyake et al. ........................... | 382/234 |

FOREIGN PATENT DOCUMENTS

| | | | |
|---|---|---|---|
| 0245621A2 | 11/1987 | European Pat. Off. ........ | H04N 1/417 |
| 0272505A2 | 6/1988 | European Pat. Off. ........ | H04N 7/137 |
| 0755155A2 | 1/1997 | European Pat. Off. ......... | H04N 7/34 |
| 0772364A2 | 5/1997 | European Pat. Off. ......... | H04N 7/26 |
| 9221199A1 | 11/1992 | WIPO .......................... | H04M 11/00 |

OTHER PUBLICATIONS

Compression of Black–White Images with Arithmetic Coding; IEEE Transactions on Communications, vol. Com–29, No. 6, Jun. 19, 1981—by Glen G. Langdon, Jr. and Jorma Rissanen; pp. 858–867.

"Parameter Reduction and Context Selection for Compression of Gray–Scale Images"; British Journal of Photography: IBM J. Res. Develop. vol. 29 No. 2 Mar. 1985; by Stephen Todd, Glen G. Langdon, Jr. and Jorma Rissanen; pp. 183–193.

*Primary Examiner*—Jose L. Couso
*Assistant Examiner*—Anh Hong Do

[57] ABSTRACT

An image memory outputs a target encoding pixel and a plurality of reference pixels in the vicinity thereof. A boundary mode determining unit determines a maximum value and a minimum value of the reference pixels, determines an average value of the maximum value and the minimum value, compares the respective reference pixel values with the average value, detects a boundary in the target encoding pixel and the reference pixels based on comparison results, and detects a pixel distribution state of the reference pixels based on the detected boundary. An adaptive predictor calculates a prediction value by performing a calculation based on a function corresponding to the pixel distribution state and the reference pixels. A prediction difference calculating unit determines a difference value between the prediction value and a value of the target encoding pixel. A prediction coincidence determining unit compares the prediction value and the target encoding pixel value, and outputs a comparison result as a binary signal. A context generator generates a context based on the pixel distribution state and the difference value of the prediction difference calculating unit. An arithmetic encoder encodes the binary signal based on the context thus generated.

52 Claims, 49 Drawing Sheets

X : TARGET ENCODING PIXEL

A ~ G: REFERENCE PIXELS

| RM | MAXIMUM DIFFERENCE DR |
|----|------------------------|
| 0  | 0        |
| 1  | 1        |
| 2  | 2        |
| 3  | 3        |
| 4  | 4        |
| 5  | 5 ~ 6    |
| 6  | 7 ~ 8    |
| 7  | 9 ~ 12   |
| 8  | 13 ~ 16  |
| 9  | 17 ~ 24  |
| 10 | 25 ~ 32  |
| 11 | 33 ~ 48  |
| 12 | 49 ~ 64  |
| 13 | 65 ~ 96  |
| 14 | 97 ~ 128 |
| 15 | 129 ~ 255|

FIG. 19

| BI-LEVEL-TRANSFORMING FUNCTION $p = Q(P)$ | $a = Q(A) = 0$ | |
|---|---|---|
| | $A \leq Th$ | $A > Th$ |
| $P \leq Th$ | $p = 0$ | $p = 1$ |
| $P > Th$ | $p = 1$ | $p = 0$ |
| MULTI-LEVEL REFERENCE PIXEL VALUE BI-LEVEL PIXEL VALUE (AFTER TRANSFORMATION) | $P = A, B, C, D, E, F, G$ $p = a, b, c, d, e, f, g$ | |

FIG. 21

| BM | a | b | c | d | e | f | g |
|---|---|---|---|---|---|---|---|
| 0 | 0 | 0 | 0 | 0 | - | - | - |
| 1 | 0 | 0 | - | 1 | - | - | 1 |
| 2 | 0 | 0 | - | 1 | - | - | 0 |
| 3 | 0 | 1 | 0 | - | - | 1 | - |
| 4 | 0 | 1 | 0 | - | - | 0 | - |
| 5 | 0 | 1 | 1 | - | 0 | - | - |
| 6 | 0 | 1 | 1 | - | 1 | - | - |
| 7 | 0 | 0 | 1 | 0 | - | - | - |

FIG. 22

| BM\RM | 0 | 1 | 2 | 3 | 4 | 5 | 6 | 7 |
|---|---|---|---|---|---|---|---|---|
| 0 | A | - | - | - | - | - | - | - |
| 1 | $\frac{A+B}{2}$ | $\frac{A+B}{2}$ | $\frac{A+B}{2}$ | A | A | A | A | $\frac{A+B}{2}$ |
| 2 | $\frac{A+B}{2}$ | $\frac{A+B}{2}$ | $\frac{A+B}{2}$ | A | $\frac{A+B}{2}$ | A | A | $\frac{A+B}{2}$ |
| 3 | $\frac{A+B}{2}$ | $\frac{A+B}{2}$ | $\frac{A+B}{2}$ | A | $\frac{A+B}{2}$ | A | A | $\frac{A+B}{2}$ |
| 4 | $\frac{A+B}{2}$ | $\frac{A+B}{2}$ | $\frac{A+B}{2}$ | $\frac{A+B}{2}$ | $\frac{A+B}{2}$ | A | A | $\frac{A+B}{2}$ |
| 5 | $\frac{A+B}{2}$ | $\frac{A+B}{2}$ | $\frac{A+B}{2}$ | $\frac{A+B}{2}$ | $\frac{A}{2}+\frac{B+D}{4}$ | $\frac{A}{2}+\frac{B+D}{4}$ | A | $\frac{A+B}{2}$ |
| 6 | $\frac{A+B}{2}$ | $\frac{A+B}{2}$ | $\frac{A+B}{2}$ | $\frac{A+B}{2}$ | $\frac{A}{2}+\frac{B+D}{4}$ | $\frac{A}{2}+\frac{B+D}{4}$ | A | $\frac{A}{2}+\frac{B+D}{4}$ |
| 7 | $\frac{A+B}{2}$ | $\frac{A+B}{2}$ | $\frac{A+B}{2}$ | $\frac{A+B}{2}$ | $\frac{A}{2}+\frac{B+D}{4}$ | $\frac{A}{2}+\frac{B+D}{4}$ | A | $\frac{A}{2}+\frac{B+D}{4}$ |
| 8 | $\frac{A+B}{2}$ | $\frac{A+B}{2}$ | $\frac{A+B}{2}$ | $\frac{A+B}{2}$ | $\frac{A}{2}+\frac{B+D}{4}$ | $\frac{A}{2}+\frac{B+D}{4}$ | A | $\frac{A}{2}+\frac{B+D}{4}$ |
| 9 | $\frac{A+B}{2}$ | $\frac{A+B}{2}$ | $\frac{A+B}{2}$ | $\frac{A+B}{2}$ | $\frac{A}{2}+\frac{B+D}{4}$ | $\frac{A}{2}+\frac{B+D}{4}$ | A | $\frac{A}{2}+\frac{B+D}{4}$ |
| 10 | $\frac{A+B}{2}$ | $\frac{A+B}{2}$ | $\frac{A}{2}+\frac{B+D}{4}$ | $\frac{A+B}{2}$ | $\frac{A}{2}+\frac{B+D}{4}$ | $\frac{A}{2}+\frac{B+D}{4}$ | A | $\frac{A}{2}+\frac{B+D}{4}$ |
| 11 | $\frac{A+B}{2}$ | $\frac{A+B}{2}$ | $\frac{A}{2}+\frac{B+D}{4}$ | $\frac{A+B}{2}$ | B | $\frac{A}{2}+\frac{B+D}{4}$ | A | $\frac{A}{2}+\frac{B+D}{4}$ |
| 12 | $\frac{A+B}{2}$ | $\frac{A+B}{2}$ | $\frac{A}{2}+\frac{B+D}{4}$ | $\frac{A+B}{2}$ | B | $\frac{A+B}{2}$ | A | $\frac{A}{2}+\frac{B+D}{4}$ |
| 13 | $\frac{A+B}{2}$ | $\frac{A+B}{2}$ | $\frac{A}{2}+\frac{B+D}{4}$ | $\frac{A+B}{2}$ | B | $\frac{A+B}{2}$ | A | $\frac{A}{2}+\frac{B+D}{4}$ |
| 14 | $\frac{A+B}{2}$ | $\frac{A+B}{2}$ | $\frac{A}{2}+\frac{B+D}{4}$ | $\frac{A+B}{2}$ | B | $\frac{A+B}{2}$ | A | $\frac{A}{2}+\frac{B+D}{4}$ |
| 15 | $\frac{A+B}{2}$ | $\frac{A+B}{2}$ | $\frac{A}{2}+\frac{B+D}{4}$ | $\frac{A+B}{2}$ | B | $\frac{A+B}{2}$ | A | $\frac{A}{2}+\frac{B+D}{4}$ |

FIG. 23
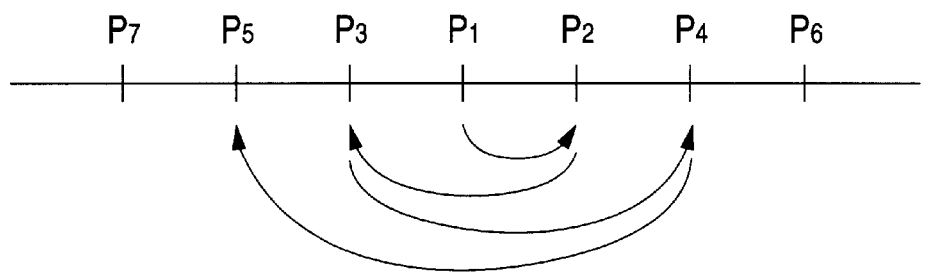
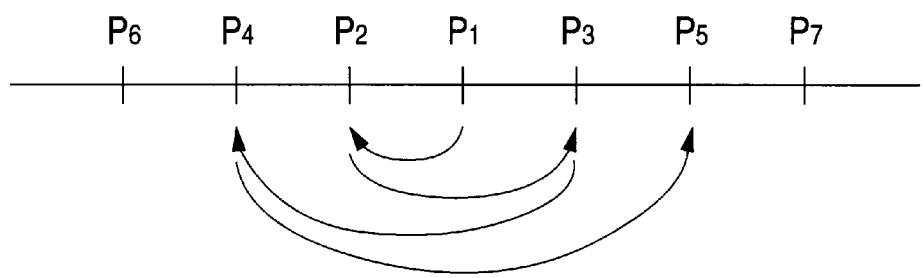
| PREDICTION RANK | 0 | 1 | 2 | 3 | 4 | ... |
|---|---|---|---|---|---|---|
| $A \leq Th$ | $P_1$ | $P_1 + 1$ | $P_1 - 1$ | $P_1 + 2$ | $P_1 - 2$ | ... |
| $A > Th$ | $P_1$ | $P_1 - 1$ | $P_1 + 1$ | $P_1 - 2$ | $P_1 + 2$ | ... |
$P_1$ : 1ST PREDICTION VALUE

FIG. 40

```
-5  -4  -3  -2  -1   0  +1  +2  +3  +4  +5
 |   |   |   |   |   |   |   |   |   |   |
    LARGE       |      SMALL      |     LARGE
```

FIG. 41

|     |       | Db SMALL | Db LARGE |
|-----|-------|----------|----------|
| Da  | SMALL | 0        | 1        |
|     | LARGE | 2        | 3        |

Da : PREDICTION DIFFERENCE VALUE OF REFERENCE PIXEL A
Db : PREDICTION DIFFERENCE VALUE OF REFERENCE PIXEL B

|    |          | Db NEGATIVE | Db SMALL | Db POSITIVE |
|----|----------|-------------|----------|-------------|
|    | NEGATIVE | 3           | 1        | 3           |
| Da | SMALL    | 1           | 0        | 2           |
|    | POSITIVE | 3           | 2        | 3           |

Da : PREDICTION DIFFERENCE VALUE
OF REFERENCE PIXEL A
Db : PREDICTION DIFFERENCE VALUE
OF REFERENCE PIXEL B

FIG. 47

| RANK | RK (RANK) |
|------|-----------|
| 0    | 0         |
| 1    | 1         |
| 2    | 2         |
| 3    | 3         |
| 4    | 4         |
| 5    | 5         |
| 6    | 6         |
| 7    | 7         |
| 8    | 6         |
| 9    | 7         |
| 10   | 6         |
| ⋮    | ⋮         |
| 253  | 7         |
| 254  | 6         |
| 255  | 7         |

X : TARGET PIXEL
A ~ B : REFERENCE PIXELS

- P = A
- P = B
- P = C
- P = A + B - C
- P = A + (B - C) / 2
- P = B + (A - C) / 2
- P = (A + B) / 2

| GROUP NO. | Sz | NUMBER OF ADDITIONAL BITS |
|---|---|---|
| 0 | 0 | 0 |
| 1 | 1 | 0 |
| 2 | 2, 3 | 1 |
| 3 | 4 ~ 7 | 2 |
| 4 | 8 ~ 15 | 3 |
| 5 | 16 ~ 31 | 4 |
| 6 | 32 ~ 63 | 5 |
| 7 | 64 ~ 127 | 6 |
| 8 | 128 ~ 255 | 7 |
| 9 | 256 ~ 511 | 8 |
| 10 | 512 ~ 1023 | 9 |
| 11 | 1024 ~ 2047 | 10 |
| 12 | 2048 ~ 4095 | 11 |
| 13 | 4096 ~ 8191 | 12 |
| 14 | 8192 ~ 16383 | 13 |
| 15 | 16384 ~ 32676 | 14 |

FIG. 52
PRIOR ART

| BINARY SYMBOL | CONTEXT | NUMBER OF KINDS OF CONTEXT |
|---|---|---|
| V = 0 OR V ≠ 0 | COMBINATION OF CLASSIFICATION ITEMS OF PREDICTION ERRORS OF PIXELS A AND B (5 KINDS OF -LARGE, -SMALL, 0, +SMALL, AND +LARGE; SEE FIG. 53). | 25 (= 5 x 5) |
| SIGN OF V | COMBINATION OF CLASSIFICATION ITEMS OF PREDICTION ERRORS OF PIXELS A AND B (5 KINDS OF -LARGE, -SMALL, 0, +SMALL, AND +LARGE; SEE FIG. 53). | 25 (= 5 x 5) |
| GROUP 0 | COMBINATION OF CLASSIFICATION ITEMS OF PREDICTION ERRORS OF PIXELS A AND B (25 KINDS) AND SIGN OF V. | 50 (= 5 x 5 x 2) |
| GROUP 1 - 15 | IN EACH GROUP, WHETHER PREDICTION ERROR OF PIXEL A IS LARGE (±LARGE) OR SMALL (±SMALL, 0). | 30 (= 15 x 2) |
| ADDITIONAL BITS | IN EACH GROUP, WHETHER PREDICTION ERROR OF PIXEL A IS LARGE (±LARGE) OR SMALL (±SMALL, 0). (ADDITIONAL BITS OF THE SAME GROUP ARE GIVEN THE SAME CONTEXT.) | 28 (= 14 x 2) |
| | TOTAL | 158 |

FIG. 53
PRIOR ART

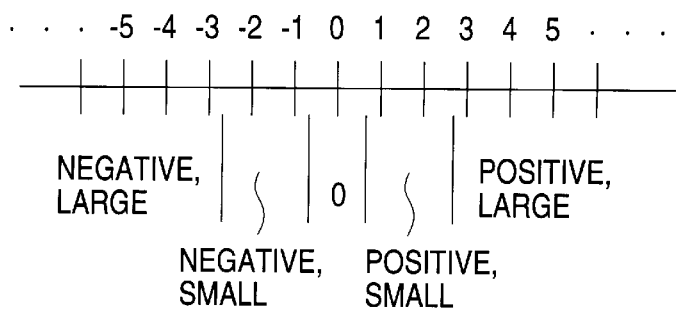

METHOD AND APPARATUS FOR ENCODING AND DECODING AN IMAGE

BACKGROUND OF THE INVENTION

1. Field of the Invention

The present invention relates to a method and apparatus for encoding and decoding an image.

2. Description of the Related Art

A description will be given of a conventional encoding and decoding scheme, more specifically, a generally known technique of lossless coding of a multi-level image.

As a conventional technique of lossless coding of a multi-level image, an international standard of "Independent Function" set forth in ITU-T recommendation T.81 (JPEG) is known. This is a differential pulse code modulation (DPCM) coding scheme for entropy coding a prediction error signal of a pixel subject to encoding, in which the entropy coding scheme may be selected between Huffman encoding or arithmetic encoding (QM-Coder). Here, a description will be given of a scheme using arithmetic encoding which has high encoding efficiency. Block diagrams of its encoding/decoding processes are shown in FIGS. 48 and 49.

First, a description will be given of an encoding process. In FIG. 48, an image line memory 101 stores a multi-level image to be encoded, and outputs that encoding pixel and one or a plurality of stored pixels in the vicinity of that encoding pixel as a reference pixel. A predictor 102 predicts the encoding pixel in a line including the encoding pixel (X) stored in the image line memory 101 and in a line preceding the same. As shown in FIG. 50, prediction is effected by referring to pixels in the vicinity of the encoding pixel X. At this time, as a function for prediction, only one function is selected from among seven kinds of functions (fixed predictive functions) at the time of encoding one screen, as shown in FIG. 50. Then, a prediction error V between the encoding pixel X and a prediction value P obtained from the predictor 102 is determined by X−P, and is transformed into a binary symbol (0/1) string by a binarizing transformer 103. In the binarizing transformer 103, the prediction error V is transformed into the binary symbol (0/1) string in the procedure shown below, and code words are assigned by binary arithmetic encoding in an arithmetic encoder 104.

(1) Determination and encoding of V=0

If V=0, 0 is encoded, and the encoding of the present pixel ends, whereupon the operation proceeds to an ensuing pixel.

If V≠0, 1 is encoded, and the operation proceeds to the processing step (2) and subsequent steps.

(2) Determination and encoding of the positive/negative sign of V

If V>0, 0 is encoded, and if V<0, 1 is encoded.

(3) Encoding of group number

The number of a group (see FIG. 51) to which $Sz=|v|-1$ belongs is binarized and encoded. Namely, in an ascending order starting from the group number 0, 1 is encoded if Sz does not belong to a group, and 0 is encoded if it does. For instance, in the case of group number 3, 1110 is encoded.

(4) Encoding of additional bits (applied to group number 2 and subsequent group numbers)

Additional bits indicating which value Sz represents in the group are encoded. That is, bits corresponding to the number of additional bits (see FIG. 51) starting from the lowest-order bit when Sz is expressed in natural binary notation are encoded sequentially starting from the highest-order bit thereof (the encoding is not required for group numbers 0 and 1).

When the encoding of the binary symbol (0/1) string is carried out in the arithmetic encoder 104, it is necessary to predict the probability of generating 0 or 1 in each symbol and effect encoding which is most appropriate for that symbol. For this reason, the context of each symbol is generated by a context generator 105 on the basis of the state of a pixel neighboring the encoding pixel X as well as the conditions under which the binary symbol string was generated by the binarizing transformer 103. By inputting the contexts and the symbols to the arithmetic encoder 104, probability parameters representing the prediction probability are stored for each context, so as to effect the encoding efficiently.

FIG. 52 shows a method of generating the context by the context generator 105 by making use of each determining condition obtained by the binarizing transformer 103. Further, at this time, the prediction error (V) of a prediction value from the encoding pixel X is stored in advance in a prediction error memory 106, and the context is discriminated on the basis of the relative magnitude of the error which is determined from FIG. 53. Thus, as for the encoding process, the encoding of one screen is effected by repeating the above-described processing until there ceases to be a pixel to be encoded.

Next, a description will be given of the decoding operation with reference to FIG. 49. During decoding, operation which is opposite to the encoding operation is basically carried out. The encoded data to be decoded is inputted to an arithmetic decoder 108, and is decoded into a binary symbol (0/1) string (it is assumed that the present pixel is decoded starting with $S_0$, and its i-th symbol is set as $S_i$). Next, this binary symbol string is inputted to a multi-level transformer 107, and is transformed into the prediction error (V) in the following procedure.

(1) Decoding of $S_0$ and determination of V=0

If $S_0$=0, it is assumed that the prediction error V=0, and the decoding of the present pixel is finished.

If $S_0$=1, the operation proceeds to the processing step (2) and subsequent steps.

(2) Decoding of $S_1$ and determination of the positive/negative sign of V

If $S_1$=0, it is judged that V>0. If $S_1$=1, then it is judged that V<0.

(3) Decoding and transformation into group number

The number of the group (see FIG. 51) to which $Sz=|v|-1$ belongs is determined from the binary symbol of $S_2$ and subsequent symbols. Namely, decoding is repeated until the symbol 0 is detected, and the number of symbols 1 continuing from $S_2$ is the group number (assumed to be GN). For instance, if the binary symbol string for determination of the group number is 1110, the group number is 3.

(4) Decoding and transformation into Sz (applied to group number 2 and subsequent group numbers)

A determination is made as to which value Sz represents in the group, on the basis of the fact that a binary symbol string corresponding to the number of additional bits (see FIG. 51) of $S_{3+}GN$ and subsequent symbols corresponds to the number of additional bits starting from the lowest-order bit when Sz is expressed in natural binary notation (the determination is not required for the group numbers 0 and 1).

At this time, the prediction error (V) obtained by the multi-level transformer 107 is stored in the prediction error memory as an error value in the vicinity of the pixel to be decoded in the same way as in the encoding process, and the context generator 105 generates a context required for the arithmetic decoder 108 at the time of decoding. Then, as for the prediction error (V) obtained by the multi-level transformer 107, since the value of the neighboring pixel already decoded as a pixel value prior to the pixel subject to decoding is stored in an image line memory 101d, the value of the pixel subject to decoding can be determined from X=P+V for the prediction value P obtained by the predictor 102 in the same way as in the decoding process. Thus, as for the decoding operation, the decoding of one screen is effected by repeating the above-described processing until there ceases to be a pixel to be decoded.

With the above-described conventional image encoding apparatus and decoding apparatus, since an image is predicted by using a fixed predictive function in one scan, the method is not necessarily suitable to a state of distribution of pixels in a local image area, so that there has been a problem in that the encoding and decoding efficiency declines. In addition, in the case of the prediction error which is entropy coded or decoded, disassembly or assembly must be carried out on the basis of the zero determination of the prediction error, the determination of the positive and negative, the determination of a group, and the meaning of additional bits, and a binary signal of a fixed length must be encoded or decoded for each determined group. Hence, here has been a problem in that the processing efficiency in encoding and decoding declines.

SUMMARY OF THE INVENTION

The present invention has been devised to overcome the above-described problems, and its object is to provide an encoding and a decoding apparatus and an encoding and a decoding method which make it possible to improve encoding and decoding efficiency without loss of information.

According to a first aspect of the invention, there is provided an encoding apparatus comprising:

pixel output means for outputting a target encoding pixel and a plurality of reference pixels in the vicinity thereof;

pixel distribution detecting means for determining pixel values of the reference pixels, and detecting a pixel distribution state of the reference pixels based on the determined pixel values;

prediction value output means for determining a prediction value based on the detected pixel distribution state and the reference pixels;

comparing means for comparing the prediction value and a value of the target encoding pixel, and outputting a comparison result;

context generating means for generating a context for the target encoding pixel; and encoding means for encoding the comparison result of the comparing means based on the generated context.

There is provided a decoding apparatus comprising:

pixel output means for outputting a plurality of reference pixels prior to decoding, and for storing a decoded pixel value;

pixel distribution detecting means for determining pixel values of the reference pixels, and detecting a pixel distribution state of the reference pixels based on the determined pixel values;

prediction value output means for determining a prediction value based on the detected pixel distribution state and the reference pixels;

context generating means for generating a context for the decoded pixel value;

decoding means for decoding an encoded signal based on the generated context, and producing a multi-valued signal based on a decoded signal; and decoding control means for causing the pixel output means to store the prediction value of the prediction value output means as the decoded pixel value when detecting a signal indicating coincidence from the multi-valued signal of the decoding means.

According to a second aspect of the invention, there is provided an encoding apparatus comprising:

pixel output means for outputting a target encoding pixel and a plurality of reference pixels in the vicinity thereof;

pixel distribution detecting means for determining pixel values of the reference pixels, and detecting a pixel distribution state of the reference pixels based on the determined pixel values;

prediction value output means for determining a prediction value by performing a calculation on the reference pixels;

comparing means for comparing the prediction value and a value of the target encoding pixel, and outputting a comparison result;

context generating means for generating a context based on the pixel distribution state; and encoding means for encoding the comparison result of the comparing means based on the generated context.

There is provided a decoding apparatus comprising:

pixel output means for outputting a plurality of reference pixels prior to decoding, and for storing a decoded pixel value;

pixel distribution detecting means for determining pixel values of the reference pixels, and detecting a pixel distribution state of the reference pixels based on the determined pixel values;

prediction value output means for determining a prediction value by performing a calculation on the reference pixels;

context generating means for generating a context based on the pixel distribution state;

decoding means for decoding an encoded signal based on the generated context, and producing a multi-valued signal based on a decoded signal; and decoding control means for causing the pixel output means to store the prediction value of the prediction value output means as the decoded pixel value when detecting a signal indicating coincidence from the multi-valued signal of the decoding means.

According to a third aspect of the invention, there is provided an encoding apparatus comprising:

pixel output means for outputting a target encoding pixel and a plurality of reference pixels in the vicinity thereof;

a boundary mode determining circuit for determining a maximum value and a minimum value of the plurality of reference pixels, determining an average value of the maximum value and the minimum value, comparing the respective reference pixel values with the average value to produce comparison results, detecting a boundary in the target encoding pixel and the reference pixels based on the comparison results, and detecting a pixel distribution state of the reference pixels based on the detected boundary;

a range mode determining circuit for determining a maximum value and a minimum value of the plurality of reference pixels, determining a difference value between the maximum value and the minimum value, and detecting the pixel distribution state of the reference pixels based on the difference value;

an adaptive predictor for calculating a prediction value and prediction rank information by performing calculations based on a function corresponding to the pixel distribution state detected by the boundary mode determining circuit, a function corresponding to the pixel distribution state detected by the range mode determining circuit, and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the boundary mode determining circuit, the difference value detected by the range mode determining circuit, the difference value determined by the prediction difference calculating means, and the prediction rank information calculated by the adaptive predictor; and encoding means for encoding the multi-valued signal based on the context.

There is provided a decoding apparatus comprising:

pixel output means for outputting a plurality of reference pixels prior to decoding, and for storing a decoded pixel value;

a boundary mode determining circuit for determining a maximum value and a minimum value of the plurality of reference pixels, determining an average value of the maximum value and the minimum value, comparing the respective reference pixel values with the average value to produce comparison results, detecting a boundary in a target decoding pixel and the reference pixels based on the comparison results, and detecting a pixel distribution state of the reference pixels based on the detected boundary;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value and prediction rank information by performing calculations based on a function corresponding to the pixel distribution state detected by the boundary mode determining circuit, a function corresponding to the pixel distribution state detected by the range mode determining circuit, and the plurality of reference pixels;

prediction difference calculating means for determining a difference value between the prediction value and the decoded pixel value;

a context generator for generating a context based on the pixel distribution state detected by the boundary mode determining circuit, the difference value detected by the range mode determining circuit, the difference value determined by the prediction difference calculating means, and the prediction rank information calculated by the adaptive predictor;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

According to a fourth aspect of the invention, there is provided an encoding apparatus comprising:

pixel output means for outputting a target encoding pixel and a plurality of reference pixels in the vicinity thereof;

a boundary mode determining circuit for determining a maximum value and a minimum value of the plurality of reference pixels, determining an average value of the maximum value and the minimum value, comparing the respective reference pixel values with the average value to produce comparison results, detecting a boundary in the target encoding pixel and the reference pixels based on the comparison results, and detecting a pixel distribution state of the reference pixels based on the detected boundary;

an adaptive predictor for calculating a prediction value by performing a calculation based on a function corresponding to the pixel distribution state detected by the boundary mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the boundary mode determining circuit and the difference value determined by the prediction difference calculating means; and encoding means for encoding the multi-valued signal based on the context.

There is provided a decoding apparatus comprising:

pixel output means for outputting a plurality of reference pixels prior to decoding, and for storing a decoded pixel value;

a boundary mode determining circuit for determining a maximum value and a minimum value of the plurality of reference pixels, determining an average value of the maximum value and the minimum value, comparing the respective reference pixel values with the average value to produce comparison results, detecting a boundary in a target decoding pixel and the reference pixels based on the comparison results, and detecting a pixel distribution state of the reference pixels based on the detected boundary;

an adaptive predictor for calculating a prediction value by performing a calculation based on a function corresponding to the pixel distribution state detected by the boundary mode determining circuit and the plurality of reference pixels;

prediction difference calculating means for determining a difference value between the prediction value and the decoded pixel value;

a context generator for generating a context based on the pixel distribution state detected by the boundary mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

According to a fifth aspect of the invention, there is provided an encoding apparatus comprising:

pixel output means for outputting a target encoding pixel and a plurality of reference pixels in the vicinity thereof;

a range mode determining circuit for determining a maximum value and a minimum value of the plurality of reference pixels, determining a difference value between the maximum value and the minimum value, and detecting the pixel distribution state of the reference pixels based on the difference value;

an adaptive predictor for calculating a prediction value by performing a calculation based on a function corresponding to the pixel distribution state detected by the range mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the range mode determining circuit and the difference value determined by the prediction difference calculating means; and encoding means for encoding the multi-valued signal based on the context.

There is provided a decoding apparatus comprising:

pixel output means for outputting a plurality of reference pixels prior to decoding, and for storing a decoded pixel value;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value by performing a calculation based on a function corresponding to the pixel distribution state detected by the range mode determining circuit and the plurality of reference pixels;

prediction difference calculating means for determining a difference value between the prediction value and the decoded pixel value;

a context generator for generating a context based on the pixel distribution state detected by the range mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

BRIEF DESCRIPTION OF THE DRAWINGS

FIG. 19 shows a definition of a function Q(P) for binarizing a reference pixel value P in the embodiments of the invention;

FIGS. 20 and 21 illustrate how a boundary mode is determined in the embodiments of the invention;

FIG. 22 shows how a first prediction value if calculated in the embodiments of the invention;

FIG. 23 illustrates a prediction series and the concept of ranking in the embodiments of the invention;

FIG. 40 illustrates how prediction difference values are classified (into two values) in the eighth embodiment of the invention;

FIG. 41 illustrates how a DM (dynamic range mode) context is generated in the eighth embodiment of the invention;

FIG. 47 illustrates how prediction ranks are degenerated in the 11th embodiment of the invention;

FIG. 52 shows how a context is generated in the conventional example;

FIG. 53 shows how a prediction error is classified in accordance with its sign and magnitude in generating the context in the conventional example.

DESCRIPTION OF THE PREFERRED EMBODIMENTS

Figure 1:
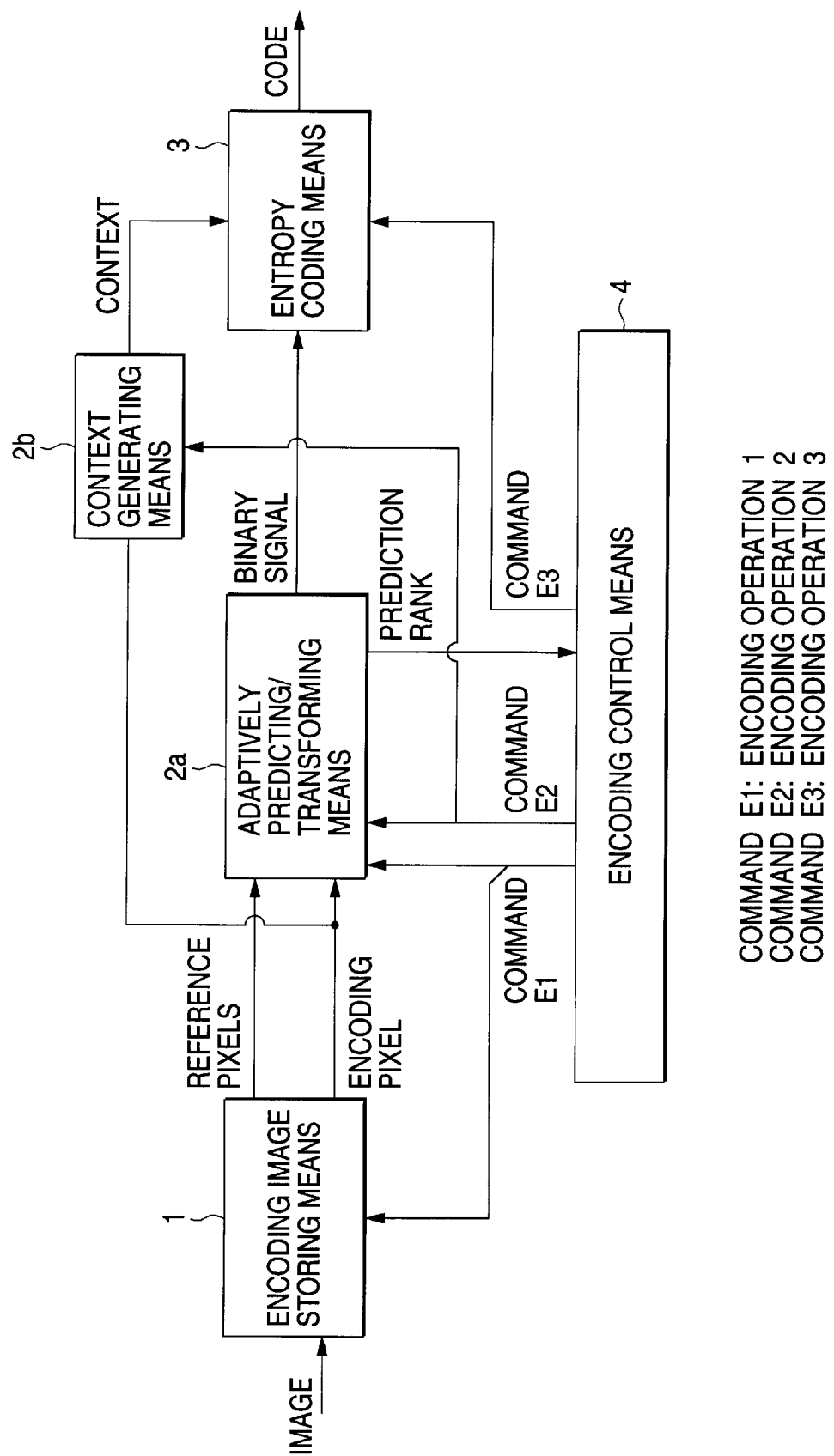
FIG. 1 is a block diagram of an image encoding apparatus according to a generalized embodiment of the present invention.

FIG. 1 illustrates a configuration of an image encoding apparatus which is a generalized embodiment of the present invention.

First, a description will be given of the configuration of this embodiment. Reference numeral 1 denotes an encoding-image storing means (pixel output means) for storing pixels subject to multi-level encoding and outputting each pixel subject to encoding as well as reference pixels in its vicinity or neighboring the same. Numeral 2a denotes an adaptively predicting/transforming means (prediction value output means, comparing means) which adaptively predicts prediction values repeatedly until the prediction value coincides with the value of the encoding pixel on the basis of the reference pixel outputted from the encoding-image storing means 1, and which transforms each prediction value into a binary signal meaning "coincidence or non-coincidence," and outputs the same. Numeral 2b denotes a context generating means for outputting an encoding index (hereafter referred to as the context) for the encoding pixel. Numeral 3 denotes an entropy coding means which outputs a code by performing binary entropy coding on the basis of the binary signal outputted from the adaptively predicting/transforming means and the context outputted from the context generating means. Numeral 4 denotes an encoding control means (control means) for controlling the procedures of processing carried out by the encoding-image storing means 1, the adaptively predicting/transforming means 2a, and the entropy coding means 3.

A description will be given of the operation of each means, centering on control processing by the encoding control means 4. The encoding control means 4 commands the encoding-image storing means 1 to store each pixel subject to encoding and output the pixel subject to encoding as well as reference pixels in its vicinity or neighboring the same [command E1; encoding operation 1]. Next, the encoding control means 4 outputs to the adaptively predicting/transforming means 2a one or a plurality of sets of binary signals of the similarly inputted pixel subject to encoding from the prediction values predicted on the basis of the reference pixels outputted from the encoding-image storing means 1. In addition, the encoding control means 4 commands the context generating means 2b to start transformation into the context and outputting the same [command E2; encoding operation 2]. The binary signal referred to herein represents "coincidence" or "non-coincidence" which is a result of comparison between the prediction value and the pixel subject to encoding. The adaptively predicting/transforming means 2a and the context generating means 2b notify the encoding control means 4 of the effect that a set of the binary signal and the context has been outputted, and the notified encoding control means 4 commands the entropy coding means 3 to entropy-code the set of the binary signal and the context and output a "code" [command E3; encoding operation 3]. The encoding control means 4 causes the [encoding operation 3] to be effected repeatedly until a binary signal representing a "coincidence" is encoded in the encoding of one pixel subject to encoding. Subsequently, the encoding control means 4 provides control such that the operation is executed again restarting with the [encoding operation 1] in the encoding of an ensuing pixel to be encoded.

Figure 2:
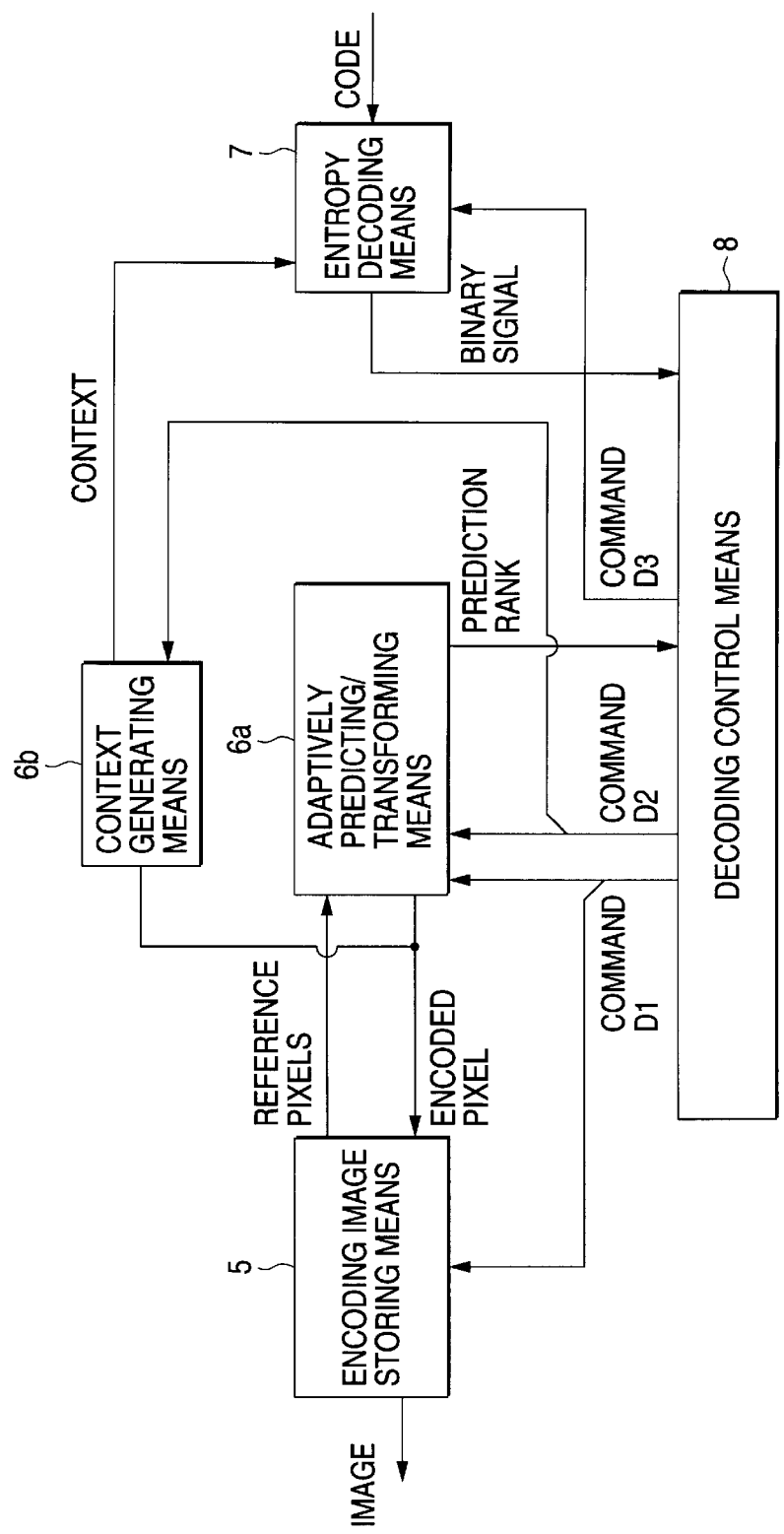
FIG. 2 is a block diagram of an image decoding apparatus according to a generalized embodiment of the invention.

FIG. 2 illustrates a configuration of an image decoding apparatus which is a generalized embodiment of the present invention.

First, a description will be given of the configuration of this embodiment. Reference numeral 5 denotes a decoded-image storing means (image output means) for outputting a reference pixel in the vicinity of a pixel subject to decoding or neighboring the same, and for storing a decoded pixel subject to multi-level decoding. Numeral 6a denotes an adaptively predicting/transforming means (prediction value output means) for adaptively predicting a decoded pixel value on the basis of the reference pixels outputted from the decoded-image storing means 5. Numeral 6b denotes a context generating means for outputting a decoding index (hereafter referred to as the context; although the encoding index is referred to as the same name, since the difference is apparent from thee execution processing, the name will not be distinguished) which is used for entropy decoding. Numeral 7 denotes an entropy decoding means for outputting a binary signal meaning "coincidence" or "non-coincidence" with each prediction value by effecting binary entropy decoding on the basis of the context outputted from the context generating means 6b and the code outputted from the encoding apparatus. Numeral 8 denotes a decoding control means for controlling the procedures of processing carried out by the decoded-image storing means 5, the adaptively predicting/transforming means 6a, the context generating means 6b, and the entropy decoding means 7.

Next, a description will be given of the operation by each means, centering on control processing by the decoding control means 8. The decoding control means 8 commands the decoded-image storing means 5 to output a predetermined reference pixel [command D1; decoding operation 1]. Next, the decoding control means 8 commands the adaptively predicting/transforming means 6a to output a prediction value predicted on the basis of the reference pixel inputted from the decoded-image storing means 5, and commands the context generating means 6b to start outputting one or a plurality of contexts [command D2; decoding operation 2]. The binary signal referred to herein represents "coincidence" or "non-coincidence" which is a result of comparison between the prediction value and the pixel subject to decoding. The context generating means 5b notifies the decoding control means 8 of the effect that the context has been outputted, and the notified decoding control means 8 commands the entropy decoding means 7 to output an entropy-decoded binary signal on the basis of the context and the code [command D3; decoding operation 3]. The decoding control means 8 causes the [decoding operation 3] to be effected repeatedly until a binary signal representing a "coincidence" is decoded in the decoding of one pixel subject to decoding. Then, when the binary signal representing the "coincidence" has been decoded, the decoding control means 8 commands the decoded-image storing means 5 to store that prediction value as the value of the pixel subject to decoding [command D4; decoding operation 4]. Subsequently, the decoding control means 8 provides control such that the operation is executed again restarting with the [decoding operation 1] in the decoding of an ensuing pixel to be decoded.

Although the [decoding operation 4] and the [decoding operation 1] have been described separately for the sake of a description in time sequence, the storage of an (immediately previous) decoded pixel in the [decoding operation 4] and the output of reference pixels prior to the decoding of a (present) pixel in the [decoding operation 1] can be effected at the same timing. Hereafter, a description will be given by assuming that the [decoding operation 4] is effected at the same timing as the [decoding operation 1].

In addition, although the image encoding apparatus and the image decoding apparatus have been described individually, in terms of a system incorporating the respective apparatus, it is possible to configure a system incorporating the two apparatus.

In addition, in the transmission of codes between the entropy coding means 3 and the entropy decoding means 7, it is possible to use buses and cables within the system (between circuit boards and on circuit boards), and wired and wireless communication lines (transmission paths) of a telephone line, LAN, WAN, or the like. In addition, it is possible to interpose a temporary or permanent storage device during the transmission. Further, by supplying codes by means of various media, such as electrically, magnetically, and/or optically stored disks and tapes, RAMs, ROMs, and the like, it is possible to cope with movement in space and time (transportability and storage feature) without intervention by a transmission path.

The use of "arithmetic encoding" in "entropy coding" in the entropy encoding means 3 and the entropy decoding means 7 offers an advantage in that compression with high encoding efficiency can be obtained. As arithmetic encoding, it is possible to use the MELCODE (F1 CODE) or QM-Coder which is an internationally standard binary arithmetic encoding scheme.

Hereafter, a description will be given by assuming that an 8-bit image is used as a multi-level image, and arithmetic encoding, i.e., one of entropy encoding schemes, is used.

First Embodiment

Figure 3:
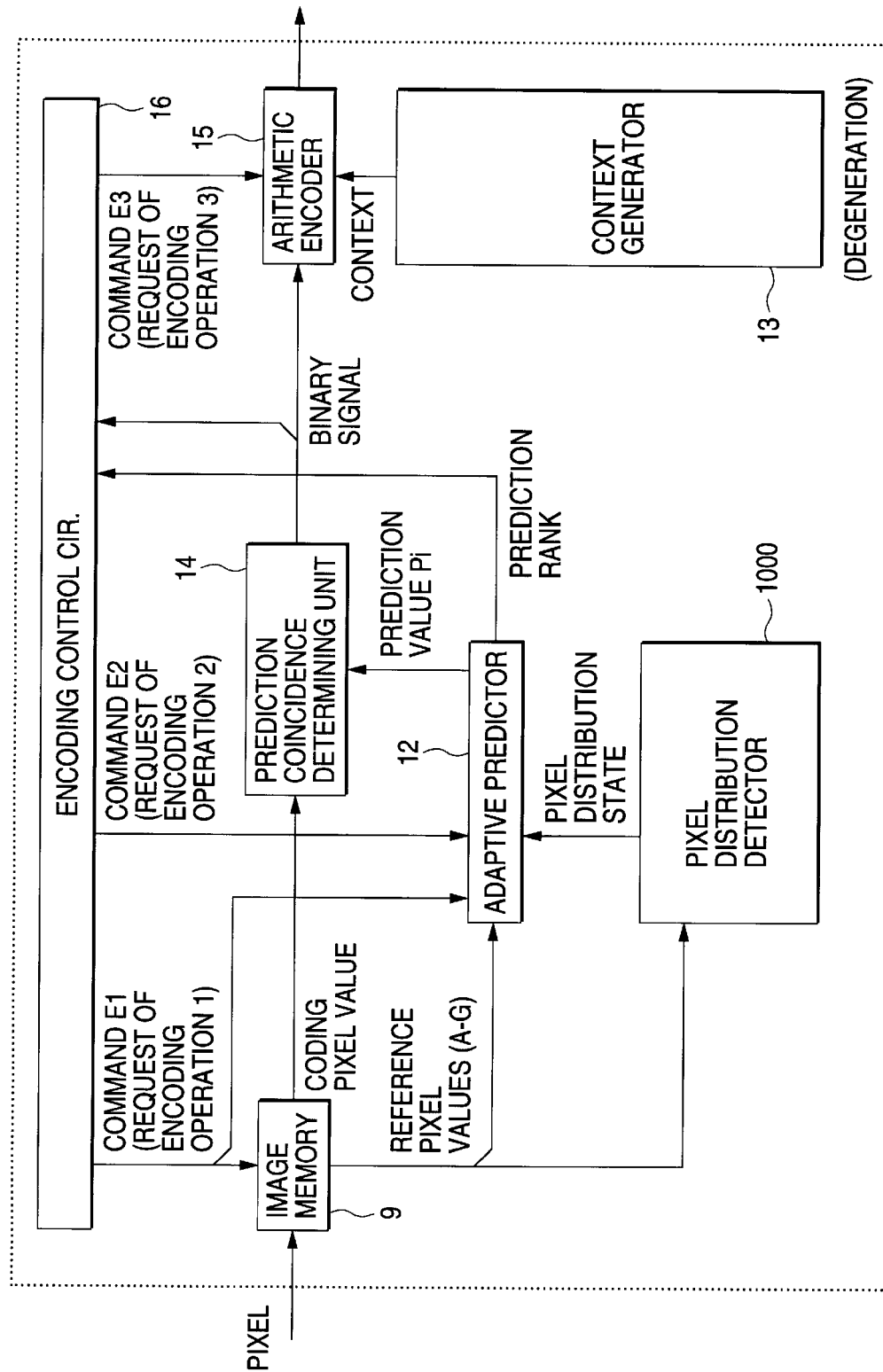
FIG. 3 is a block diagram of an image encoding apparatus according to a first embodiment of the invention.

FIG. 3 illustrates a configuration of an image encoding apparatus which is an embodiment of the present invention.

First, a description will be given of constituent elements of this embodiment.

Reference numeral 9 denotes an image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 1000 denotes a pixel distribution detector to which the reference pixels outputted from the image memory 9 are inputted, and which determines the values of the respective reference pixels, and detects the state (relationship) of distribution of pixels, such as a boundary in the reference pixels of the pixel subject to encoding and a relationship among the levels of reference pixels through calculation on the determined values of the reference pixels.

Numeral 12 denotes an adaptive predictor (prediction value output means) which selects a predictive function on the basis of the reference pixels outputted from the image memory 9 and a functional expression corresponding to the relationship of distribution of pixels determined by the pixel distribution detector 1000, and predicts and outputs a first prediction value corresponding to the encoding pixel. The adaptive predictor 12 then determines prediction strings of second and subsequent prediction values from the values of bi-level reference pixels outputted from the pixel distribution detector 1000, and repeatedly outputs the prediction values and their prediction ranks until the prediction value coincides with the encoding pixel value ("adaptive prediction step").

Numeral 13 denotes a context generator (context generating means) for outputting a "context," i.e., an encoding index in an arithmetic encoder (which will be described later) for the binary signal outputted from a prediction-coincidence determining unit 14, on the basis of a predetermined functional expression ("context generating step").

Numeral 14 denotes a prediction-coincidence determining unit (comparing means) for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder (which will be described later) ("prediction coincidence determining step").

Numeral 15 denotes an arithmetic encoder for outputting a "code" by performing arithmetic encoding on the basis of the binary signal outputted from the prediction-coincidence determining unit and the context outputted from the context generator 13 ("arithmetic encoding step").

Numeral 16 denotes an encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance by the pixel distribution detecting means, and the prediction coincidence determining step is controlled on the basis of the result of this detection. Consequently, it is possible to make a prediction in correspondence with the state of distribution of pixels, for example, and it is possible to detect the coincidence in a short period of time in the determination of coincidence or non-coincidence.

Figure 10:
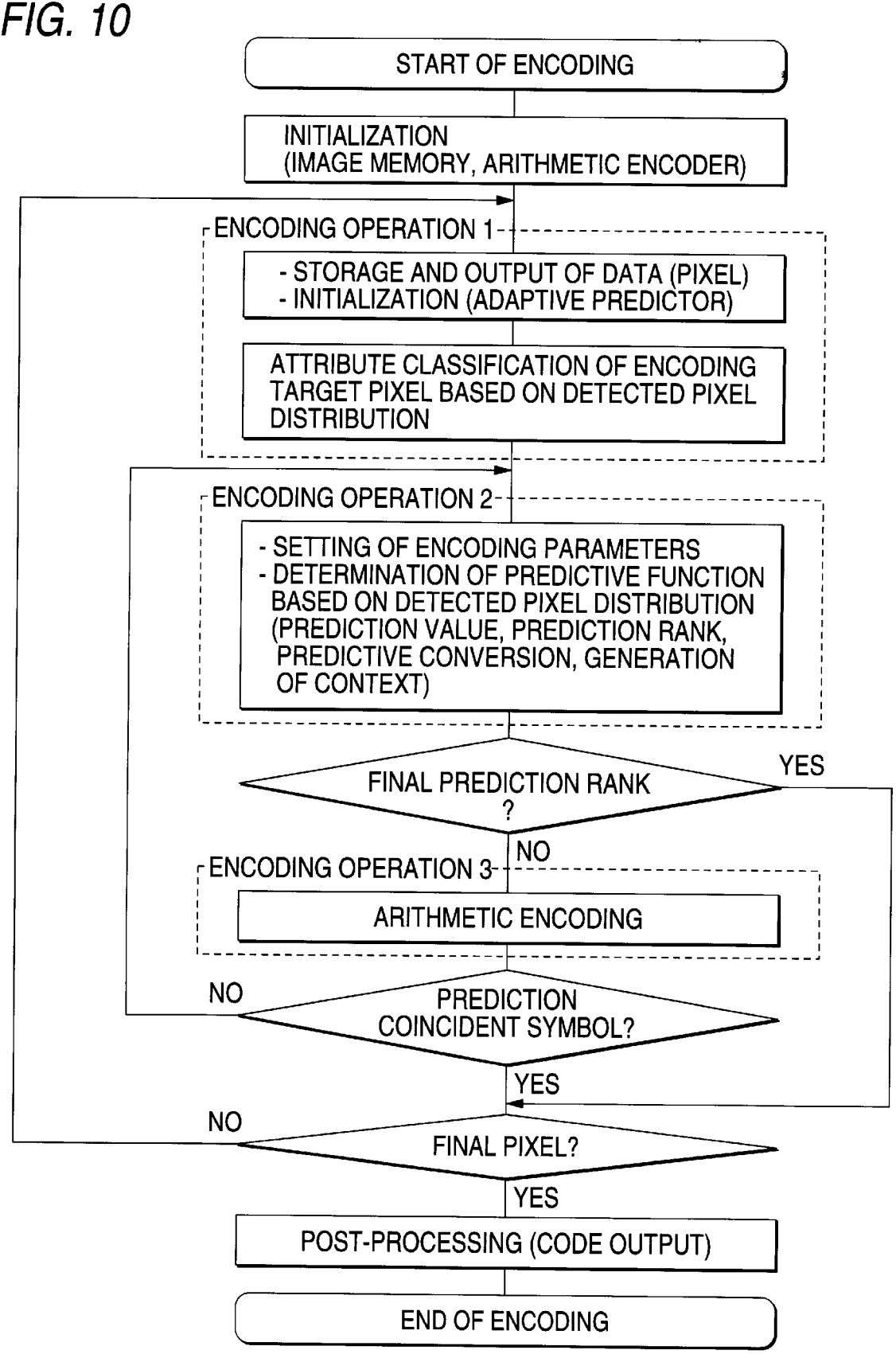
FIG. 10 is a flowchart showing the operation of the image encoding apparatus according to the first embodiment of the invention.

Next, a description will be given of the operation of the image encoding apparatus having the configuration shown in FIG. 3 for effecting multi-level image encoding. A flow diagram of encoding is shown in FIG. 10. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagrams shown in FIGS. 1 and 3. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N-1 for an Nth prediction value.

Figures 17, 18:
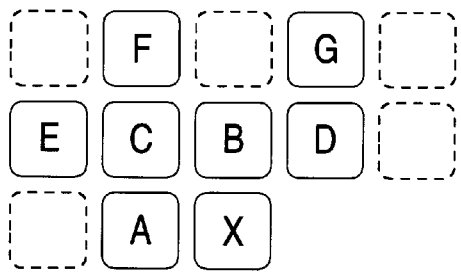
FIG. 17 illustrates the layout of reference pixels in the first to 11th embodiments of the invention.
FIG. 18 shows how a range mode is determined in the embodiments of the invention.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixels and reference pixels have been outputted, the reference pixels outputted from the image memory 9 are inputted to the pixel distribution detector 1000, and the pixel distribution detector 1000 determines the values of the respective reference pixels, and detects the state of distribution of pixels in the vicinities of the pixel subject to encoding on the basis of the reference pixel values thus determined.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 on the basis of the relationship of distribution of pixels already determined by the pixel distribution detecting means.

[Encoding Operation 2-2; Second and Subsequent Predictions]

In the second and subsequent predictions, the adaptive predictor 12 determines a prediction string on the basis of the first prediction value and a binary threshold Th, and determines and outputs a prediction value in accordance with FIG. 23. In the drawing, prediction values are alternately distributed to both sides in rightward and leftward directions in the string. However, after a maximum value or a minimum value of the pixel has appeared with respect to one direction, an assignment only for the other direction is carried out.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

Figure 24:
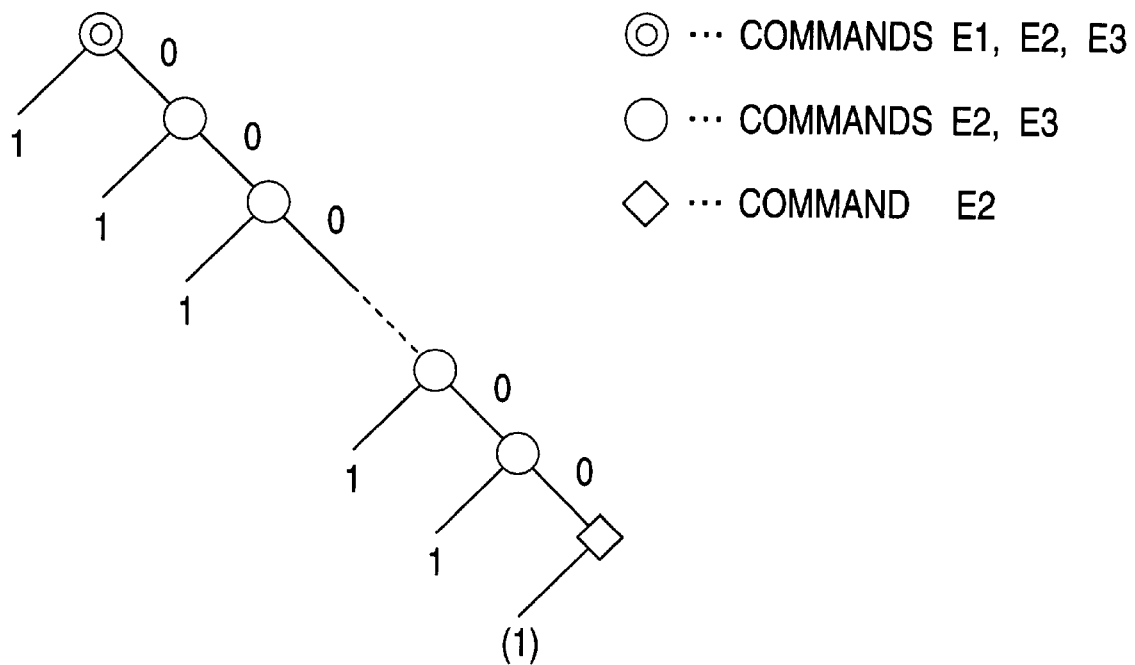
FIG. 24 illustrates a binary signal string obtained from a multi-valued encoding pixel in the embodiments of the invention.

That is, a binary signal string such as the one shown in FIG. 24 is encoded for one multi-level encoding pixel. If this encoding pixel "coincides" with the Nth prediction value, the binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 25:
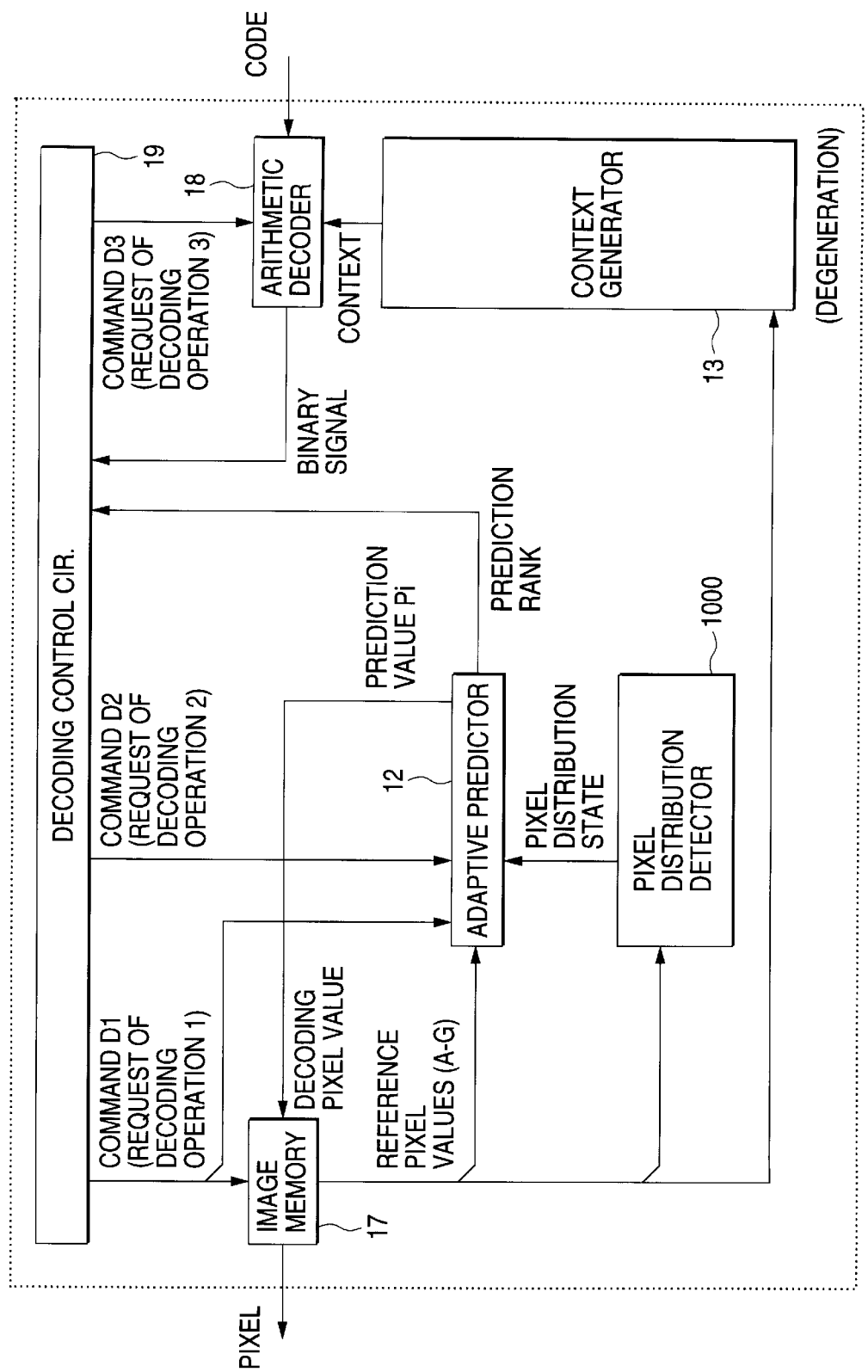
FIG. 25 is a block diagram of an image decoding apparatus according to the first embodiment of the invention.

Similarly, FIG. 25 shows a configuration of an image decoding apparatus which is an embodiment of the image decoding apparatus in accordance with the present invention. In the drawing, since the pixel distribution detector 1000, the adaptive predictor 12, and the context generator 13 perform the same functions and operation as those of the image encoding apparatus described above, a description thereof will be omitted.

First, a description will be given of constituent elements of this embodiment.

Reference numeral 17 denotes an image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes an arithmetic decoder (decoding means) for outputting a binary signal by performing arithmetic decoding on the basis of the code and the context outputted from the context generator 13 (context generating means) ("arithmetic decoding step").

Numeral 19 denotes a decoding control circuit (decoding control means) for controlling the processing sequence of execution of the storage of decoded pixels and updating of reference pixels in the image memory 17, the updating of a prediction value output in the adaptive predictor 12 (predictive value output means), and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 32:
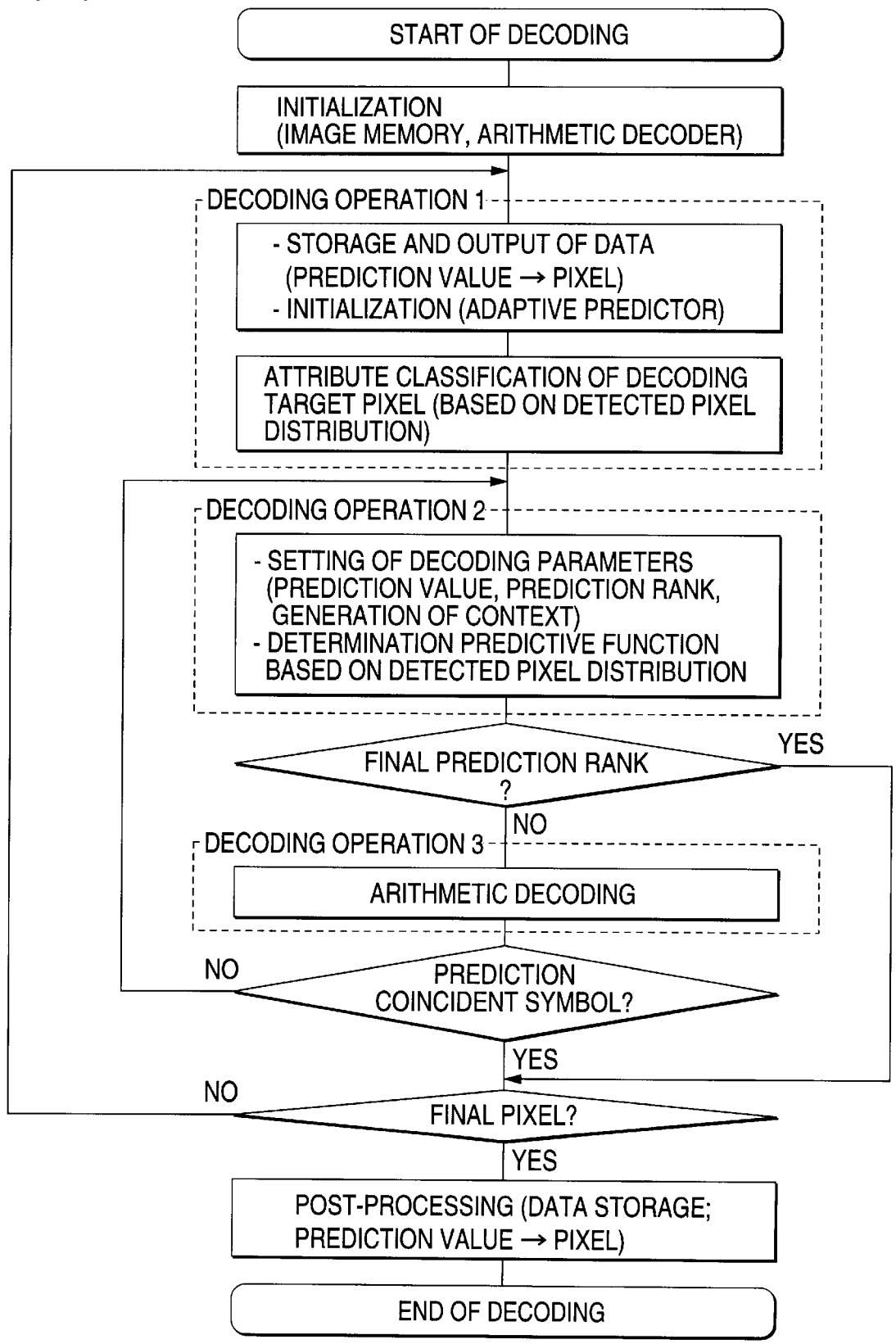
FIG. 32 is a flowchart showing the operation of the image decoding apparatus according to the first embodiment of the invention.

Next, a description will be given of the operation. Incidentally, a decoding flow diagram is shown in FIG. 32. The decoding control circuit 19 controls the sequence of overall operation.

Although "initialization processing" and "post-processing" are described in this flow diagram, signals which command the two processing steps from the decoding control circuit are not illustrated in the block diagrams shown in FIGS. 2 and 25. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way (FIG. 17) as in the operation of the above-described image encoding apparatus.

The pixel distribution detector 1000 outputs the result of the state of distribution of pixels in the vicinities of the pixel subject to decoding on the basis of the reference pixel values in the same way as in the operation of the above-described image encoding apparatus.

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value on the basis of the state of distribution of pixels detected by the pixel distribution detecting means 1000.

[Decoding Operation 2-2; Second and Subsequent Predictions]

In the second and subsequent predictions, the adaptive predictor 12 determines and outputs prediction values in the same way as in the operation of the above-described image encoding apparatus (FIG. 23).

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decoded pixel.

Thus, the prediction value outputted from the adaptive predictor 12 when the binary signal "coincidence (symbol '1')" is decoded by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

In addition, although the image encoding apparatus and the image decoding apparatus have been described individually, in terms of a system incorporating the respective apparatus, it is possible to configure a system incorporating the two apparatus.

In addition, in the transmission of codes between the arithmetic encoder 15 and the arithmetic encoder 18, it is possible to use buses and cables within the system (between circuit boards and on circuit boards), and wired and wireless communication lines (transmission paths) of a telephone line, LAN, WAN, or the like. In addition, it is possible to interpose a temporary or permanent storage device during the transmission. Further, by supplying codes by means of various media, such as electrically, magnetically, and/or optically stored disks and tapes, RAMs, ROMs, and the like, it is possible to cope with movement in space and time (transportability and storage feature) without intervention by a transmission path.

As an arithmetic encoding scheme for the arithmetic encoder 15 and the arithmetic decoder 18, it is possible to use the MELCODE (F1 CODE) or QM-Coder which is an internationally standard binary arithmetic encoding scheme, thereby making it possible to effect processing with high encoding efficiency.

Hereafter, a description will be given by assuming that an 8-bit image is used as a multi-level image, and arithmetic encoding, i.e., one of entropy encoding schemes, is used. However, it is also possible to use other entropy coding schemes.

Second Embodiment

Figure 4:
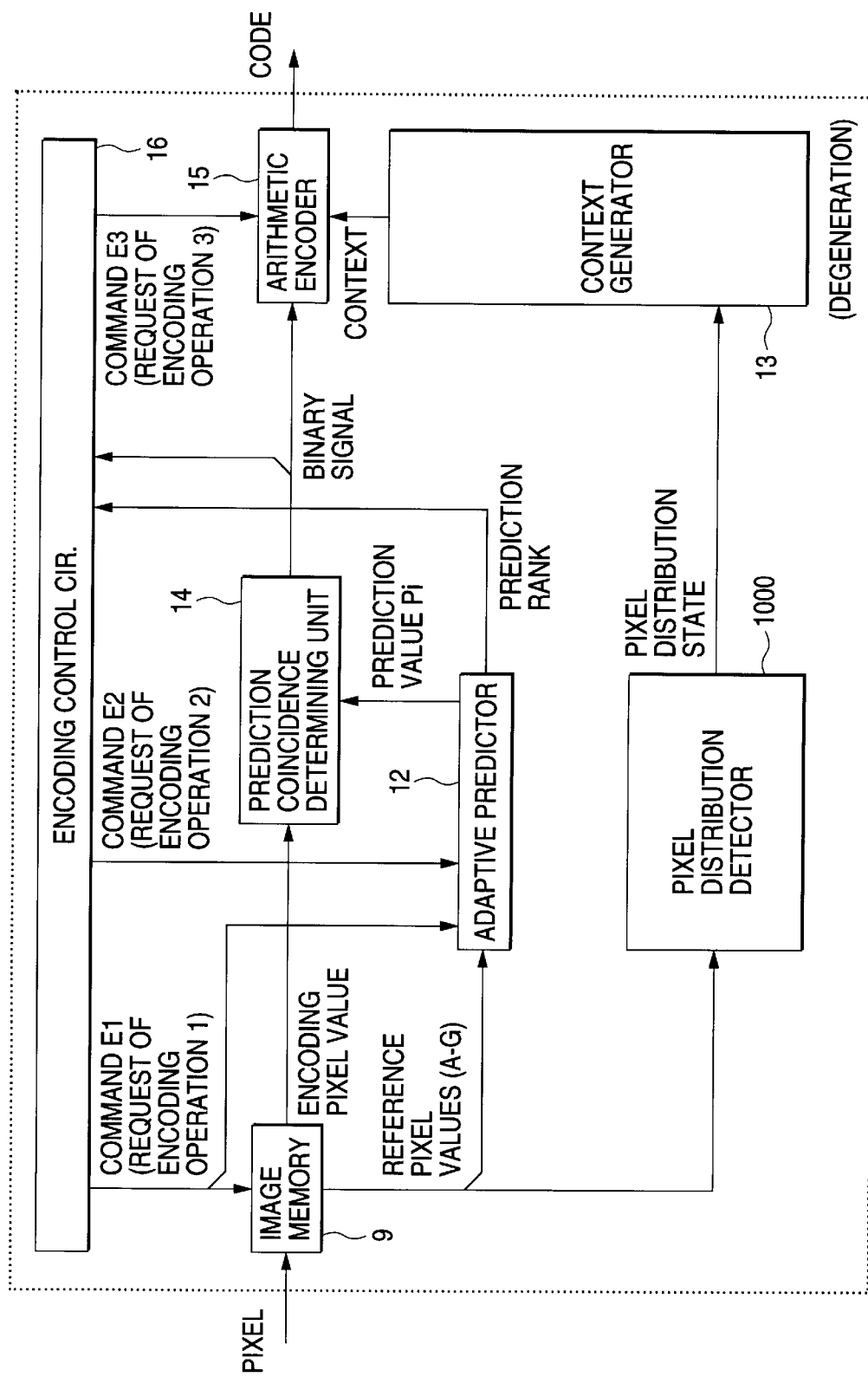
FIG. 4 is a block diagram of an image encoding apparatus according to a second embodiment of the invention.

FIG. 4 illustrates a configuration of an image encoding apparatus which is another embodiment of the present invention.

First, a description will be given of constituent elements of this embodiment.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 1000 denotes the pixel distribution detector to which the reference pixels outputted from the image memory 9 are inputted, and which determines the values of the respective reference pixels so as to detect a boundary of the reference pixel with respect to the pixel subject to encoding and the state of distribution of pixels, such as the density of reference pixels with respect to the pixel subject to encoding on the basis of the calculation of the determined values of the reference pixels.

Numeral 12 denotes the adaptive predictor (prediction value output means) which selects a predictive function from the reference pixels outputted from the image memory 9, and predicts and outputs a first prediction value corresponding to the encoding pixel, and which determines a prediction string of second and subsequent prediction values, and repeatedly outputs the prediction values and their prediction ranks until the prediction value coincides with the encoding pixel value ("adaptive prediction step").

Numeral 13 denotes the context generator (context generating means) for outputting a "context," i.e., an encoding index in an arithmetic encoder for the pixel subject to encoding, on the basis of the result of detection of the distribution of pixels outputted from the pixel distribution detecting means ("context generating step").

Numeral 14 denotes the prediction-coincidence determining unit (comparing means) for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder (which will be described later) ("prediction coincidence determining step").

Numeral 15 denotes the arithmetic encoder (encoding means) for outputting a "code" by performing arithmetic encoding on the basis of the binary signal outputted from the prediction-coincidence determining unit and the context outputted from the context generator 13 ("arithmetic encoding step").

Numeral 16 denotes the encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance by the pixel distribution detecting means, and the arithmetic encoding step is controlled on the basis of the result of this detection. Consequently, it is possible to assign code words in correspondence with the distribution of pixels (the frequency of appearance of pixels), so that the encoding efficiency improves.

Figure 11:
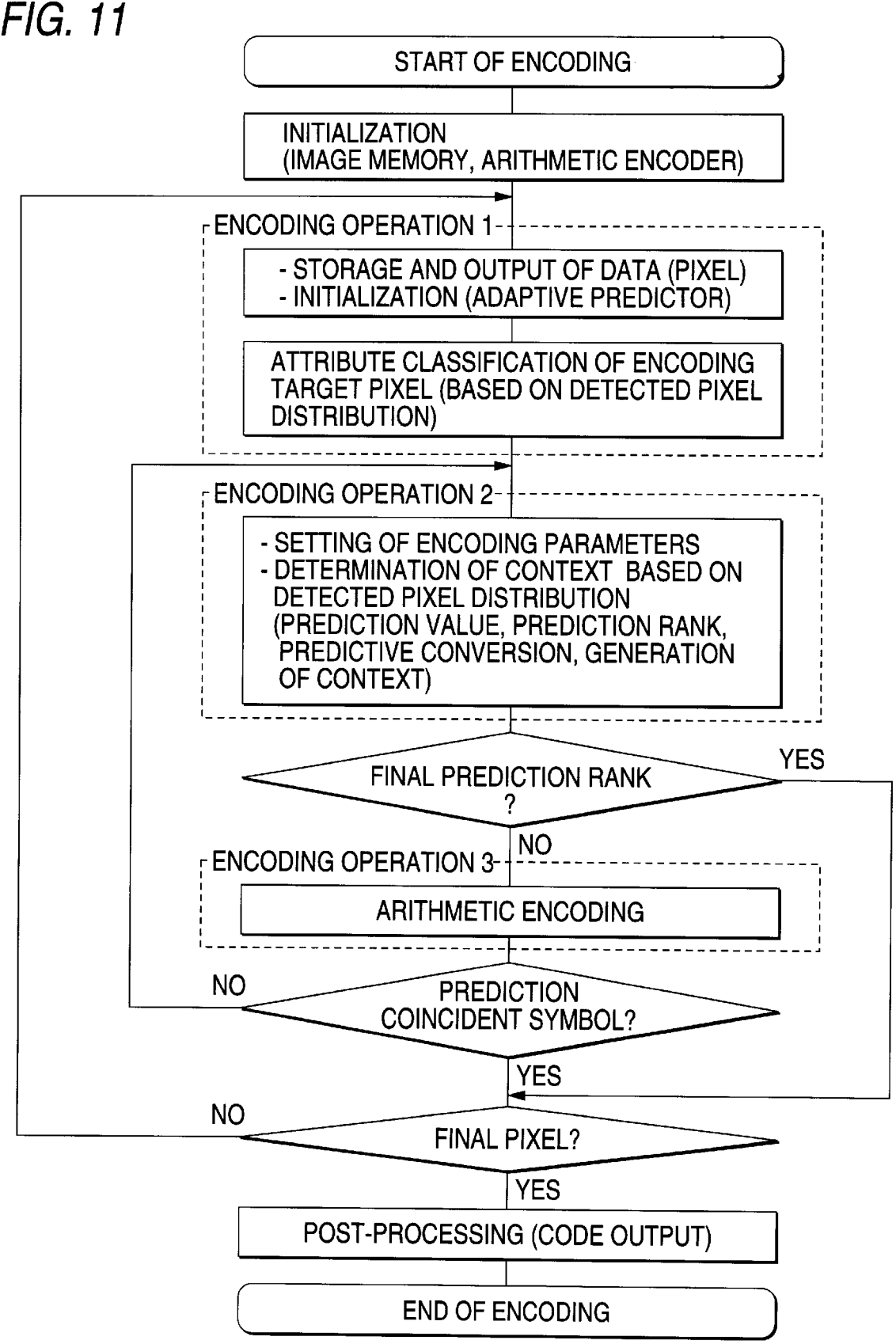
FIG. 11 is a flowchart showing the operation of the image encoding apparatus according to the second embodiment of the invention.

Next, a description will be given of the operation of the image encoding apparatus having the configuration shown in FIG. 4 for effecting multi-level image encoding. A flow diagram of encoding is shown in FIG. 11. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagram shown in FIG. 4. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N−1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixels and reference pixels have been outputted, the reference pixels outputted from the image memory 9 are inputted to the pixel distribution detector 1000, and the pixel distribution detector 1000 determines the values of the respective reference pixels, and detects a boundary of the reference pixels with respect to the pixel subject to encoding and the state of distribution of pixels, such as the density of the reference pixels with respect to the pixel subject to encoding on the basis of the reference pixel values thus determined.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1.

[Encoding Operation 2-2; Second and Subsequent Predictions]

In the second and subsequent predictions, in the same way as in the first prediction value, the prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

In addition, the detected result outputted from the pixel distribution detector 1000 is transformed into a 7-bit context by the context generator 13. Here, in this embodiment, the context is a fixed value with respect to the encoding of a series of binary signal strings for one encoding pixel.

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, the binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 26:
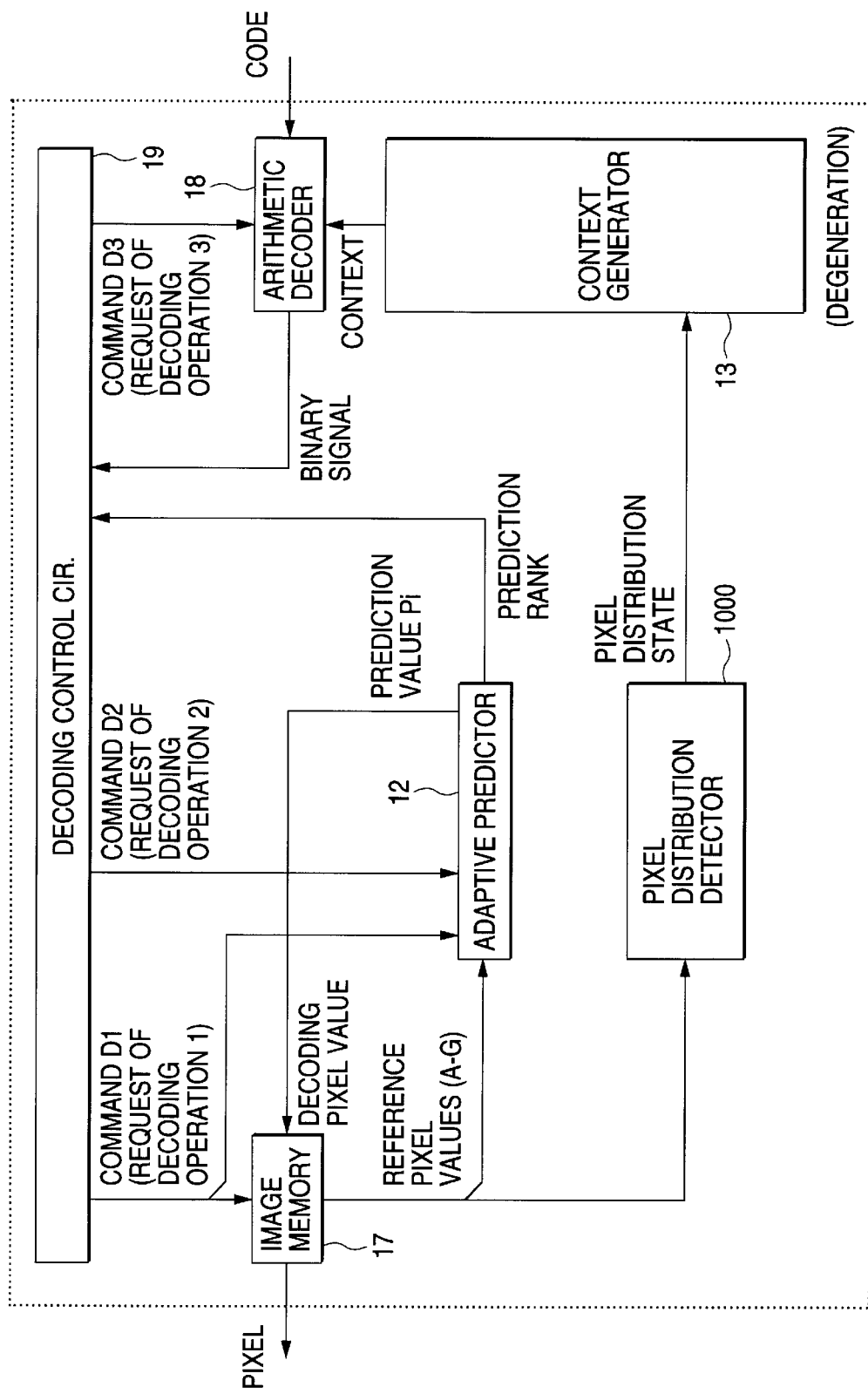
FIG. 26 is a block diagram of an image decoding apparatus according to the second embodiment of the invention.

Similarly, FIG. 26 shows a configuration of an image decoding apparatus which is an embodiment of the image decoding apparatus in accordance with the present invention. In the drawing, since the pixel distribution detector 1000, the adaptive predictor 12, and the context generator 13 perform the same functions and operation as those of the image encoding apparatus described above, a description thereof will be omitted.

First, a description will be given of constituent elements of this embodiment.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (decoding means) for outputting a binary signal by performing arithmetic decoding on the basis of the code and the context outputted from the context generator 13 ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12 (predictive value output means), and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 33:
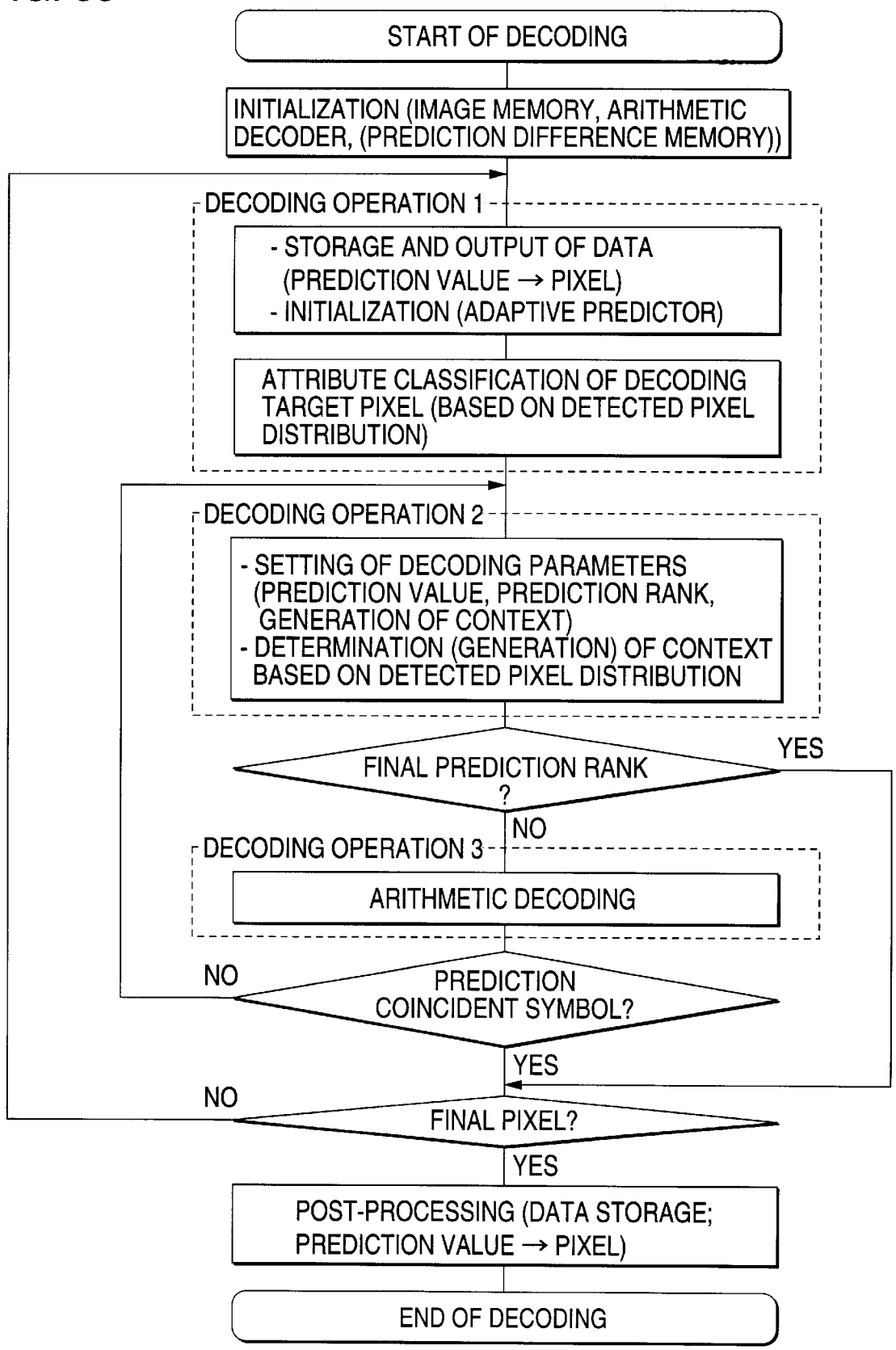
FIG. 33 is a flowchart showing the operation of the image decoding apparatus according to the second embodiment of the invention.

Next, a description will be given of the operation. Incidentally, a decoding flow diagram is shown in FIG. 33. The decoding control circuit 19 makes decisions on the conditions in the flow diagram, and controls the sequence of overall operation.

Although "initialization processing" and "post-processing" are described in this flow diagram, signals which command the two processing steps from the decoding control circuit are not illustrated in the block diagram shown in FIG. 26. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way (FIG. 17) as in the operation of the above-described image encoding apparatus. The pixel distribution detector 1000 outputs the detected result of the state of distribution of pixels on the basis of the pixel values of the pixels A to G in the same way as in the operation of the above-described image encoding apparatus.

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value.

[Decoding Operation 2-2; Second and Subsequent Predictions]

In the second and subsequent predictions, the adaptive predictor 12 determines and outputs prediction values in the same way as in the operation of the above-described image encoding apparatus.

The detected result outputted from the pixel distribution detector 1000 is transformed into a 7-bit context by the context generator 13.

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol "1") is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol "1") is outputted from the adaptive predictor 12 to the image memory 17 as the decoded pixel.

Thus, the prediction value outputted from the adaptive predictor 12 when the binary signal "coincidence" (symbol "1") is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence" (symbol "1") at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, a function for generating a context can be changed over in correspondence with an index representing the degree of "scattering (dispersion)" of reference pixel values and the degree of "tilting" of a local reference image area. It is possible to obtain an advantage of improving the encoding efficiency through the changeover of a function for generating a context.

Third Embodiment

Figure 5:
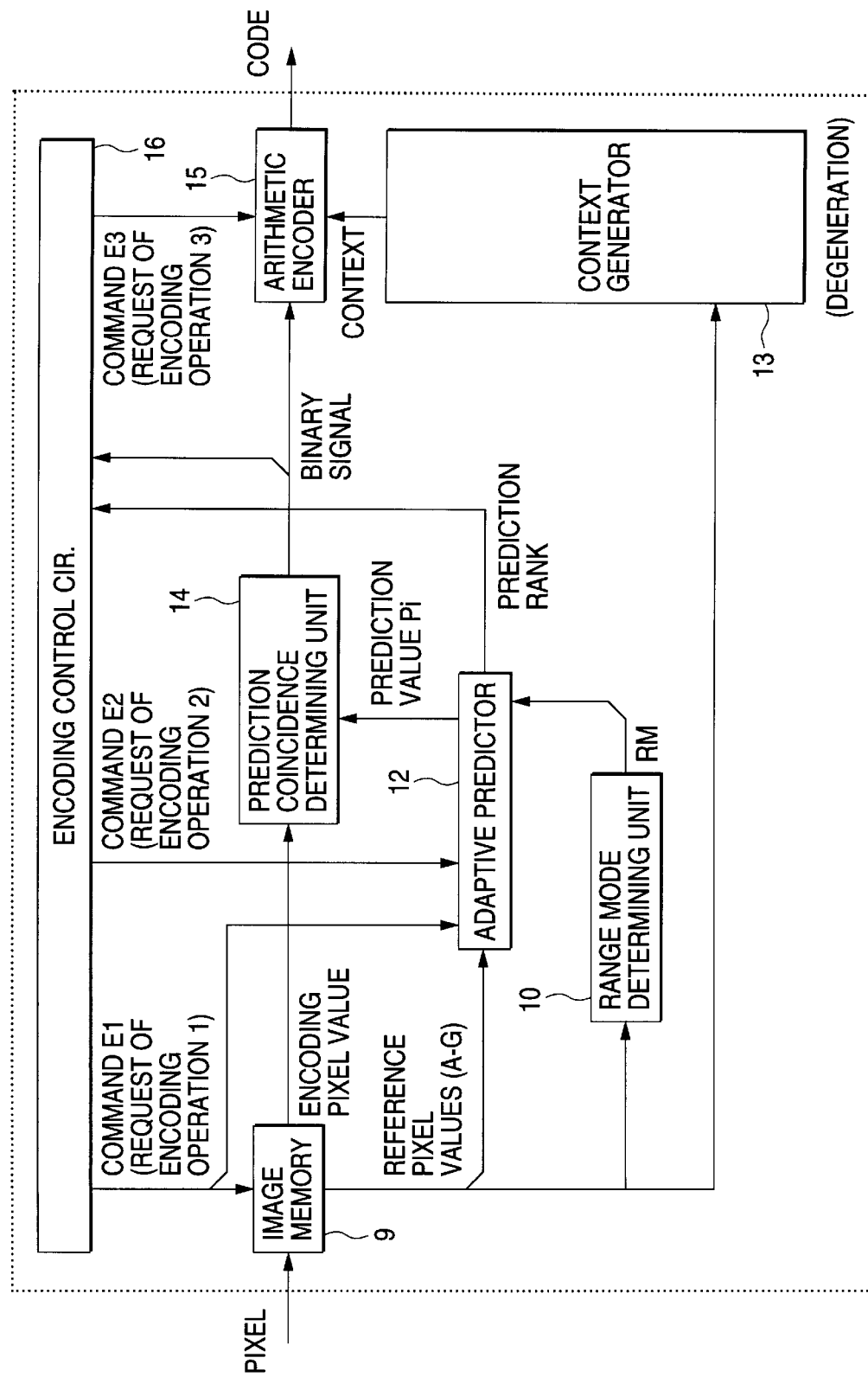
FIG. 5 is a block diagram of an image encoding apparatus according to a third embodiment of the invention.

FIG. 5 illustrates a configuration of an image encoding apparatus which is still another embodiment of the present invention.

First, a description will be given of constituent elements of this embodiment.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 10 denotes a range-mode determining unit to which the reference pixels outputted from the image memory 9 are inputted, which determines maximum values and minimum values of the determined reference pixel values, and which determines a "range mode" from a maximum difference (dynamic range) of the reference pixel values by performing a calculation on the maximum values and the minimum values ("range-mode determining step"). It should be noted that, in the range-mode determining step, the state of variation in the distribution of the reference pixels is detected in the aforementioned determination. For instance, a determination is made such that if the maximum difference in the reference pixel values is large, the variation in distribution is large, and that if the maximum difference in the reference pixel values is small, the variation in distribution is small.

Numeral 12 denotes the adaptive predictor (prediction value output means) which selects a predictive function from the reference pixels outputted from the image memory 9 and the range mode outputted from the range-mode determining unit 10, and predicts and outputs a first prediction value corresponding to the encoding pixel. The adaptive predictor 12 then determines prediction strings of second and subsequent prediction values from the values of bi-level reference pixels outputted from the range-mode determining unit 10, and repeatedly outputs the prediction values and their prediction ranks until the prediction value coincides with the encoding pixel value ("adaptive prediction step").

Numeral 13 denotes the context generator (context generating means) for outputting a "context," i.e., an encoding index in an arithmetic encoder ("context generating step").

Numeral 14 denotes a prediction-coincidence determining unit (comparing means) for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder ("prediction coincidence determining step").

Numeral 15 denotes the arithmetic encoder (encoding means) for outputting a "code" by performing arithmetic encoding on the basis of the binary signal outputted from the prediction-coincidence determining unit and the context outputted from the context generator 13 ("arithmetic encoding step").

Numeral 16 denotes an encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance by the range-mode determining means, and the prediction coincidence determining step and the arithmetic encoding step are controlled on the basis of the result of this detection. Consequently, it is possible to detect, for example, the coincidence in a short period of time in the determination of coincidence or non-coincidence.

Figure 12:
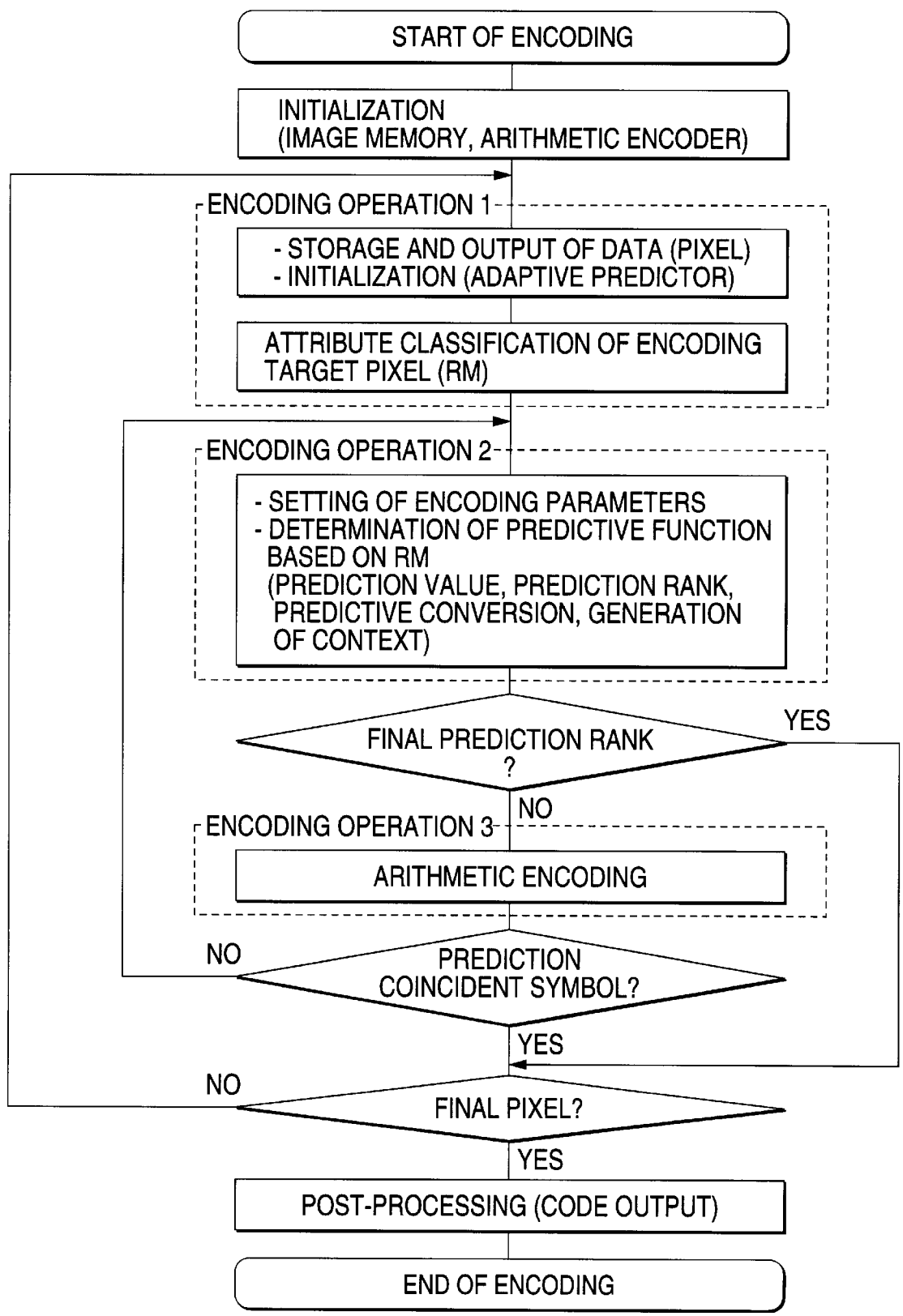
FIG. 12 is a flowchart showing the operation of the image encoding apparatus according to the third embodiment of the invention.

Next, a description will be given of the operation of the image encoding apparatus shown in FIG. 5. A flow diagram of encoding is shown in FIG. 12. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagram shown in FIG. 5. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N–1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixel and the reference pixels are outputted, the classification of the attribute referred to as the "range mode" with respect to the encoding pixel is effected in parallel.

After the reference pixels are outputted from the image memory, the range-mode determining unit 10 calculates the maximum difference DR (dynamic range) in accordance with the following Formula 1.

$$DR = \mathrm{Max}(A, B, C, D, E, F, G) - \mathrm{Min}(A, B, C, D, E, F, G) \quad (1)$$

where Max( ) and Min( ) are functions for determining maximum values and minimum values among the reference pixels A to G, respectively.

Although the value of the maximum difference DR thus determined may be adopted as it is as the range mode (RM), since the total number of modes becomes numerous, it is assumed in this example that 16 modes are provided according to FIG. 18, and 4-bit range modes are outputted.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 based on a calculating expression that is determined by switching by using one column of a table shown in FIG. 22 in accordance with the range mode (output from the range-mode determining unit 10) already determined by the range-mode determining unit 10.

[Encoding Operation 2-2; Second and Subsequent Predictions]

In the second and subsequent predictions, the adaptive predictor 12 determines a prediction string on the basis of the first prediction value and a binary threshold Th, and determines and outputs a prediction value in accordance with FIG. 23. In the drawing, prediction values are alternately distributed to both sides in rightward and leftward directions in the string. However, after a maximum value or a minimum value of the pixel have appeared with respect to one direction, an assignment only for the other direction is carried out.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, a binary signal 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 27:
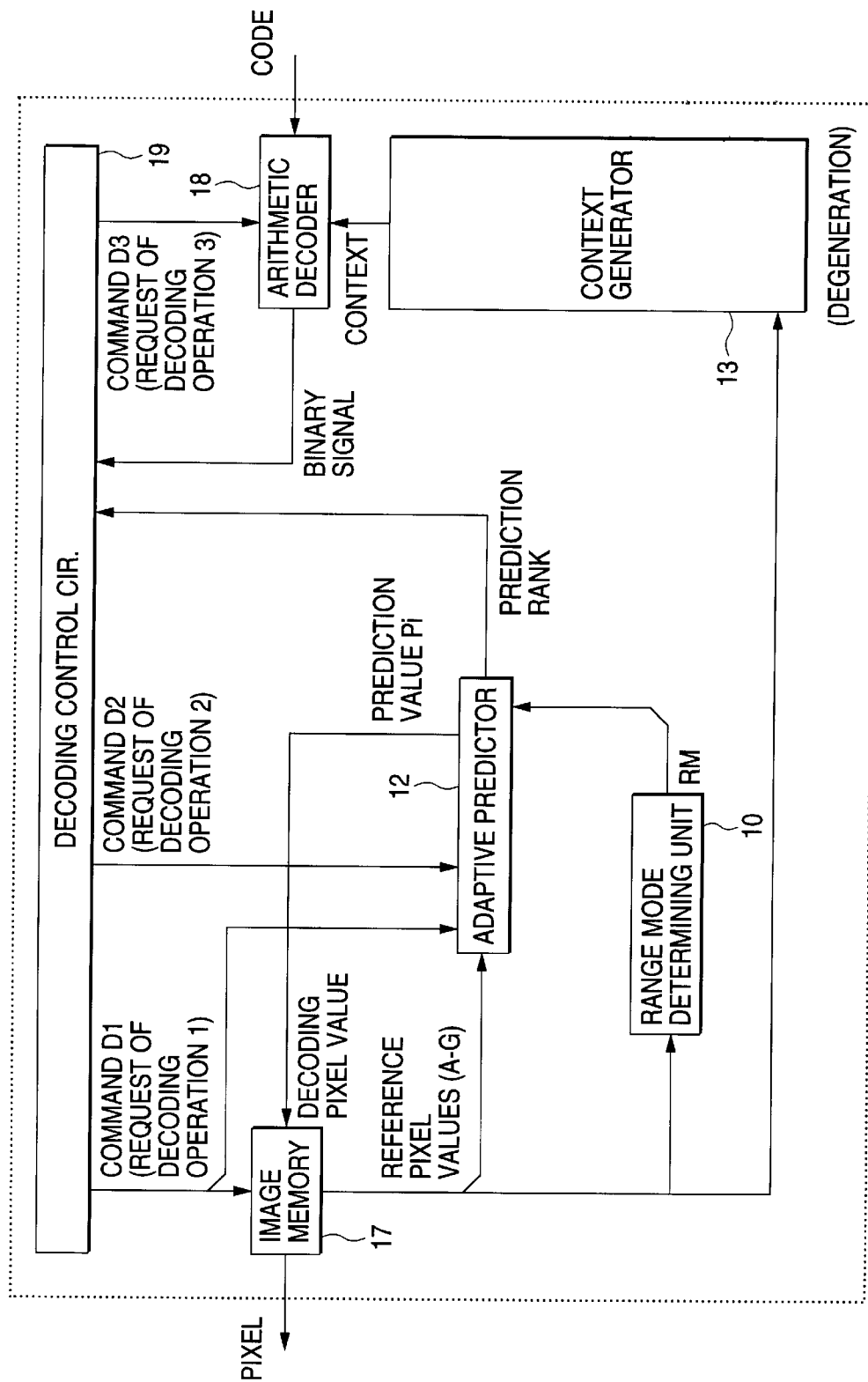
FIG. 27 is a block diagram of an image decoding apparatus according to the third embodiment of the invention.

Similarly, FIG. 27 shows a configuration of an image decoding apparatus which is an embodiment of the image decoding apparatus in accordance with the present invention. In the drawing, since the range-mode determining unit 10, the adaptive predictor 12, and the context generator 13 perform the same functions and operation as those of the image encoding apparatus described above, a description thereof will be omitted.

First, a description will be given of constituent elements of this embodiment.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (arithmetic decoding means) for outputting a binary signal by performing arithmetic decoding on the basis of the code and the context outputted from the context generator 13 (context generating means) ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12, and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 34:
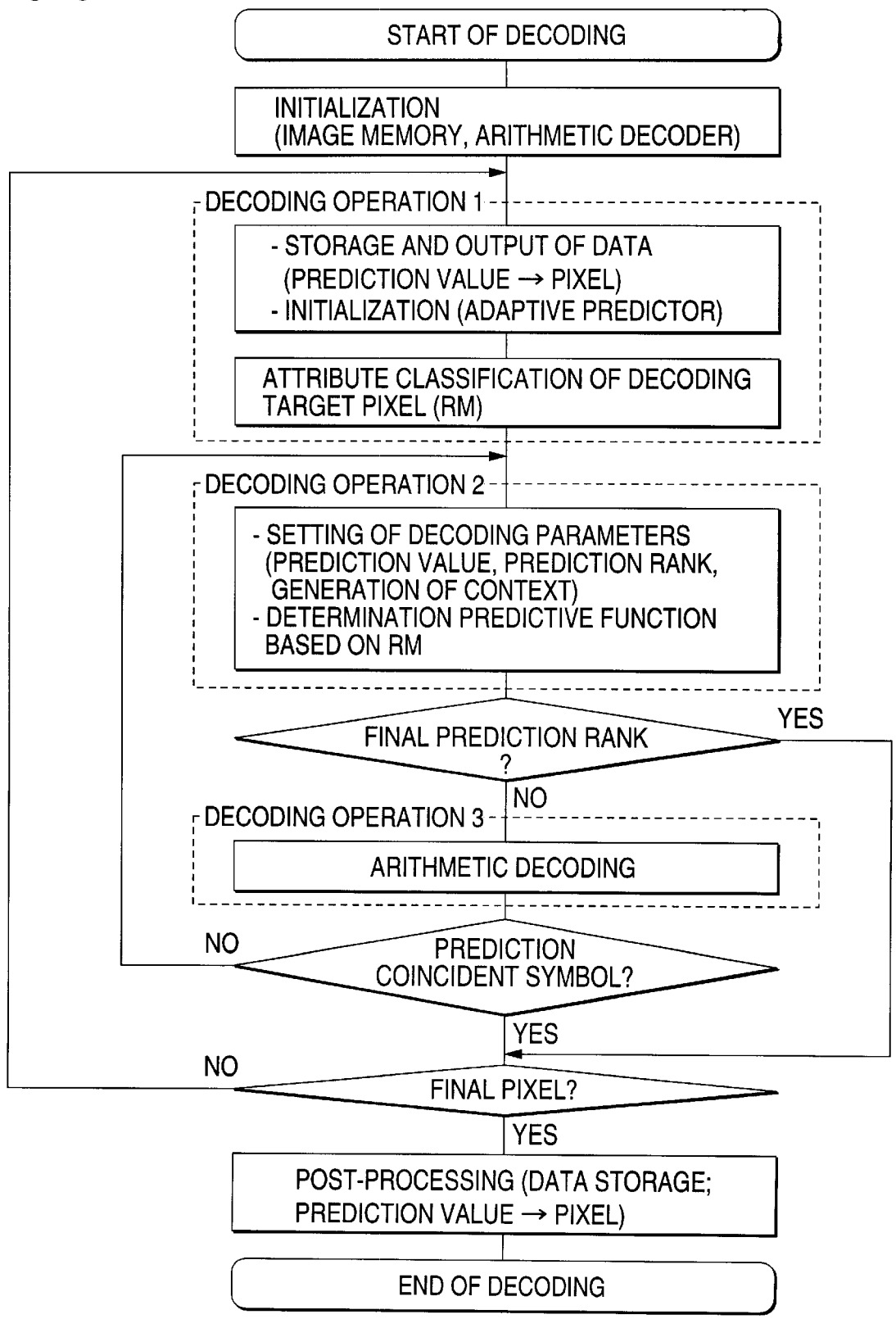
FIG. 34 is a flowchart showing the operation of the image decoding apparatus according to the third embodiment of the invention.

Next, a description will be given of the operation. Incidentally, a decoding flow diagram is shown in FIG. 34. The decoding control circuit 19 makes decisions on the conditions in the flow diagram, and controls the sequence of overall operation.

Although "initialization processing" and "post-processing" are described in this flow diagram, signals which command the two processing steps from the decoding control circuit are not illustrated in the block diagram shown in FIG. 27. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way as in the operation of the above-described image encoding apparatus.

After the reference pixels are outputted, the classification of the attribute referred to as the "range mode" with respect to the encoding pixel is effected in parallel.

The range-mode determining unit 10 determines and outputs a range mode by calculating a maximum difference DR of the pixels A to G in the same way as in the operation of the above-described image encoding apparatus (Formula 1, FIG. 18).

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value on the basis of the already determined range mode (output from the range-mode determining unit 10) in the same way as in the operation of the above-described image encoding apparatus (FIG. 22).

[Decoding Operation 2-2; Second and Subsequent Predictions]

In the second and subsequent predictions, the adaptive predictor 12 determines and outputs prediction values in the same way as in the operation of the above-described image encoding apparatus (FIG. 23).

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decoded pixel.

Thus, the prediction value outputted from the adaptive predictor 12 when the binary signal "coincidence (symbol '1')" is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, it is possible to change over the predictive function adaptively in pixel units in accordance with the range mode determined from a maximum difference value, i.e., an index of the degree of "scattering (dispersion)" of the reference pixel values, as well as a classification thereof. As the predictive function is changed over, it is possible to bias the probability of coincidence of prediction toward ranges having high prediction ranks. Hence, it is possible to obtain an advantage in that the length of the predictively transformed binary signal string 0 . . . 01 can be shortened, thereby improving the encoding efficiency.

Fourth Embodiment

Figure 6:
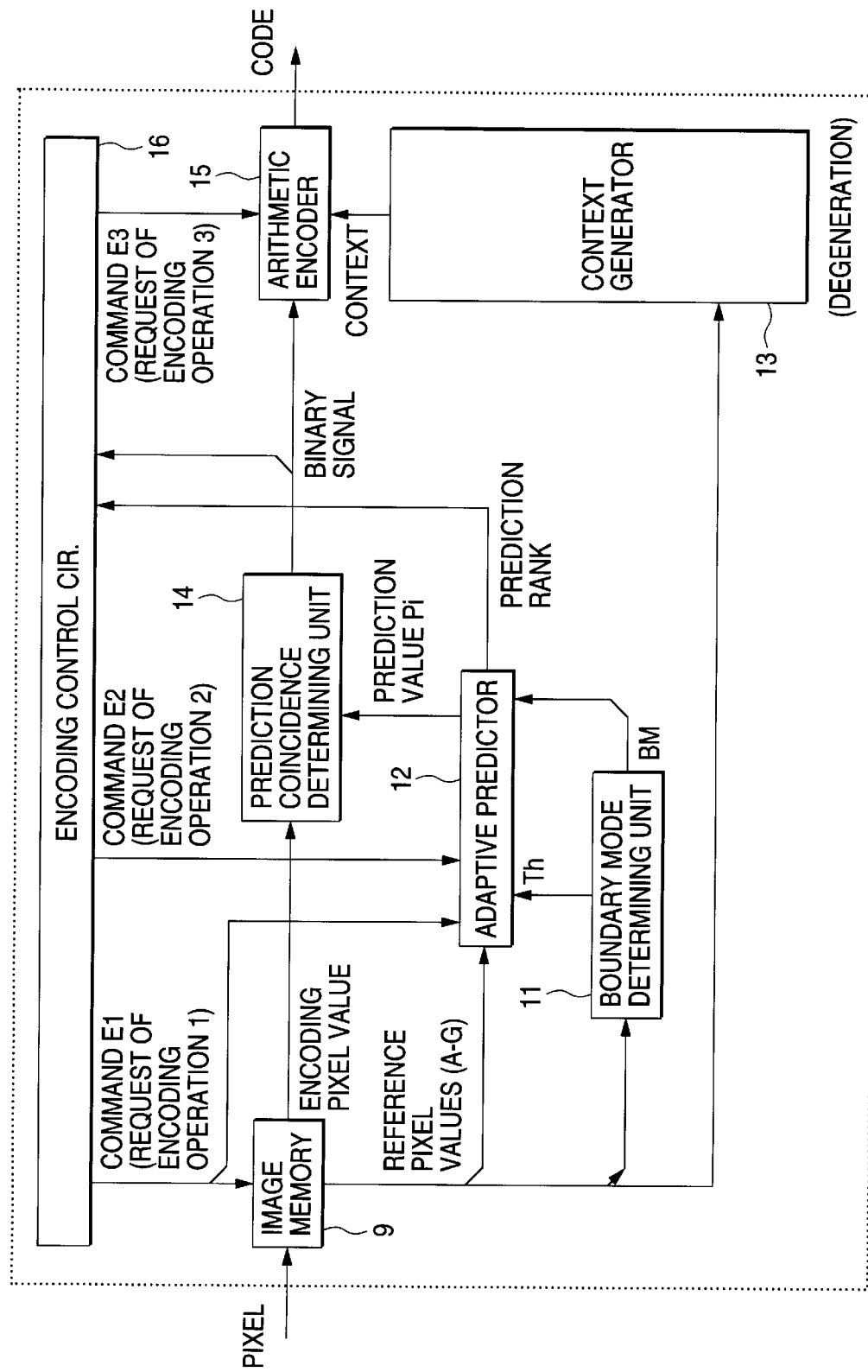
FIG. 6 is a block diagram of an image encoding apparatus according to a fourth embodiment of the invention.

FIG. 6 illustrates a configuration of an image encoding apparatus which is a further embodiment of the present invention.

First, a description will be given of constituent elements of this embodiment.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 11 denotes a boundary-mode determining unit to which the reference pixels outputted from the image memory 9 are inputted to determine pixel values for the respective inputted reference pixels, and which determines a mean value from the pixel values, sets the determined mean value as a threshold for a maximum pixel value and a minimum pixel value, and makes a comparison between the threshold and each of the reference pixel values. The boundary-mode determining unit 11 transforms each reference pixel value into a bi-level value on the basis of the result of the comparison, outputs the "threshold" and determines a "boundary mode" ("boundary-mode determining step). In other words, in the determination of the boundary mode, a pattern of distribution of reference pixels is selected in the above-described determination, and the selected pattern most closely resembles a prediction pattern of the encoding pixel.

Numeral 12 denotes the adaptive predictor (prediction value output means) which selects a predictive function from the reference pixels outputted from the image memory 9 and the boundary mode outputted from the boundary-mode determining unit 11, and predicts and outputs a first prediction value corresponding to the encoding pixel. The adaptive predictor 12 then determines prediction strings of second and subsequent prediction values from the values of bi-level reference pixels outputted from the boundary-mode determining unit 11, and repeatedly outputs the prediction values and their prediction ranks until the prediction value coincides with the encoding pixel value ("adaptive prediction step").

Numeral 13 denotes the context generator (context generating means) for outputting a "context," i.e., an encoding index in an arithmetic encoder (which will be described later) ("context generating step").

Numeral 14 denotes the prediction-coincidence determining unit (comparing means) for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder (which will be described later) ("prediction coincidence determining step").

Numeral 15 denotes the arithmetic encoder (encoding means) for outputting a "code" by performing arithmetic encoding on the basis of the binary signal outputted from the prediction-coincidence determining unit and the context outputted from the context generator 13 ("arithmetic encoding step").

Numeral 16 denotes the encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels (particularly a color boundary between the encoding pixel and the reference pixels) is detected in advance by the boundary-mode determining means, and the prediction coincidence determining step and the arithmetic encoding step are controlled on the basis of the result of this detection. Consequently, it is possible to detect, for example, the coincidence in a short period of time in the determination of coincidence or non-coincidence.

Figure 13:
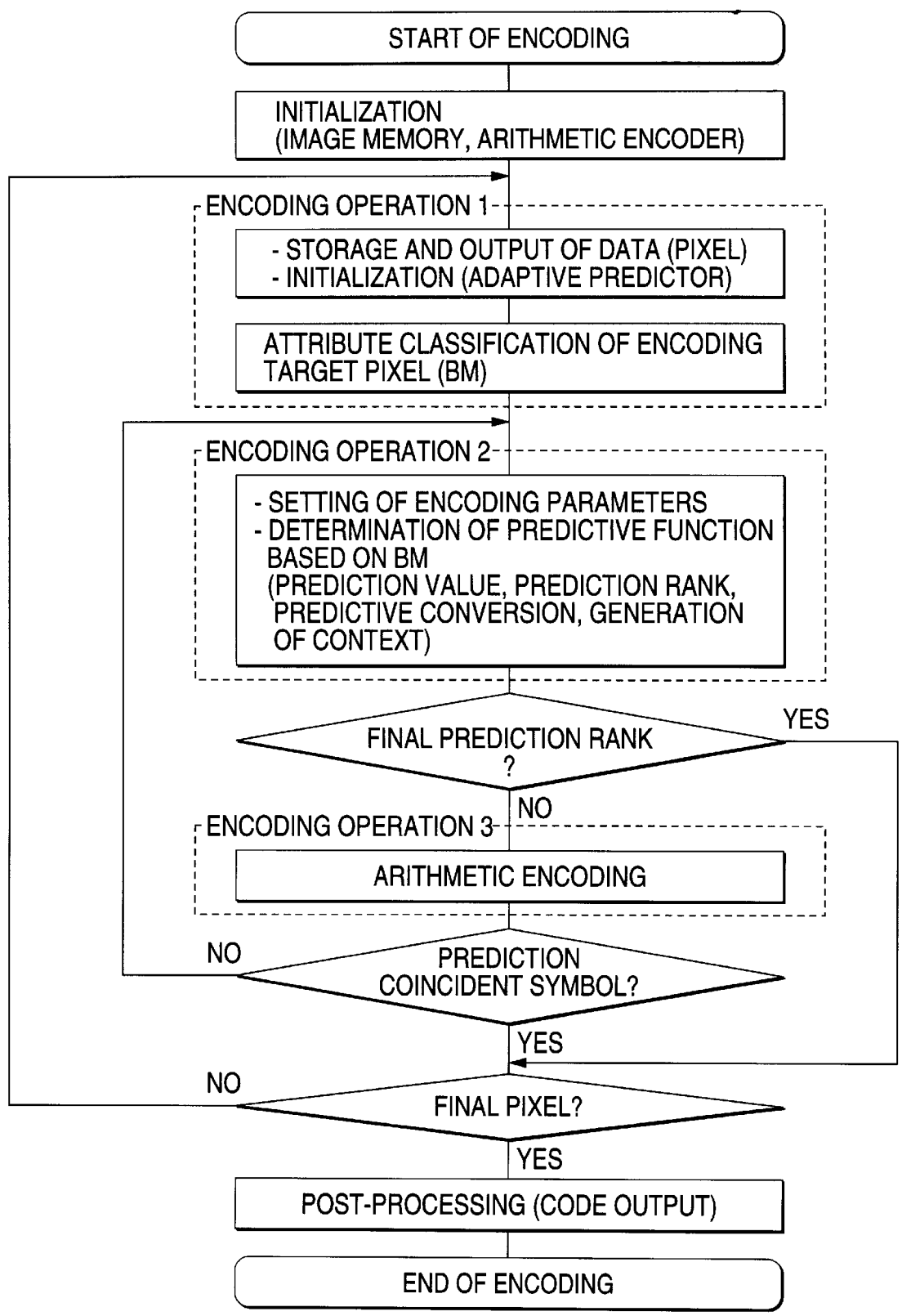
FIG. 13 is a flowchart showing the operation of the image encoding apparatus according to the fourth embodiment of the invention.

Next, a description will be given of the operation of the image encoding apparatus shown in FIG. 6 for effecting multi-image encoding. A flow diagram of encoding is shown in FIG. 13. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagram shown in FIG. 6. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N−1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixel and the reference pixels are outputted, the classification of the attribute referred to as the "boundary mode" with respect to the encoding pixel is effected in parallel.

The boundary-mode determining unit 11 outputs a 3-bit boundary mode and a threshold Th. Here, the threshold Th is given by the formula shown below (Formula 2) as a mean value of maximum pixel values and minimum pixel values of the reference pixels A to G, and is used for obtaining bi-level values for the reference pixels. The functions Max( ) and Min( ) are the same as those used in Formula 1. FIG. 19 shows a bi-level-transforming function Q( ), and the definition provided is such that if it is assumed that the pixels transformed into bi-level values by Q(A) to Q(G) are a to g, the pixel a invariably becomes 0.

$$Th = \{Max(A, B, C, D, E, F, G) + Min(A, B, C, D, E, F, G)\}/2 \quad (2)$$

Figure 20:
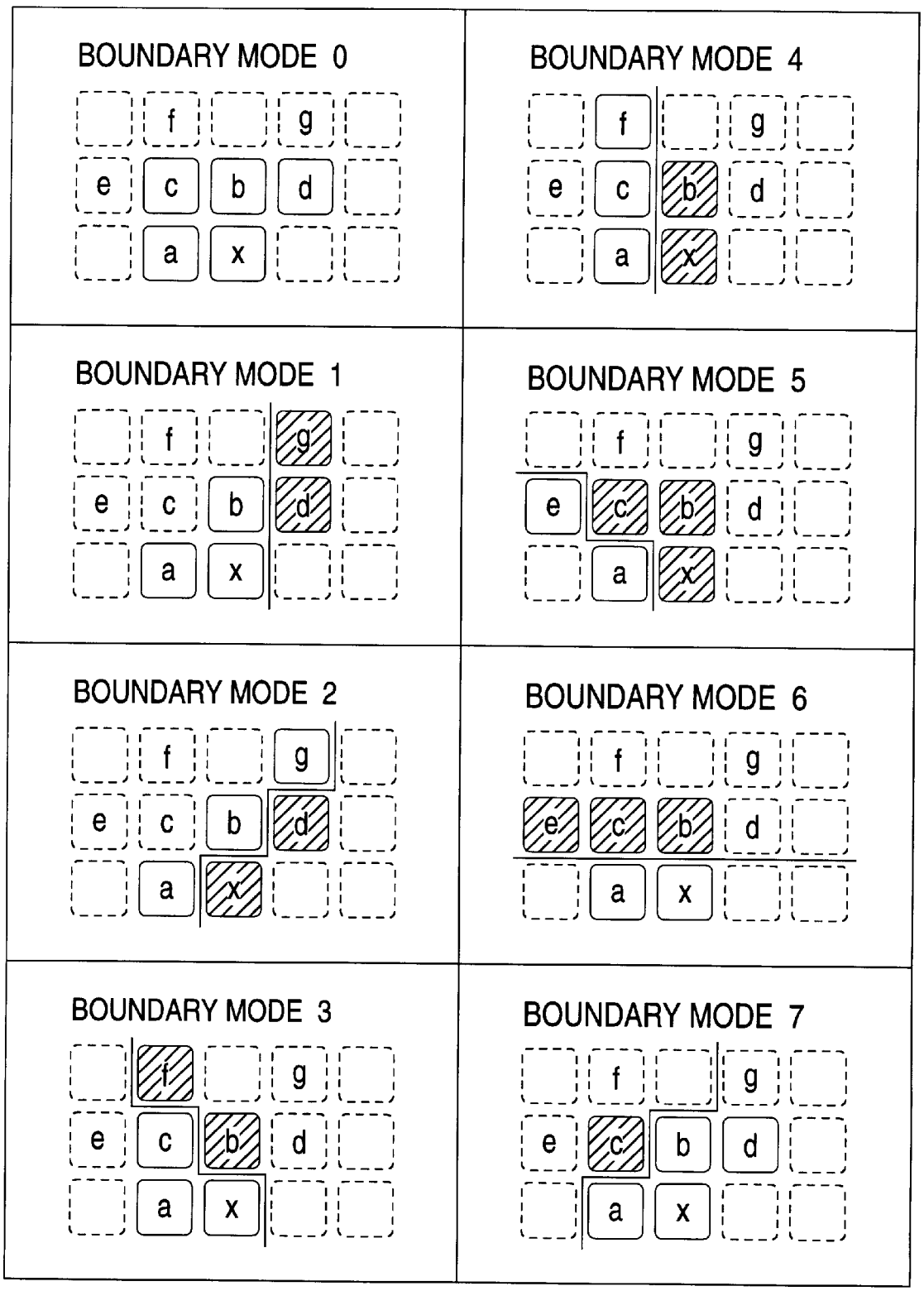

By means of the values of the reference pixels a to g thus transformed into bi-level values, the "presence or absence of a boundary neighboring the encoding pixel," the "direction of the boundary," and the "positional relationship with the boundary" are classified as shown in FIG. 20, and the boundary mode (BM) is determined in accordance with FIG. 21. The boundary mode 0 is set as a flat image area having no boundary, and is distinguished from an image area having a boundary. In FIG. 20, the boundary mode is determined from each bi-level reference pixel surrounded by the solid line, and the boundary is shown by the solid line together with a predicted value of the encoding pixel "x." In FIG. 21, the pixel indicated by mark "-" is a pixel which does not affect the boundary mode determination. Here, in FIGS. 20 and 21, the boundary modes are classified into 8 kinds (3 bits). However, it is also possible to adopt 128 (7-bit) boundary modes using the bi-level reference pixels a to g as they are, by using such methods as the classification of only the flat area and the boundary area (two kinds) and the classification at the boundary area based on only the boundary direction (five kinds: flat, vertical, horizontal, rightwardly slanting, and leftwardly slanting), or without classifying the presence or absence of the boundary, the direction, and the position.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 in accordance with a calculating expression for selecting the boundary mode (BM) by using only one row of the table shown in FIG. 22 on the basis of the already determined boundary mode (output from the boundary-mode determining unit 11).

[Encoding Operation 2-2; Second and Subsequent Predictions]

In the second and subsequent predictions, the adaptive predictor 12 determines a prediction string on the basis of the first prediction value and a binary threshold Th, and determines and outputs a prediction value in accordance with FIG. 23. In the drawing, prediction values are alternately distributed to both sides in rightward and leftward directions in the string. However, after a maximum value or a minimum value of the pixel has appeared with respect to one direction, an assignment only for the other direction is carried out.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, a binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 28:
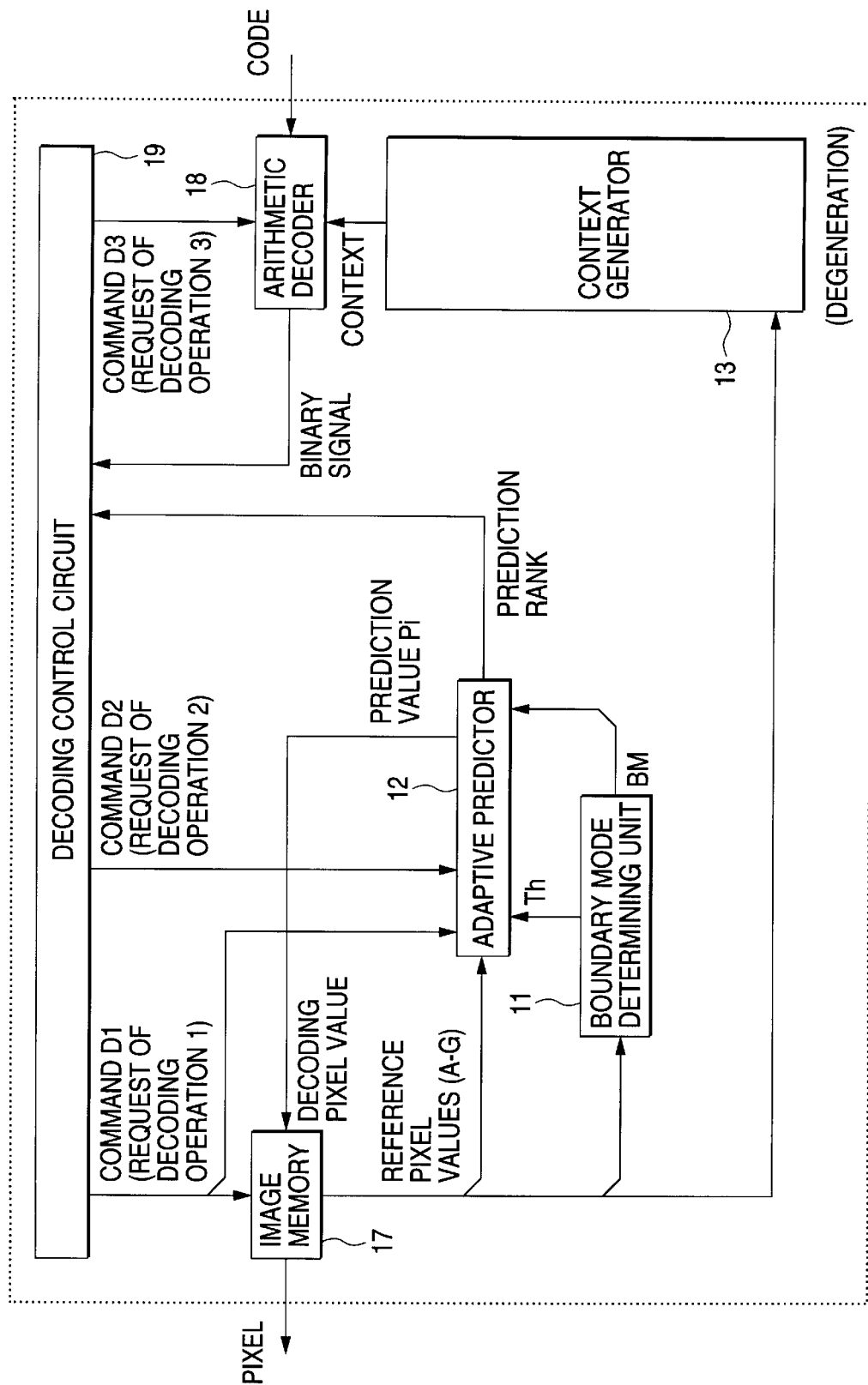
FIG. 28 is a block diagram of an image decoding apparatus according to the fourth embodiment of the invention.

Similarly, FIG. 28 shows a configuration of an image decoding apparatus which is an embodiment of the image decoding apparatus in accordance with the present invention. In the drawing, since the boundary-mode determining unit 11, the adaptive predictor 12, and the context generator 13 perform the same functions and operation as those of the image encoding apparatus described above, a description thereof will be omitted.

First, a description will be given of constituent elements of this embodiment.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (decoding means) for outputting a binary signal by performing arithmetic decoding on the basis of the code and the context outputted from the context generator 13 (context generating means) ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12 (prediction-value output means), and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 35:
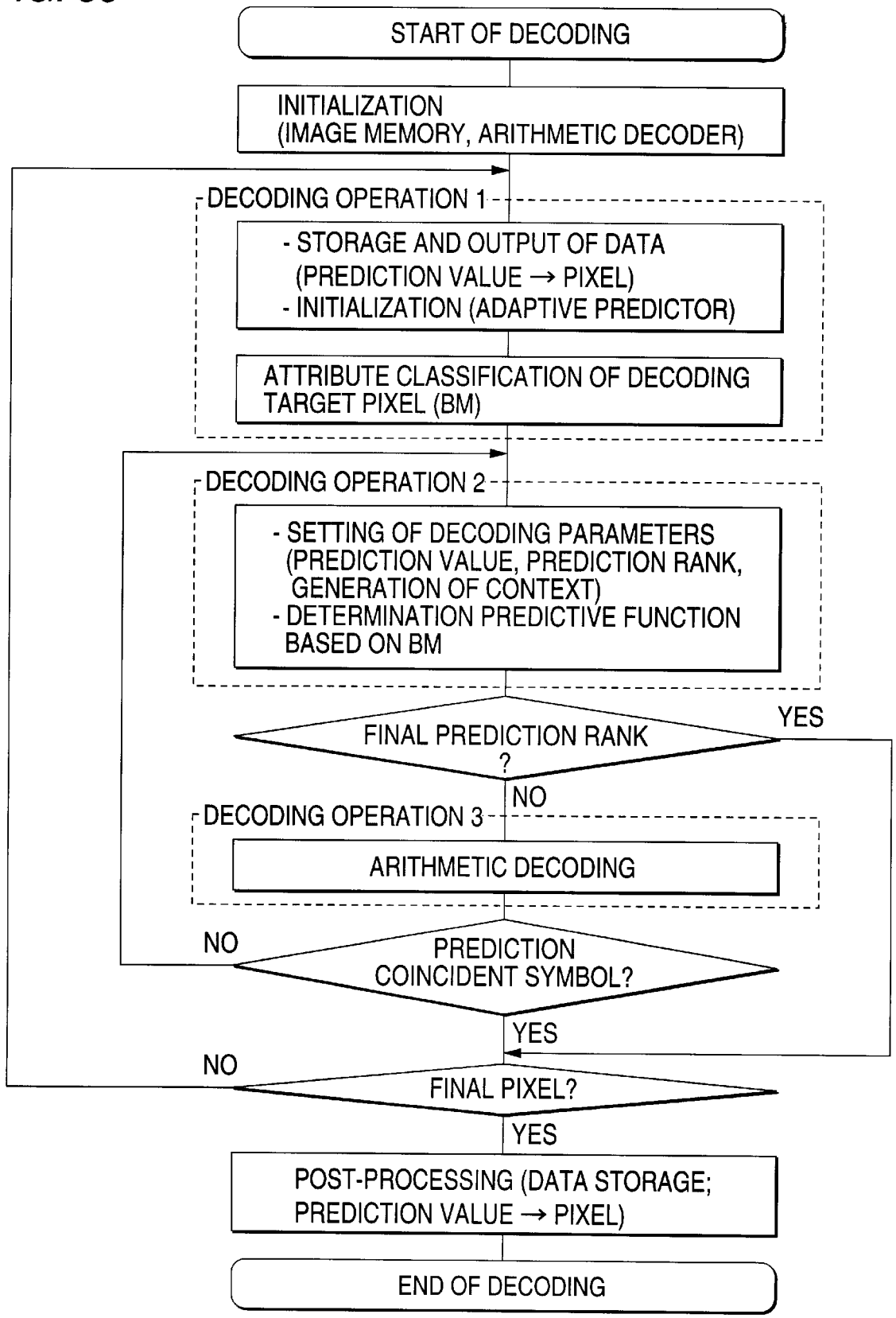
FIG. 35 is a flowchart showing the operation of the image decoding apparatus according to the fourth embodiment of the invention.

Next, a description will be given of the operation. Incidentally, a decoding flow diagram is shown in FIG. 35. The decoding control circuit 19 makes decisions on the conditions in the flow diagram, and controls the sequence of overall operation.

Although "initialization processing" and "post-processing" are described in this flow diagram, signals which command the two processing steps from the decoding control circuit are not illustrated in the block diagram shown in FIG. 28. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way as in the operation of the above-described image encoding apparatus (FIG. 17).

After the reference pixels are outputted, the classification of the attribute referred to as the "boundary mode" with respect to the encoding pixel is effected in parallel.

The boundary-mode determining unit 11 effects bi-level processing of the reference pixels (pixels a to g) by using as the threshold the mean value Th of the maximum pixel values and the minimum pixel values of the pixels A to G, determines the boundary mode, and outputs the same together with the threshold Th in the same way as in the operation of the above-described image encoding apparatus (Formula 2, FIGS. 19 and 20).

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value on the basis of the already determined boundary mode (output from the boundary-mode determining unit 11) in the same way as in the operation of the above-described image encoding apparatus (FIG. 22).

[Decoding Operation 2-2; Second and Subsequent Predictions]

In the second and subsequent predictions, the adaptive predictor 12 determines and outputs prediction values in the same way as in the operation of the above-described image encoding apparatus (FIG. 23).

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decoded pixel.

Thus, the prediction value outputted from the adaptive predictor 12 when the binary signal "coincidence (symbol '1')" is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, the boundary modes are classified which are determined on the basis of the degree of "tilting" of a local reference image area which in turn is determined from a maximum difference value, i.e., an index of the degree of "scattering (dispersion)" (obtained by such as extracting a boundary between the encoding pixel and the reference pixels) of the reference pixel values. Then, it is possible to change over the predictive function adaptively in pixel units in accordance with the classification thereof. As the predictive function is changed over, it is possible to bias the probability of coincidence of prediction toward ranges having high prediction ranks. Hence, it is possible to obtain an advantage in that the length of the predictively transformed binary signal string 0 . . . 01 can be shortened, thereby improving the encoding efficiency.

Fifth Embodiment

Figure 7:
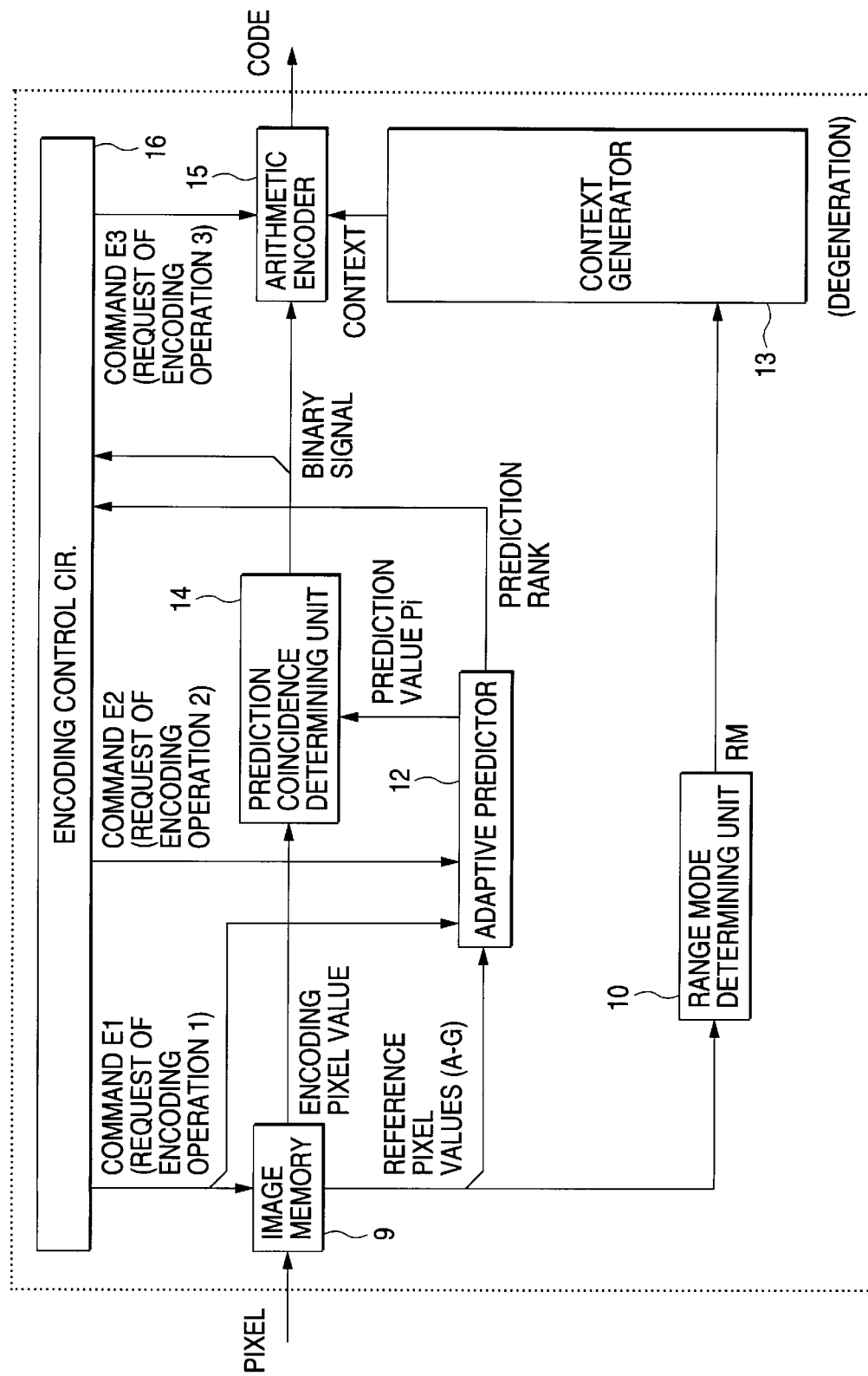
FIG. 7 is a block diagram of an image encoding apparatus according to a fifth embodiment of the invention.

FIG. 7 illustrates a configuration of an image encoding apparatus which is a still further embodiment of the present invention.

First, a description will be given of constituent elements of this embodiment.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 10 denotes the range-mode determining unit to which the reference pixels outputted from the image memory 9 are inputted, which determines maximum values and minimum values of the determined reference pixel values, and which determines a "range mode" from a maximum difference (dynamic range) of the reference pixel values by performing a calculation on the maximum values and the minimum values ("range-mode determining step). It should be noted that, in the range-mode determining step, the state of variation in the distribution of the reference pixels is detected in the aforementioned determination. For instance, a determination is made such that if the maximum difference in the reference pixel values is large, the variation in distribution is large, and that if the maximum difference in the reference pixel values is small, the variation in distribution is small.

Numeral 12 denotes the adaptive predictor (prediction value output means) which selects a predictive function based on the reference pixels outputted from the image memory 9, determines a prediction string corresponding to the encoding pixel, and repeatedly outputs the prediction values and their prediction ranks until the prediction value coincides with the encoding pixel value ("adaptive prediction step").

Numeral 13 denotes the context generator (context generating means) for outputting a "context," i.e., an encoding index in an arithmetic encoder (which will be described later), on the basis of the range mode outputted from the range-mode determining unit 10 ("context generating step").

Numeral 14 denotes the prediction-coincidence determining unit (comparing means) for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder ("prediction coincidence determining step").

Numeral 15 denotes the arithmetic encoder (encoding means) for outputting a "code" by performing arithmetic encoding on the basis of the binary signal outputted from the prediction-coincidence determining unit and the context outputted from the context generator 13 ("arithmetic encoding step").

Numeral 16 denotes the encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance by the range-mode determining unit, and the context is generated on the basis of the detected result, so that the encoding efficiency improves.

Figure 14:
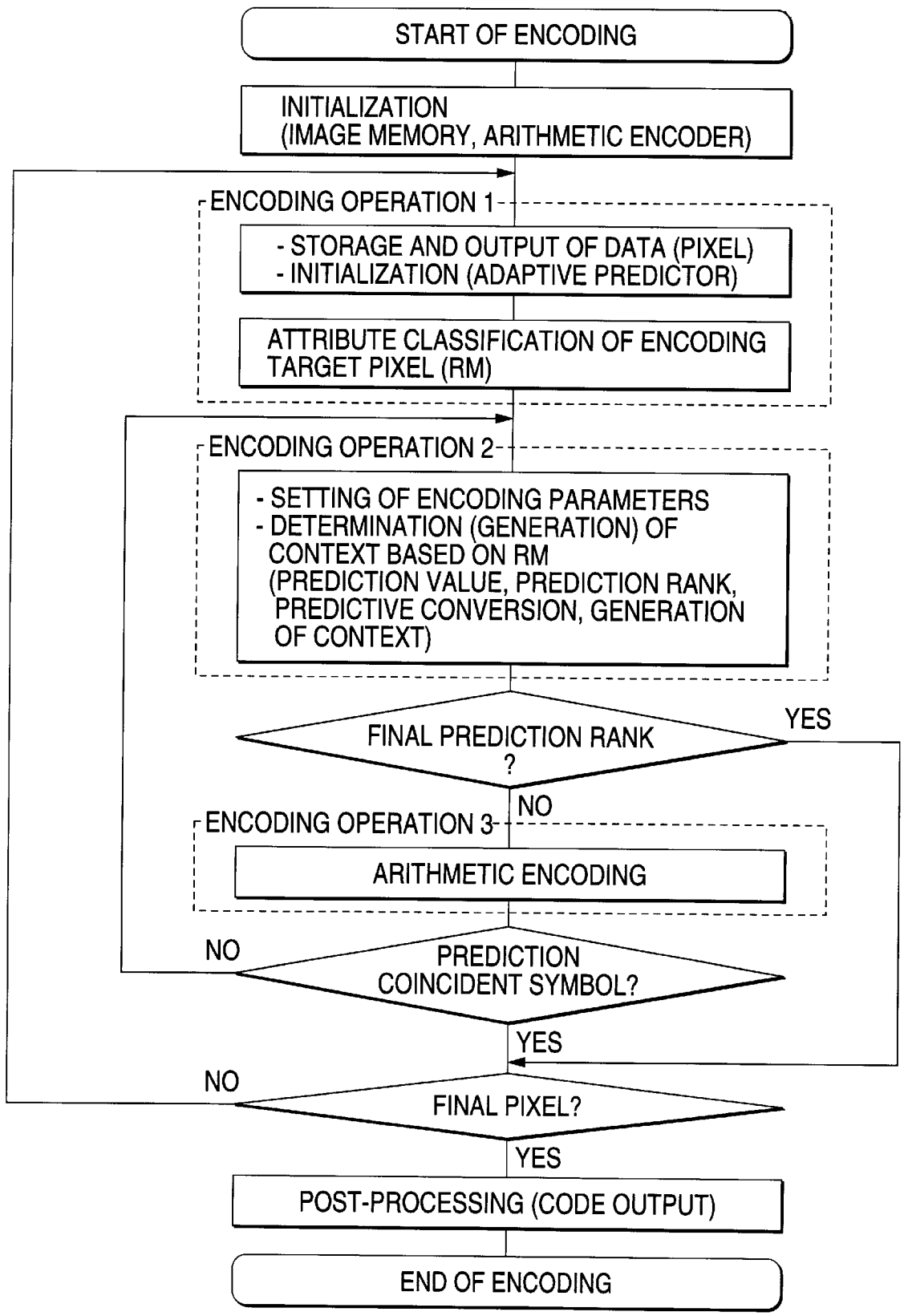
FIG. 14 is a flowchart showing the operation of the image encoding apparatus according to the fifth embodiment of the invention.

Next, a description will be given of the operation of the image encoding apparatus shown in FIG. 7 for effecting multi-image encoding. A flow diagram of encoding is shown in FIG. 14. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagram shown in FIG. 7. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the prediction rank at the time of starting the encoding of each pixel. The prediction rank is assumed to be a numerical value that is expressed as N−1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixel and the reference pixels are outputted, the classification of the attribute referred to as the "range mode" with respect to the encoding pixel is effected in parallel.

After the reference pixels are outputted from the image memory, the range-mode determining unit 10 calculates the maximum difference DR (dynamic range) according to Formula 1.

Although the value of the maximum difference DR thus determined may be adopted as it is as the range mode (RM), since the total number of modes becomes numerous, in this example it is assumed that 16 modes are provided in accordance with FIG. 18, and 4-bit range modes are outputted.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 in accordance with a predictive function on the basis of the reference pixels.

[Encoding Operation 2-2; Second and Subsequent Predictions]

In the second and subsequent predictions, the adaptive predictor 12 determines and outputs a prediction string (by using either one of the strings shown in FIG. 23) by starting with the first prediction value.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

In addition, the range mode (4 bits) outputted from the range-mode determining unit 10 is transformed into a 4-bit context by the context generator 13. Here, in this embodiment, the context is a fixed value with respect to the encoding of a series of binary signal strings for one encoding pixel.

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, a binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 29:
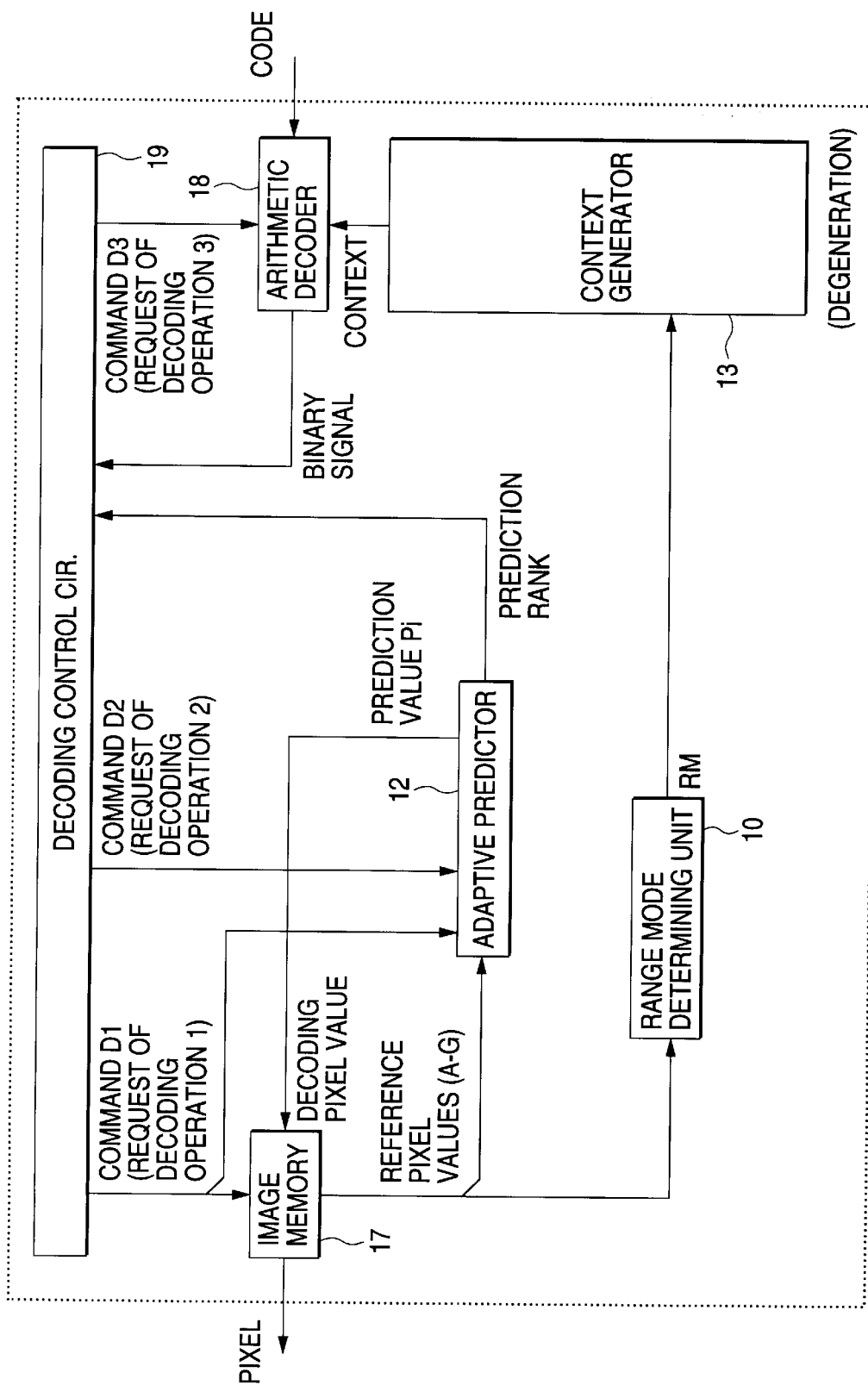
FIG. 29 is a block diagram of an image decoding apparatus according to the fifth embodiment of the invention.

Similarly, FIG. 29 shows a configuration of an image decoding apparatus which is an embodiment of the image decoding apparatus in accordance with the present invention. In the drawing, since the range-mode determining unit 10, the adaptive predictor 12, and the context generator 13 perform the same functions and operation as those of the image encoding apparatus described above, a description thereof will be omitted.

First, a description will be given of constituent elements of this embodiment.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (decoding means) for outputting a binary signal by performing arithmetic decoding on the basis of the code and the context outputted from the context generator 13 ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12 (predictive value output means), and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 36:
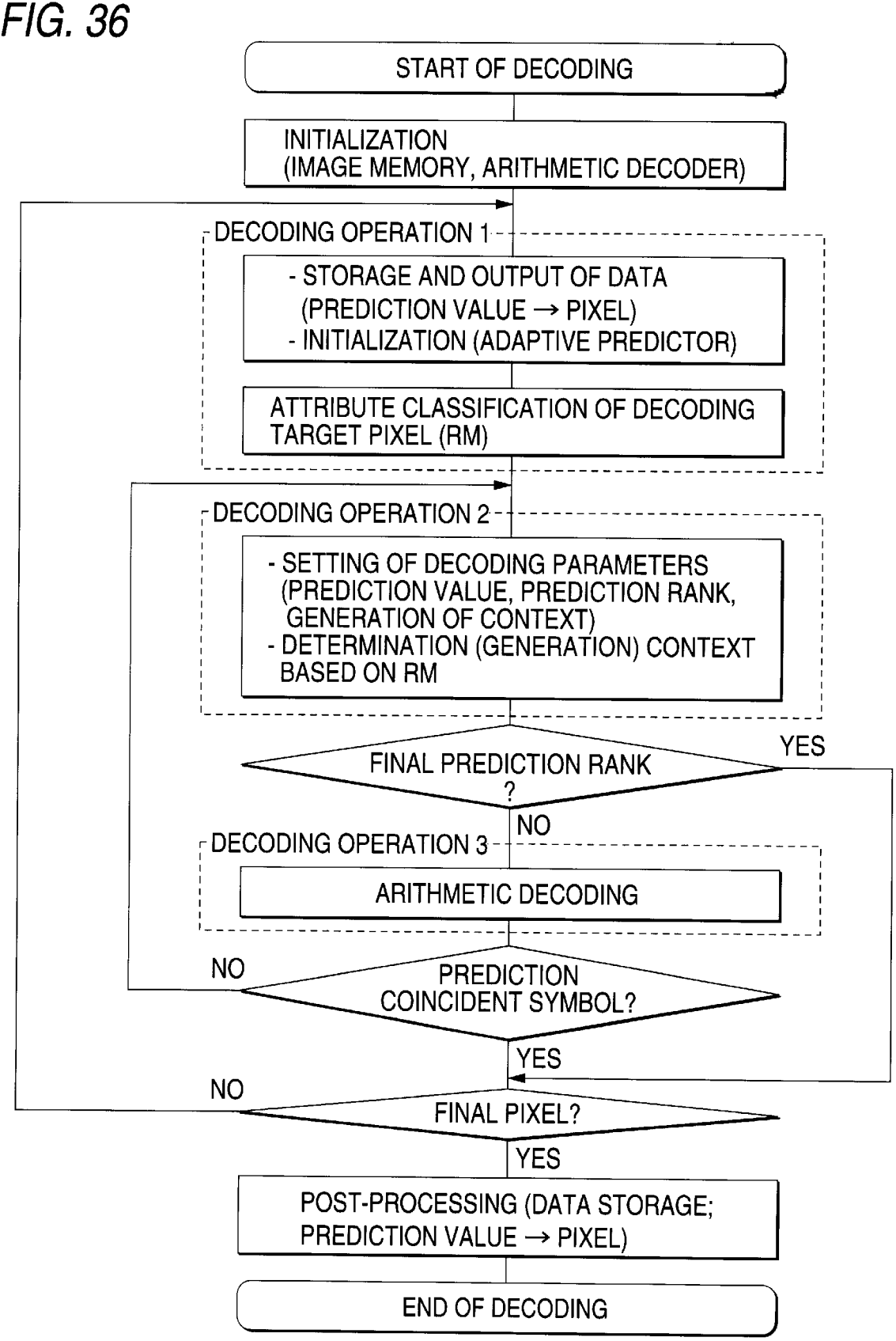
FIG. 36 is a flowchart showing the operation of the image decoding apparatus according to the fifth embodiment of the invention.

Next, a description will be given of the operation. Incidentally, a decoding flow diagram is shown in FIG. 36. The decoding control circuit 19 makes decisions on the conditions in the flow diagram, and controls the sequence of overall operation.

Although "initialization processing" and "post-processing" are described in this flow diagram, signals which command the two processing steps from the decoding control circuit are not illustrated in the block diagram shown in FIG. 29. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way as in the operation of the above-described image encoding apparatus (FIG. 17).

After the reference pixels are outputted, the classification of the attribute referred to as the "range mode" with respect to the encoding pixel is effected in parallel.

The range-mode determining unit 10 determines and outputs a range mode by calculating a maximum difference DR of the pixels A to G in the same way as in the operation of the above-described image encoding apparatus (Formula 1, FIG. 18).

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value.

[Decoding Operation 2-2; Second and Subsequent Predictions]

In the second and subsequent predictions, the adaptive predictor 12 determines and outputs prediction values in the same way as in the operation of the above-described image encoding apparatus.

The range mode RM (4 bits) outputted from the range-mode determining unit 10 is transformed into a 4-bit context by the context generator 13 in the same way as the encoder.

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decodes pixel.

Thus, the prediction value outputted from the adaptive predictor 12 when the binary signal "coincidence (symbol '1')" is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, it is possible to classify the range mode determined from a maximum difference value, i.e., an index of the degree of "scattering (dispersion)" of the reference pixel values, and to change over the context of encoding in accordance with the classification thereof. Consequently, it is possible to realize the assignment of code words which reflects the state of neighboring pixels, so that the encoding efficiency improves.

Sixth Embodiment

Figure 8:
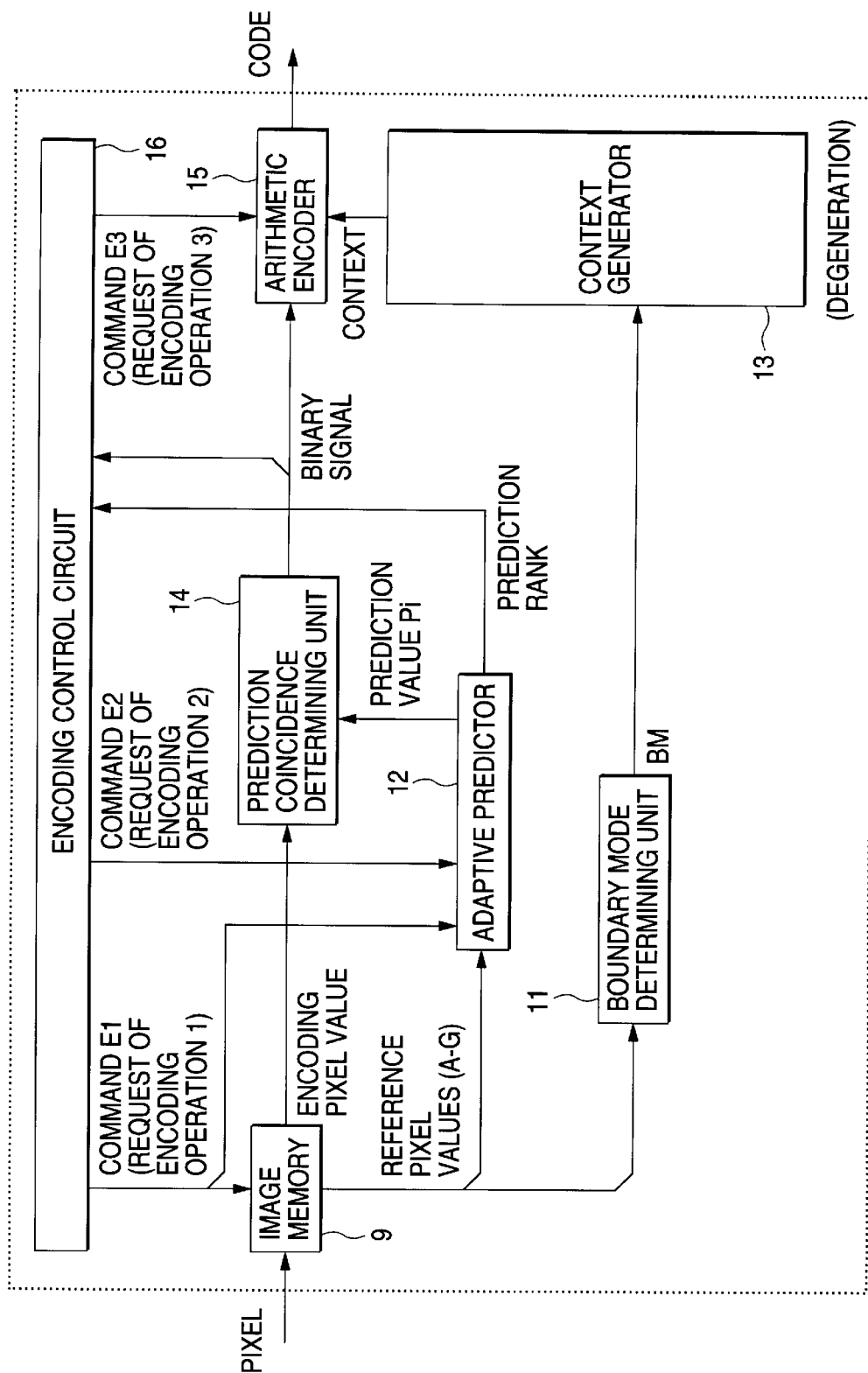
FIG. 8 is a block diagram of an image encoding apparatus according to a sixth embodiment of the invention.

FIG. 8 illustrates a configuration of an image encoding apparatus which is a further embodiment of the present invention.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 11 denotes a boundary-mode determining unit to which the reference pixels outputted from the image memory 9 are inputted to determine pixel values for the respective inputted reference pixels, and which determines a mean value from the pixel values, sets the determined mean value as a threshold for maximum pixel values and minimum pixel values, and makes a comparison between the threshold and each of the reference pixel values. The boundary-mode determining unit 11 transforms each reference pixel value into a bi-level value on the basis of the result of the comparison, outputs the "threshold" and determines a "boundary mode" ("boundary-mode determining step"). In other words, in the determination of the boundary mode, a pattern of distribution of reference pixels is selected in the above-described determination, and the selected pattern most closely resembles a prediction pattern of the encoding pixel.

Numeral 12 denotes the adaptive predictor which selects the reference pixels outputted from the image memory 9 and a predictive function, and predicts and outputs a first prediction value corresponding to the encoding pixel, and which then determines prediction strings of second and subsequent prediction values, and repeatedly outputs the prediction values and their prediction ranks until the prediction value coincides with the encoding pixel value ("adaptive prediction step").

Numeral 13 denotes the context generator (context generating means) for outputting a "context," i.e., an encoding index in an arithmetic encoder, on the basis of the boundary mode outputted from the boundary-mode determining unit 11 ("context generating step").

Numeral 14 denotes the prediction-coincidence determining unit for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder (which will be described later) ("prediction coincidence determining step").

Numeral 15 denotes the arithmetic encoder for outputting a "code" by performing arithmetic encoding on the basis of the binary signal outputted from the prediction-coincidence determining unit and the context outputted from the context generator 13 ("arithmetic encoding step").

Numeral 16 denotes the encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance (particularly a boundary between the encoding pixel and the reference pixels is extracted) by the boundary-mode determining means. Since the context generator 13 generates a context on the basis of the detected result, the encoding efficiency can be improved.

Figure 15:
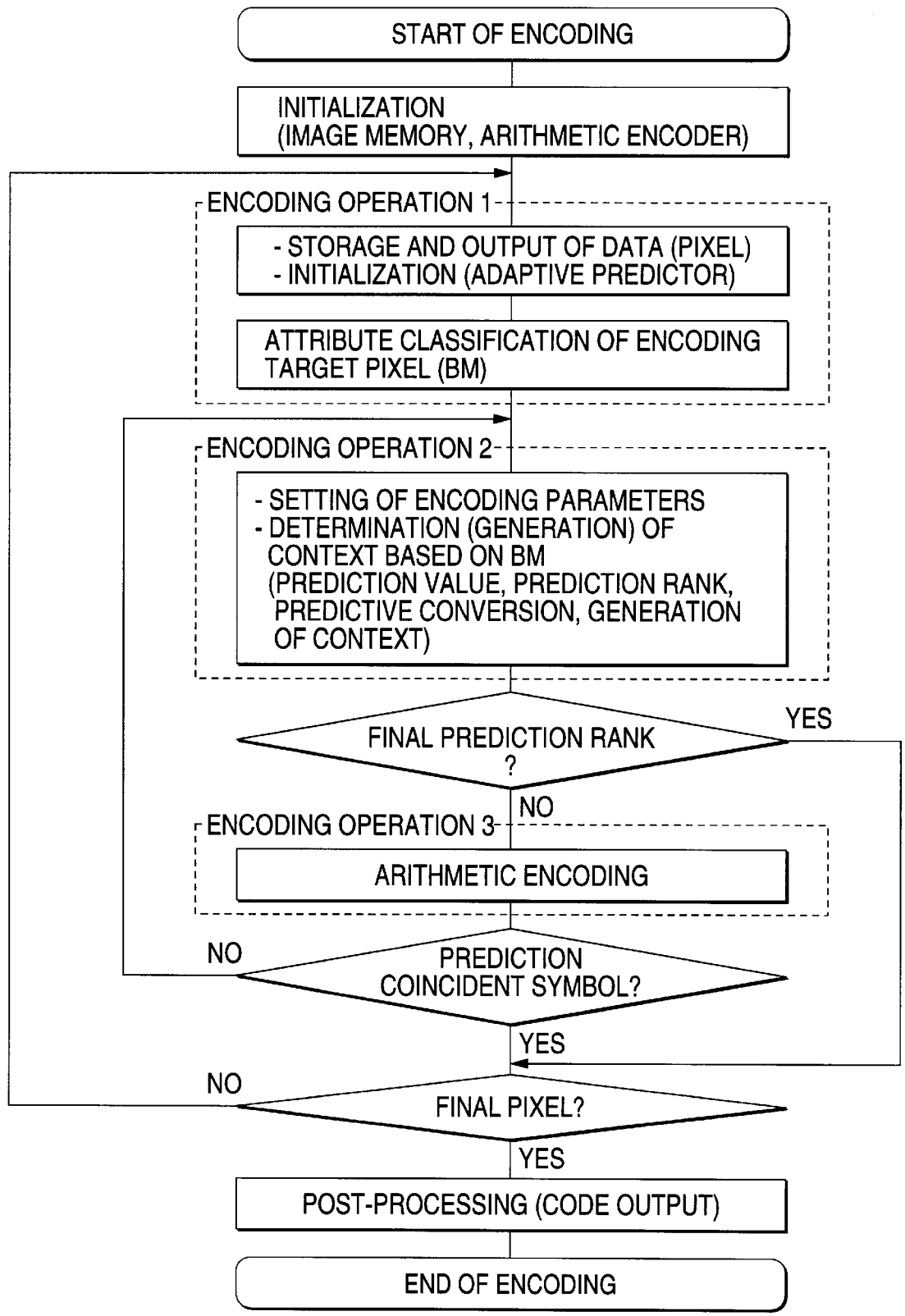
FIG. 15 is a flowchart showing the operation of the image encoding apparatus according to the sixth embodiment of the invention.

Next, a description will be given of the operation of the image encoding apparatus shown in FIG. 8 for effecting multi-image encoding. A flow diagram of encoding is shown in FIG. 15. The encoding control circuit 16 determines a condition in the flow diagram, and controls the sequence of the overall operation.

Although "initialization processing" and "post-processing" are described in this flow diagram, signals which command the two processing steps from the encoding control circuit are not illustrated in the block diagram shown in FIG. 8. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N−1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixel and the reference pixels are outputted, the classification of the attribute referred to as the "boundary mode" with respect to the encoding pixel is effected in parallel.

The boundary-mode determining unit 11 outputs a 3-bit boundary mode and a threshold Th. Here, the threshold Th is given by Formula 2 as a mean value of the maximum pixel values and minimum pixel values of the reference pixels A to G, and is used for obtaining bi-level values for the reference pixels. The functions Max( ) and Min( ) are the same as those used in Formula 1. FIG. 19 shows a bi-level-transforming function Q( ), and the definition provided is such that if it is assumed that the pixels transformed into bi-level values by Q(A) to Q(G) are a to g, the pixel a invariably becomes 0.

By means of the values of the reference pixels a to g thus transformed into bi-level values, the "presence or absence of a boundary neighboring the encoding pixel," the "direction of the boundary," and the "positional relationship with the boundary" are classified as shown in FIG. 20, and the boundary mode (BM) is determined in accordance with FIG. 21. The boundary mode 0 is set as a flat image area having no boundary, and is distinguished from an image area having a boundary. In FIG. 20, the boundary mode is determined from each bi-level reference pixel surrounded by the solid line, and the boundary is shown by the solid line together with a predicted value of the encoding pixel "x." In FIG. 21, the pixel indicated by mark "-" is a pixel which does not affect the boundary mode determination. Here, in FIGS. 20 and 21, the boundary modes are classified into 8 kinds (3 bits). However, it is also possible to adopt 128 (7-bit) boundary modes using the bi-level reference pixels a to g as they are, by using such methods as the classification of only the flat area and the boundary area (two kinds) and the classification at the boundary area based on only the boundary direction (five kinds: flat, vertical, horizontal, rightwardly slanting, and leftwardly slanting), or without classifying the presence or absence of the boundary, the direction, and the position.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 in accordance with a predictive function on the basis of the reference pixels.

[Encoding Operation 2-2; Second and Subsequent Predictions]

In the second and subsequent predictions, the adaptive predictor 12 determines and outputs a prediction string (by using either one of the strings shown in FIG. 23) by starting with the first prediction value.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

In addition, the boundary mode BM (3 bits) outputted from the boundary-mode determining unit 11 is transformed into a 3-bit context by the context generator 13.

Here, in this embodiment, the context is a fixed value with respect to the encoding of a series of binary signal strings for one encoding pixel.

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, a binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 30:
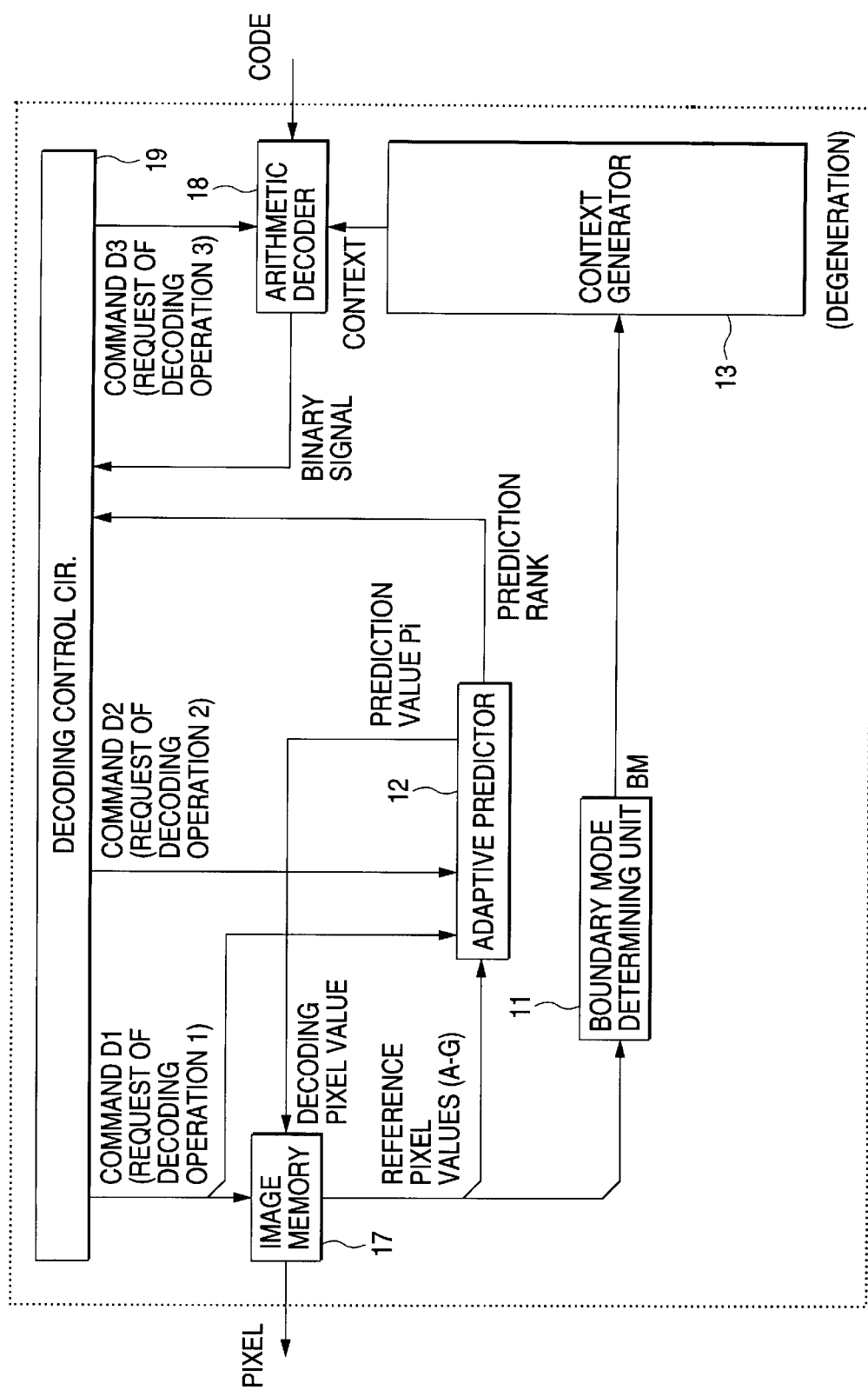
FIG. 30 is a block diagram of an image decoding apparatus according to the sixth embodiment of the invention.

Similarly, FIG. 30 shows a configuration of an image decoding apparatus which is an embodiment of the image decoding apparatus in accordance with the present invention. In the drawing, since the boundary-mode determining unit 11, the adaptive predictor 12, and the context generator 13 perform the same functions and operation as those of the image encoding apparatus described above, a description thereof will be omitted.

First, a description will be given of constituent elements of this embodiment.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (decoding means) for outputting a binary signal by performing arithmetic decoding on the basis of the code and the context outputted from the context generator 13 (context generating means) ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12, and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 37:
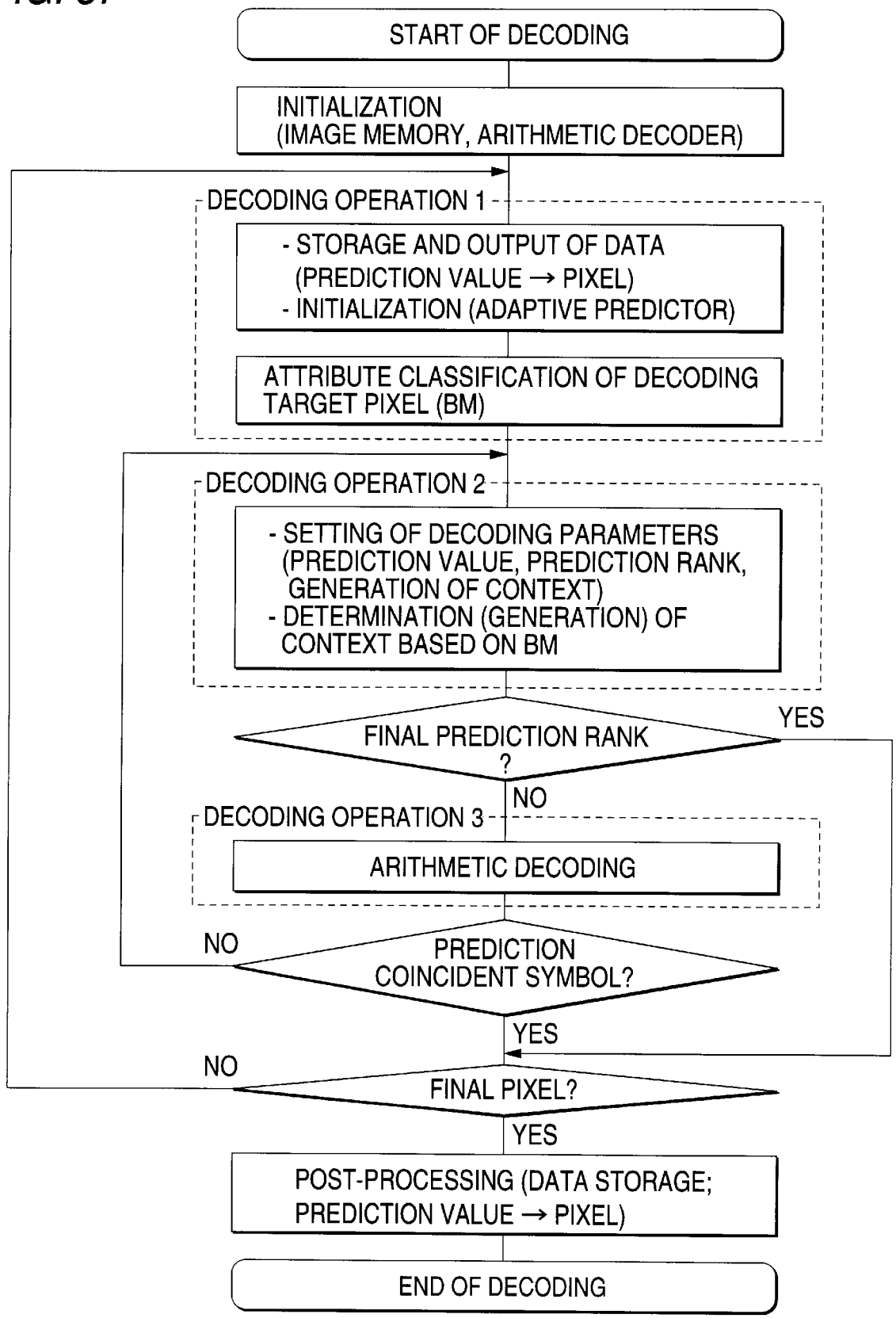
FIG. 37 is a flowchart showing the operation of the image decoding apparatus according to the sixth embodiment of the invention.

Next, a description will be given of the operation. Incidentally, a decoding flow diagram is shown in FIG. 37. The decoding control circuit 19 makes decisions on the conditions in the flow diagram, and controls the sequence of overall operation.

Although "initialization processing" and "post-processing" are described in this flow diagram, signals which command the two processing steps from the decoding control circuit are not illustrated in the block diagram shown in FIG. 30. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way as in the operation of the above-described image encoding apparatus (FIG. 17).

After the reference pixels are outputted, the classification of the attribute referred to as the "boundary mode" with respect to the encoding pixel is effected in parallel.

The boundary-mode determining unit 11 effects bi-level processing of the reference pixels (pixels a to g) by using as the threshold the mean value Th of the maximum pixel values and the minimum pixel values of the pixels A to G, determines the boundary mode, and outputs the same together with the threshold Th in the same way as in the operation of the above-described image encoding apparatus (Formula 2, FIGS. 19 and 20).

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value.

[Decoding Operation 2-2; Second and Subsequent Predictions]

In the second and subsequent predictions, the adaptive predictor 12 determines and outputs prediction values in the same way as in the operation of the above-described image encoding apparatus.

The boundary mode BM (3 bits) outputted from the boundary-mode determining unit 11 is transformed into a 3-bit context by the context generator 13 in the same way as the encoder.

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decoded pixel.

Thus, the prediction value outputted from the adaptive predictor 12 when the binary signal "coincidence (symbol '1')" is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, it is possible to classify the boundary mode determined from the degree of "tilting" of a local reference image area, and to change over the context concerning encoding in pixel units in accordance with the classification thereof. Consequently, it is possible to assign code words in correspondence with neighboring pixels, so that the encoding efficiency improves.

Seventh Embodiment

Figure 9:
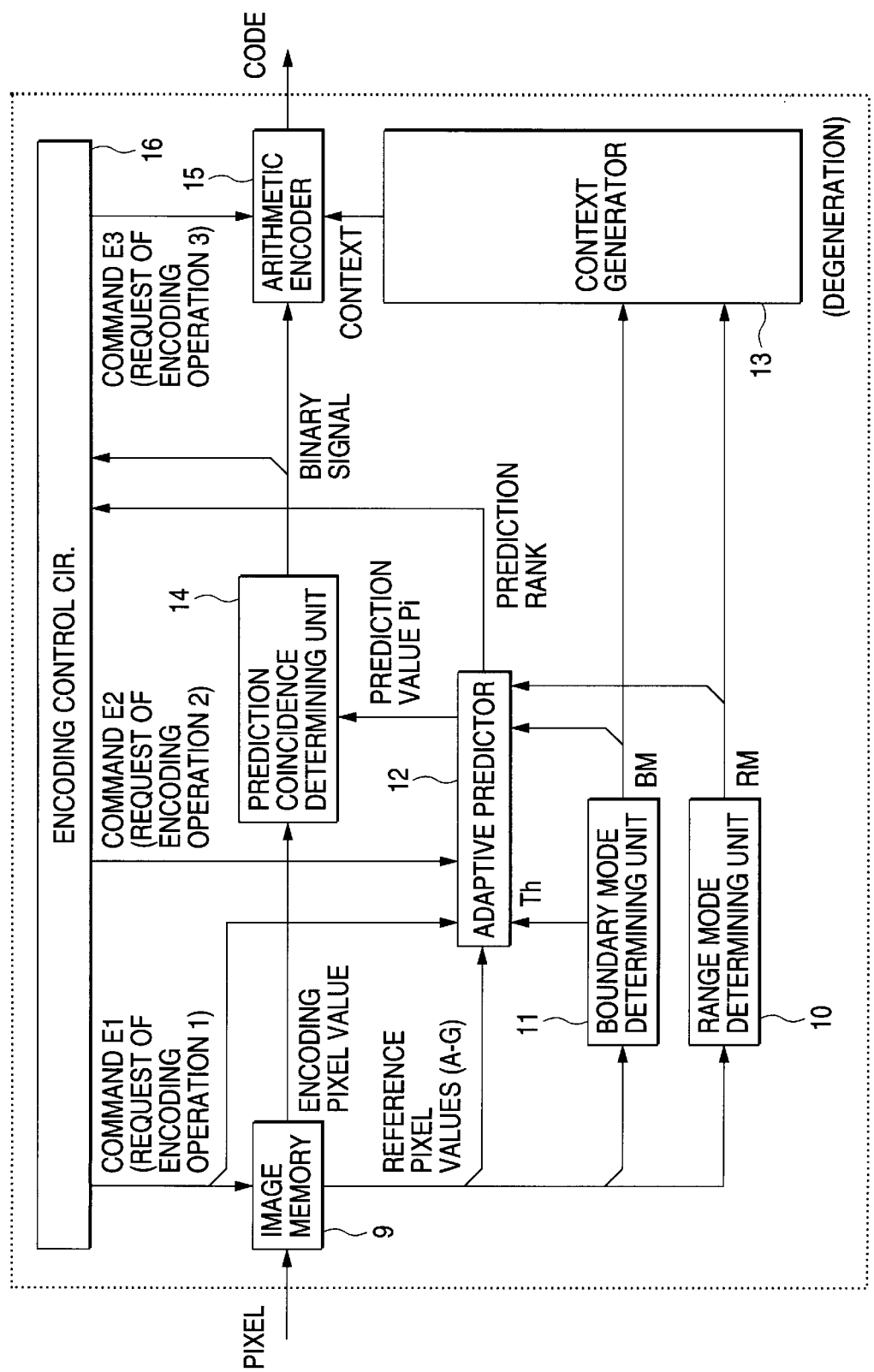
FIG. 9 is a block diagram of an image encoding apparatus according to a seventh embodiment of the invention.

FIG. 9 illustrates a configuration of an image encoding apparatus which is a further embodiment of the present invention.

Reference numeral 9 denotes the image memory (image output means) for storing multi-level pixels and outputting each encoding pixel and one or a plurality of arbitrary stored pixels (at a particular position or positions) in the vicinity of that encoding pixel or neighboring the same as a reference pixel or pixels ("pixel storing and referring step").

Numeral 10 denotes the range-mode determining unit to which the reference pixels outputted from the image memory 9 are inputted, which determines maximum values and minimum values of the determined reference pixel values, and which determines a "range mode" from a maximum difference (dynamic range) of the reference pixel values by performing a calculation on the maximum values and the minimum values ("range-mode determining step). It should be noted that, in the range-mode determining step, the state of variation in the distribution of the reference pixels is detected in the aforementioned determination. For instance, a determination is made such that if the maximum difference in the reference pixel values is large, the variation in distribution is large, and that if the maximum difference in the reference pixel values is small, the variation in distribution is small.

Numeral 11 denotes the boundary-mode determining unit to which the reference pixels outputted from the image memory 9 are inputted to determine pixel values for the respective inputted reference pixels, and which determines a mean value from the pixel values, sets the determined mean value as a threshold for maximum pixel values and minimum pixel values, and makes a comparison between the threshold and each of the reference pixel values. The boundary-mode determining unit 11 transforms each reference pixel value into a bi-level value on the basis of the result of the comparison, outputs the "threshold" and determines a "boundary mode" ("boundary-mode determining step). In other words, in the determination of the boundary mode, a pattern of distribution of reference pixels is selected in the above-described determination, and the selected pattern most closely resembles a prediction pattern of the encoding pixel.

Numeral 12 denotes the adaptive predictor which selects a predictive function based on the reference pixels outputted from the image memory 9, the range mode outputted from the range-mode determining unit 10, and the boundary mode outputted from the boundary-mode determining unit 11, and predicts and outputs a first prediction value corresponding to the encoding pixel. The adaptive predictor 12 then determines prediction strings of second and subsequent prediction values from the values of bi-level reference pixels outputted from the boundary-mode determining unit 11, and repeatedly outputs the prediction values and their prediction ranks until the prediction value coincides with the encoding pixel value ("adaptive prediction step").

Numeral 13 denotes the context generator for outputting a "context," i.e., an encoding index in an arithmetic encoder, on the basis of the range mode outputted from the range-mode determining unit 10 and the boundary mode outputted from the boundary-mode determining unit 11 ("context generating step").

Numeral 14 denotes the prediction-coincidence determining unit for determining a coincidence between the encoding pixel value outputted from the image memory 9 and the prediction value outputted from the adaptive predictor 12, transforms the coincidence or non-coincidence into a "binary signal" representing the coincidence or non-coincidence, and outputs the same as being subject to encoding by the arithmetic encoder ("prediction coincidence determining step").

Numeral 15 denotes the arithmetic encoder for outputting a "code" by performing arithmetic encoding on the basis of the binary signal outputted from the prediction-coincidence determining unit and the context outputted from the context generator 13 ("arithmetic encoding step").

Numeral 16 denotes the encoding control circuit for controlling the processing sequence of execution of the storage of encoding pixels and updating of reference pixels in the image memory 9, the updating of a prediction value output in the adaptive predictor 12, and the encoding of the binary signal in the arithmetic encoder 15, on the basis of the coincidence or non-coincidence (an immediately previous binary signal) outputted from the prediction-coincidence determining unit 14 and the rank of prediction outputted from the adaptive predictor 12 ("encoding control step"). It should be noted that, in this embodiment, the state of distribution of reference pixels is detected in advance by the boundary-mode determining unit and the range-mode determining unit, and the prediction coincidence determining step and the arithmetic encoding step are controlled on the basis of the result of this detection. Consequently, it is possible to detect the coincidence in a short period of time in the determination of coincidence or non-coincidence.

Figure 16:
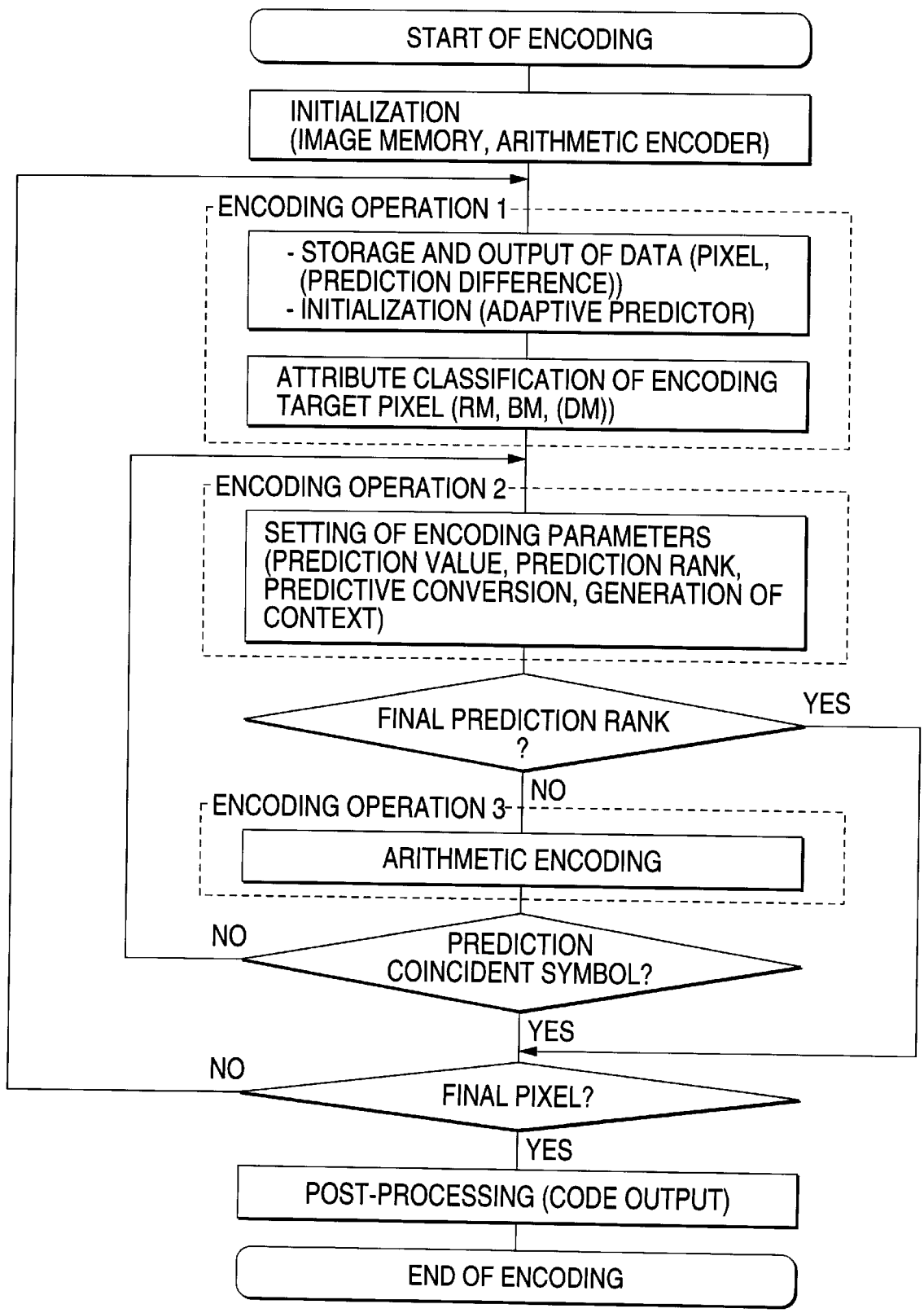
FIG. 16 is a flowchart showing the operation of the image encoding apparatus according to the seventh embodiment of the invention.

Next, a description will be given of the operation of the image encoding apparatus shown in FIG. 9 for effecting multi-image encoding. A flow diagram of encoding is shown in FIG. 16. The encoding control circuit 16 determines a condition in the flow diagram, and controls the sequence of the overall operation. In the drawing, the "prediction difference memory," the "prediction difference," and "DM" are not used in this embodiment.

Although "initialization processing" and "post-processing" are described in this flow diagram, signals which command the two processing steps from the encoding control circuit are not illustrated in the block diagram shown in FIG. 9. At the start of encoding, it is necessary to effect the "initialization processing" of the image memory 9 and the arithmetic encoder 15. In addition, at the completion of the encoding, code sweeping is carried out as the "post-processing" of the arithmetic encoder 15. The "encoding process" excluding "initialization processing" and "post-processing" will be described below, by classifying its basic operation into "encoding operation 1," "encoding operation 2," and "encoding operation 3."

[Encoding Operation 1]

First, the encoding control circuit 16 commands the image memory 9 to store pixels subject to encoding (hereafter referred to as the encoding pixels) (command E1). At the same time, the encoding control circuit 16 commands the adaptive predictor 12 to effect the initialization of the rank of adaptive prediction (hereafter referred to as the prediction rank) at the time of starting the encoding of each pixel. The prediction rank is assumed to be a numerical value that is expressed as N−1 for an Nth prediction value.

The image memory 9 outputs the accumulated encoding pixels and reference pixels A to G shown in FIG. 17 (in a case where seven pixels are referred to). It is necessary to provide a common measure for the encoder and the decoder, such as by setting the values of reference pixels other than the image as 0's.

After the encoding pixel and the reference pixels are outputted, the classification of the attributes referred to as the "range mode" and the "boundary mode" with respect to the encoding pixel is effected in parallel.

After the reference pixels are outputted from the image memory, the range-mode determining unit 10 calculates the maximum difference DR (dynamic range) according to Formula 1.

Although the value of the maximum difference DR thus determined may be adopted as it is as the range mode (RM), since the total number of modes becomes numerous, in this example it is assumed that 16 modes are provided in accordance with FIG. 18, and 4-bit range modes are outputted.

The boundary-mode determining unit 11 outputs a 3-bit boundary mode and a threshold Th. Here, the threshold Th is given by Formula 2 as a mean value of maximum pixel values and minimum pixel values of the reference pixels A to G, and is used for obtaining bi-level values of the reference pixels. The functions Max( ) and Min( ) are the same as those used in Formula 1. FIG. 19 shows a bi-level-transforming function Q( ), and the definition provided is such that if it is assumed that the pixels transformed into bi-level values by Q(A) to Q(G) are a to g, the pixel a invariably becomes 0.

By means of the values of the reference pixels a to g thus transformed into bi-level values, the "presence or absence of a boundary neighboring the encoding pixel," the "direction of the boundary," and the "positional relationship with the boundary" are classified as shown in FIG. 20, and the boundary mode (BM) is determined in accordance with FIG. 21. The boundary mode 0 is set as a flat image area having no boundary, and is distinguished from an image area having a boundary. In FIG. 20, the boundary mode is determined from each bi-level reference pixel surrounded by the solid line, and the boundary is shown by the solid line together with a predicted value of the encoding pixel "x." In FIG. 21, the pixel indicated by "-" is a pixel which does not affect the boundary mode determination. Here, in FIGS. 20 and 21, the boundary modes are classified into 8 kinds (3 bits). However, it is also possible to adopt 128 (7 bits) boundary modes using the bi-level reference pixels a to g as they are, by using such methods as the classification of only the flat area and the boundary area (two kinds) and the classification at the boundary area based on only the boundary direction (five kinds: flat, vertical, horizontal, rightwardly slanting, and leftwardly slanting), or without classifying the presence or absence of the boundary, the direction, and the position.

[Encoding Operation 2]

The encoding control circuit 16 commands the adaptive predictor 12 to output the prediction values and the prediction rank (command E2). In addition, the context generator 13 outputs a context, and the prediction-coincidence determining unit 14 outputs a binary signal. These processes are effected in parallel.

[Encoding Operation 2-1; First Prediction]

In the first prediction, the adaptive predictor 12 calculates and outputs a first prediction value P1 in accordance with a calculating expression shown in FIG. 22 on the basis of the range mode (output from the range-mode determining unit 10) and the boundary mode (output from the boundary-mode determining unit 11) which have already been determined.

[Encoding Operation 2-2; Second and Subsequent Predictions]

In the second and subsequent predictions, the adaptive predictor 12 determines a prediction string on the basis of the first prediction value and a binary threshold Th, and determines and outputs a prediction value in accordance with FIG. 23. In the drawing, prediction values are alternately distributed to both sides in rightward and leftward directions in the string. However, after a maximum value or a minimum value of the pixel has appeared with respect to one direction, an assignment only for the other direction is carried out.

The prediction value outputted from the adaptive predictor 12 is compared by the prediction-coincidence determining unit 14 with an encoding pixel value outputted from the image memory 9. In the case of the "coincidence" (equal), the result of comparison is converted to a binary signal represented by the symbol "1," and in the case of the "non-coincidence" (not equal), the result of comparison is converted to a binary signal represented by the symbol "0."

In addition, the range mode (4 bits) outputted from the range-mode determining unit 10 and the boundary mode BM (3 bits) outputted from the boundary-mode determining unit 11 are transformed into a 7-bit context by the context generator 13. This context value CX is calculated in accordance with the formula shown below (Formula 3). The operator "<<" means that the bi-level value on the left-hand side thereof is shifted to higher orders by the digit number on the right-hand side thereof.

$$CX = (RM << 3) + BM \quad (3)$$

Here, in this embodiment, the context is a fixed value with respect to the encoding of a series of binary signal strings for one encoding pixel.

[Encoding Operation 3]

The encoding control circuit 16 commands the arithmetic encoder 15 to effect arithmetic encoding on the basis of the binary signal and the context, i.e., a encoding index thereof (command E3).

[Encoding Operations 2 and 3; Up to Completion of Pixel Encoding]

The encoding control circuit 16 repeatedly issues the "command E2" and the "command E3" until the prediction-coincidence determining unit 14 determines the binary signal ["coincidence"], and its symbol "1" is encoded by the arithmetic encoder 15, thereby realizing the encoding of one multi-level pixel as binary encoding processing.

That is, a binary signal string such as the one shown in FIG. 24 is encoded for one multi-level encoding pixel. If this encoding pixel "coincides" with the Nth prediction value, a binary signal string 0 . . . 01 having a string length of N is encoded for the pixel. However, in a case where all the prediction values have appeared, and the encoding pixel "coincides" at the end of the string, it is self-evident that a "coincidence" is invariably obtained, it is possible to omit the encoding of the final binary signal "1."

In the above-described manner, the encoding control circuit 16 conducts the binary signal processing and encoding of multi-level pixels for all the pixels of the image.

Figure 31:
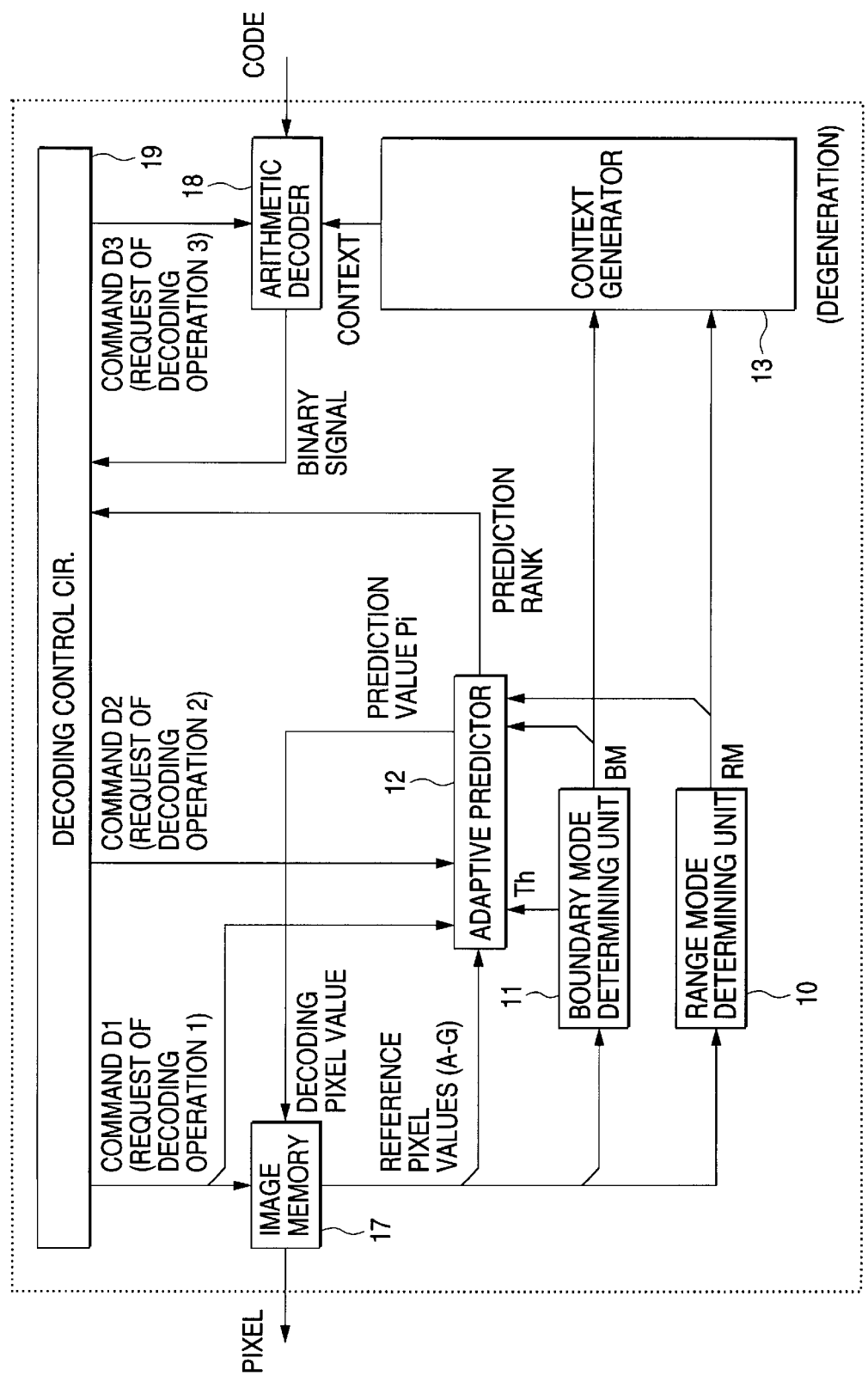
FIG. 31 is a block diagram of an image decoding apparatus according to the seventh embodiment of the invention.

Similarly, FIG. 31 shows a configuration of an image decoding apparatus which is an embodiment of the image decoding apparatus in accordance with the present invention. In the drawing, since the range-mode determining unit 10, the boundary-mode determining unit 11, the adaptive predictor 12, and the context generator 13 perform the same functions and operation as those of the image encoding apparatus described above, a description thereof will be omitted.

Reference numeral 17 denotes the image memory (image output means) for outputting one or a plurality of arbitrary stored pixels (at a particular position or positions) in the vicinity of a decoding pixel or neighboring the same as a reference pixel or pixels prior to decoding, and for storing the decoded multi-level pixels ("pixel storing and referring step").

Numeral 18 denotes the arithmetic decoder (decoding means) for outputting a binary signal by performing arithmetic decoding on the basis of the code and the context outputted from the context generator 13 ("arithmetic decoding step").

Numeral 19 denotes the decoding control circuit (decoding control means) for controlling the processing sequence of execution of the storage of a decoded pixel and updating of reference pixels in the image memory 17, the updating of a prediction value output in the adaptive predictor 12, and the decoding of the binary signal in the arithmetic decoder 18, on the basis of the coincidence or non-coincidence indicated by the binary signal decoded immediately previously and the prediction rank outputted from the adaptive predictor 12 ("decoding control step").

Figure 38:
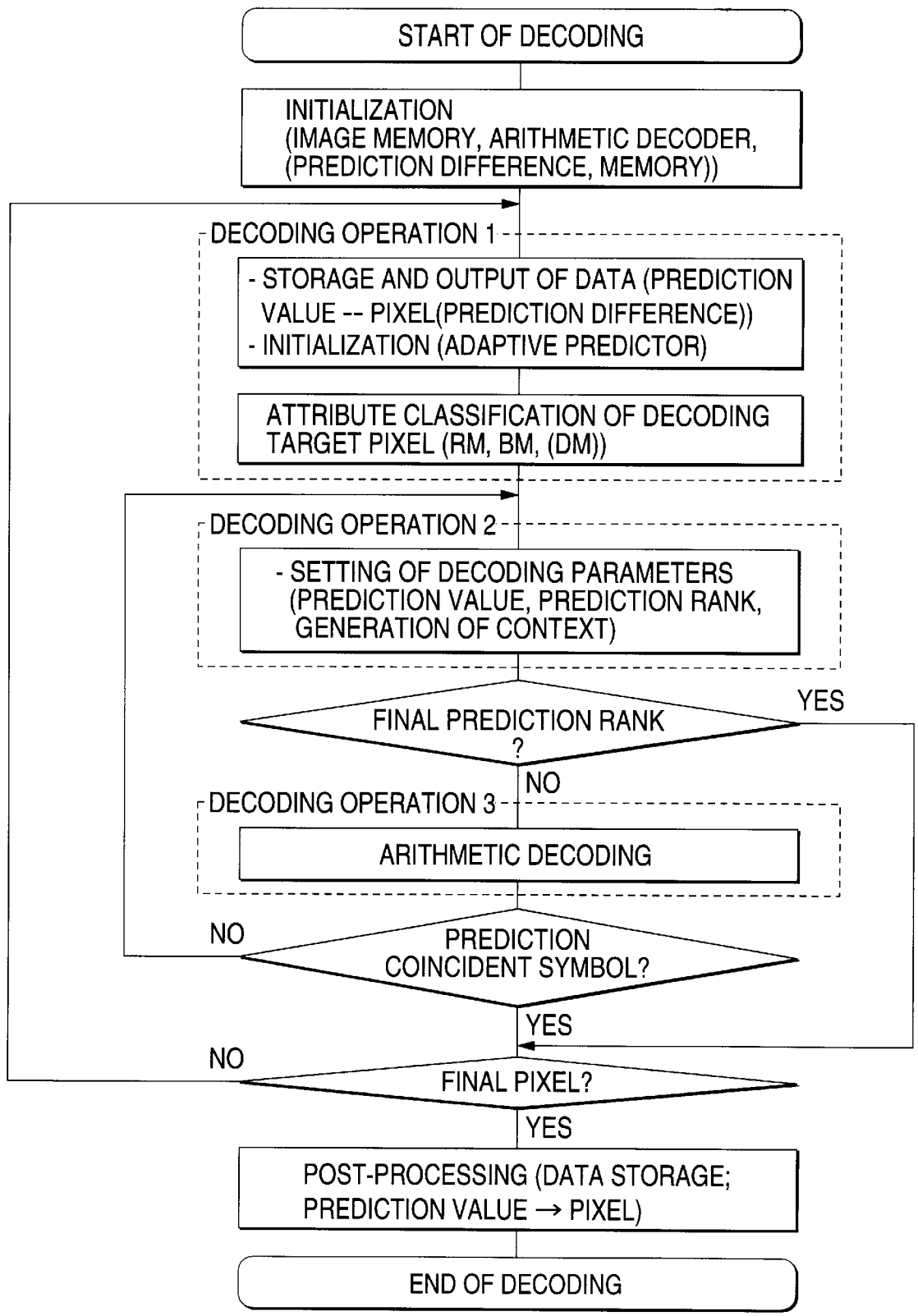
FIG. 38 is a flowchart showing the operation of the image decoding apparatus according to the seventh embodiment of the present invention.

Next, a description will be given of the operation. Incidentally, a decoding flow diagram is shown in FIG. 38. The decoding control circuit 19 makes decisions on the conditions in the flow diagram, and controls the sequence of overall operation. In the drawing, the "prediction difference memory," the "prediction difference," and "DM" are not used in this embodiment.

Although "initialization processing" and "post-processing" are described in this flow diagram, signals which command the two processing steps from the decoding control circuit are not illustrated in the block diagram shown in FIG. 31. At the start of decoding, it is necessary to effect the "initialization processing" of the image memory 17 and the arithmetic decoder 18. In addition, at the completion of the decoding, the storage of a final pixel is carried out as "post-processing." The "decoding process" excluding "initialization processing" and "post-processing" will be described below, by classifying its basic operation into "decoding operation 1," "decoding operation 2," and "decoding operation 3."

[Decoding Operation 1]

First, the decoding control circuit 19 commands the image memory 17 to store a pixel subject to decoding (hereafter referred to as a decoded pixel) (command D1). Also, the decoding control circuit 19 commands the adaptive predictor 12 to effect the initialization of the prediction rank at the time of starting the decoding of each pixel. The pixel which is stored is an immediately previous decoded pixel, and is a prediction value (output from the adaptive predictor 12) when the binary signal "coincidence ('1')" is decoded by the arithmetic decoder 18.

Since the storage processing lags by a portion of one pixel with respect to the decoding of the pixels, at the start of decoding it suffices to effect only the initialization of the adaptive predictor 12, and the storage of the pixel is unnecessary. Similarly, at the completion of decoding, it is necessary to store a final decoded pixel.

The image memory 17 outputs the reference pixels A to G in the same way as in the operation of the above-described image encoding apparatus (FIG. 17).

After the reference pixels are outputted, the classification of the attributes referred to as the "range mode" and the "boundary mode" with respect to the encoding pixel is effected in parallel.

The range-mode determining unit 10 determines and outputs a range mode by calculating a maximum difference DR of the pixels A to G in the same way as in the operation of the above-described image encoding apparatus (Formula 1, FIG. 18).

The boundary-mode determining unit 11 effects bi-level processing of the reference pixels (pixels a to g) by using as the threshold the mean value Th of the maximum pixel values and the minimum pixel values of the pixels A to G, determines the boundary mode, and outputs the same together with the threshold Th in the same way as in the operation of the above-described image encoding apparatus (Formula 1, FIGS. 19 and 20).

[Decoding Operation 2]

The decoding control circuit 19 commands the adaptive predictor 12 to output the prediction values and the prediction rank (command D2). In addition, the context generator 13 outputs a context.

[Decoding Operation 2-1; First Prediction]

In the first prediction, the adaptive predictor 12 calculates and outputs a first prediction value on the basis of the already determined boundary mode (output from the boundary-mode determining unit 11) in the same way as in the operation of the above-described image encoding apparatus (FIG. 22).

[Decoding Operation 2-2; Second and Subsequent Predictions]

In the second and subsequent predictions, the adaptive predictor 12 determines and outputs prediction values in the same way as in the operation of the above-described image encoding apparatus (FIG. 23).

The range mode RM (4 bits) outputted from the range-mode determining unit 10 and the boundary mode BM (3 bits) outputted from the boundary-mode determining unit 11 are transformed into a 7-bit context by the context generator 13 in the same way as the encoder (Formula 3).

[Decoding Operation 3]

The decoding control circuit 19 commands the arithmetic decoder 18 to effect arithmetic decoding on the basis of the encoded signal encoded by the encoding apparatus and the context, i.e., a decoding index for the binary signal to be decoded (command D3).

[Decoding Operations 2 and 3; Up to Completion of Pixel Decoding]

The decoding control circuit 19 repeatedly issues the "command D2" and the "command D3" until the binary signal "coincidence" (symbol '1') is decoded by the arithmetic decoder 18, thereby realizing the decoding of one multi-level pixel as binary decoding processing.

That is, the adaptive predictor 12 generates a prediction value in synchronism with the timing at which the binary signal is generated, and the prediction value generated by the adaptive predictor 12 at the timing of occurrence of the coincidence (symbol 1) is outputted from the adaptive predictor 12 to the image memory 17 as the decoded pixel.

Thus, the prediction value outputted from the adaptive predictor 12 when the binary signal "coincidence (symbol '1')" is denoted by the arithmetic decoder 18 is used as the decoded pixel value.

If all the prediction values have appeared in the encoding by the image encoding apparatus, and the binary signal "coincidence" is encoded at the end of the string, in a case where the encoding of the symbol "1" has been omitted, after the decoding control circuit 19 causes the adaptive predictor 12 to output (command D2) the prediction value at the end of the string, the decoding control circuit 19 needs to cause the image memory 17 to store the prediction value without causing the arithmetic decoder 18 to execute the decoding thereof (command D3). However, the precondition is such that the encoding and decoding of the binary signal "coincidence (symbol '1')" at the final prediction rank are adopted by the encoder and the decoder regardless of whether the encoding and decoding thereof are to be executed or omitted.

As described above, the decoding control circuit 19 conducts decoding through the binary signal processing of multi-level pixels for all the pixels of the image.

In this embodiment, in the encoding or decoding of a pixel, the range mode, which is determined from a maximum difference value, i.e., an index of the degree of "scattering (dispersion)" of the reference pixel values, as well as the boundary mode, which is determined from the degree of "tilting" of a local reference image area, is classified. Then, it is possible to change over the predictive function adaptively in pixel units in accordance with the classification thereof. As the predictive function is changed over, it is possible to bias the probability of coincidence of prediction toward ranges having high prediction ranks. Hence, it is possible to obtain an advantage in that the length of the predictively transformed binary signal string 0 . . . 01 can be shortened, thereby improving the encoding efficiency.

Eighth Embodiment

Figure 39:
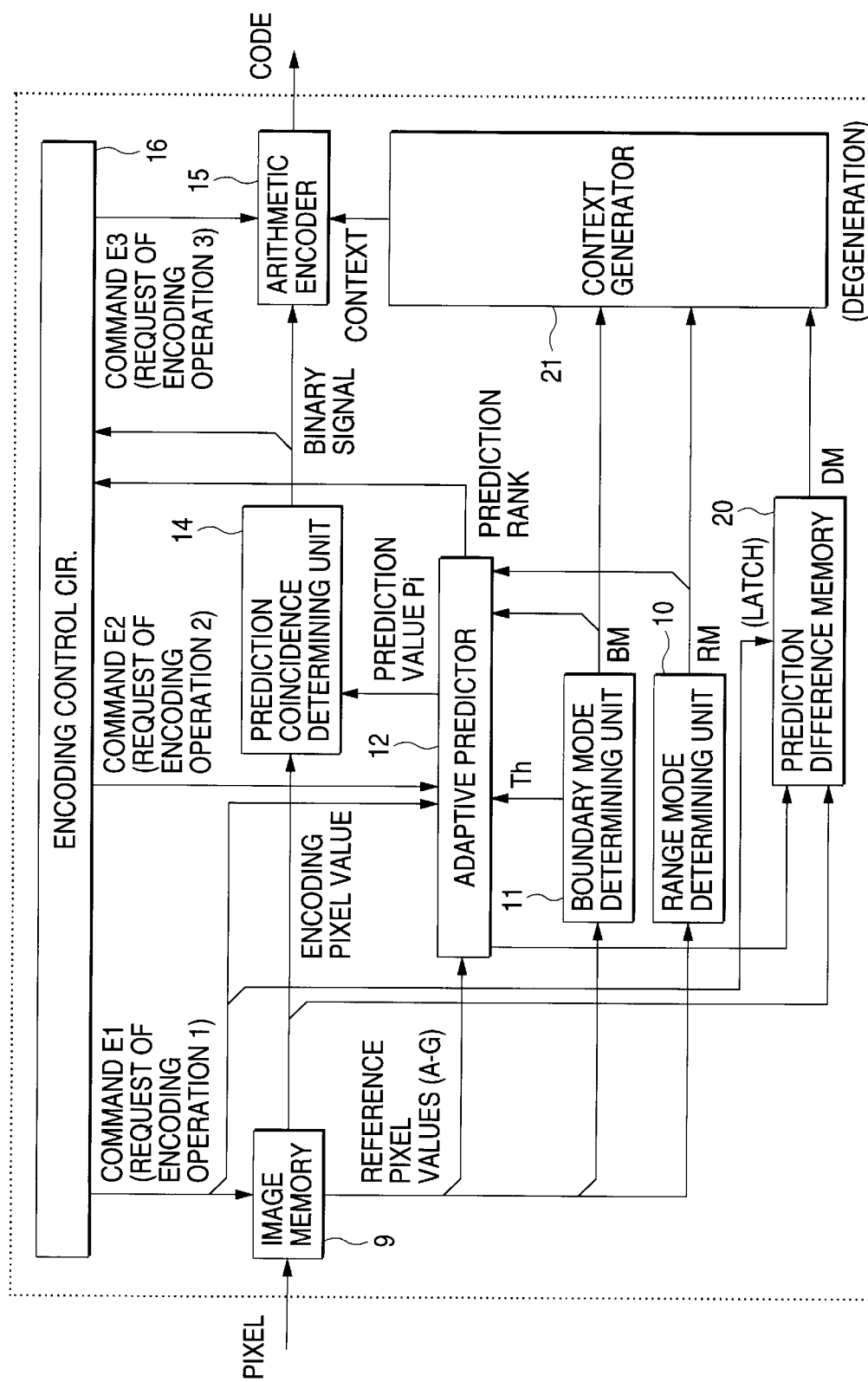
FIG. 39 is a block diagram of an image encoding apparatus according to eighth and ninth embodiments of the invention.

FIG. 39 illustrates a configuration of an image encoding apparatus which is a further embodiment of the present invention. In the drawing, since the image memory 9, the range-mode determining unit 10, the boundary-mode determining unit 11, the adaptive predictor 12, prediction-coincidence determining unit 14, the arithmetic encoder 15, and the encoding control circuit 16 perform the same functions and operation as those of the image encoding apparatus described above, a description thereof will be omitted.

First, a description will be given of a configuration of this embodiment.

Reference numeral 20 denotes a prediction difference memory which calculates and stores the value of difference between the encoding pixel and the first prediction value, and outputs the accumulated difference value after transforming it into a prediction difference mode DM when the pixel is referred to ("prediction-difference storing step").

Numeral 21 denotes a "context generator" for outputting the "context," i.e., an encoding index, to the arithmetic encoder 15 on the basis of the range mode outputted from the range-mode determining unit 10, the boundary mode outputted from the boundary-mode determining unit 11, and the prediction difference mode outputted from the prediction difference memory 20 ("context generating step").

The operation in this embodiment is basically the same as that in the seventh embodiment. Processing is carried out by adding the "prediction difference memory," the "prediction difference," and "DM" in the flow diagram (FIG. 16) of the seventh embodiment. A description will be given of additions and differences in the processing in "encoding operation."

First, in the "encoding operation 1," the value of difference between the first prediction value and the encoding pixel is determined by calculation, and this difference value is stored in the prediction difference memory 20 at the start of encoding. Here, by accumulating the difference values with a decreased number of levels such as two values, three values, five values, or seven values, it is possible to save and reduce the necessary memory area. FIG. 40 shows an example in which the prediction difference values are classified by two values, and are classified into "small" in the vicinity of 0 and "large" for other cases. It is assumed that "small" is interpreted as 0, and "large" as 1.

In this embodiment, it is assumed that the prediction differences are stored in the form of two values, and that, as for the reference pixel, its bi-level difference values are set as Da and Db at positions immediately to the left of and immediately above the encoding pixel, respectively. It is also assumed that the prediction difference mode DM, which is classified and processed in parallel with the range mode RM and the boundary mode BM as attributes for the encoding pixel, is transformed by a function DM() on the basis of the prediction difference values Da and Db. For this purpose, a table such as the one shown in FIG. 41 is defined, or the prediction difference mode DM is calculated in accordance with the formula shown below (Formula 4). In a case where a power-of-2 prediction difference mode is adopted, a multiplication may be substituted by a shift operation.

$$DM(Da, Db) = Da \times 2 + Db \qquad (4)$$
$$= (Da \ll 1) + Db$$

Next, in the "encoding operation 2," the range mode RM (4 bits) outputted from the range-mode determining unit 10, the boundary mode BM (3 bits) outputted from the boundary-mode determining unit 11, and the prediction difference mode DM (2 bits) are transformed into a 9-bit context by the context generator 21. This context value CX is calculated in accordance with the following formula (Formula 5):

$$CX = \{DM(Da, Db) \ll 7\} + (RM \ll 3) + BM \qquad (5)$$

In this embodiment, in the same way as in the seventh embodiment, the context is a fixed value with respect to the encoding of a series of binary signal strings for one encoding pixel, but its bit width is large.

Figure 42:
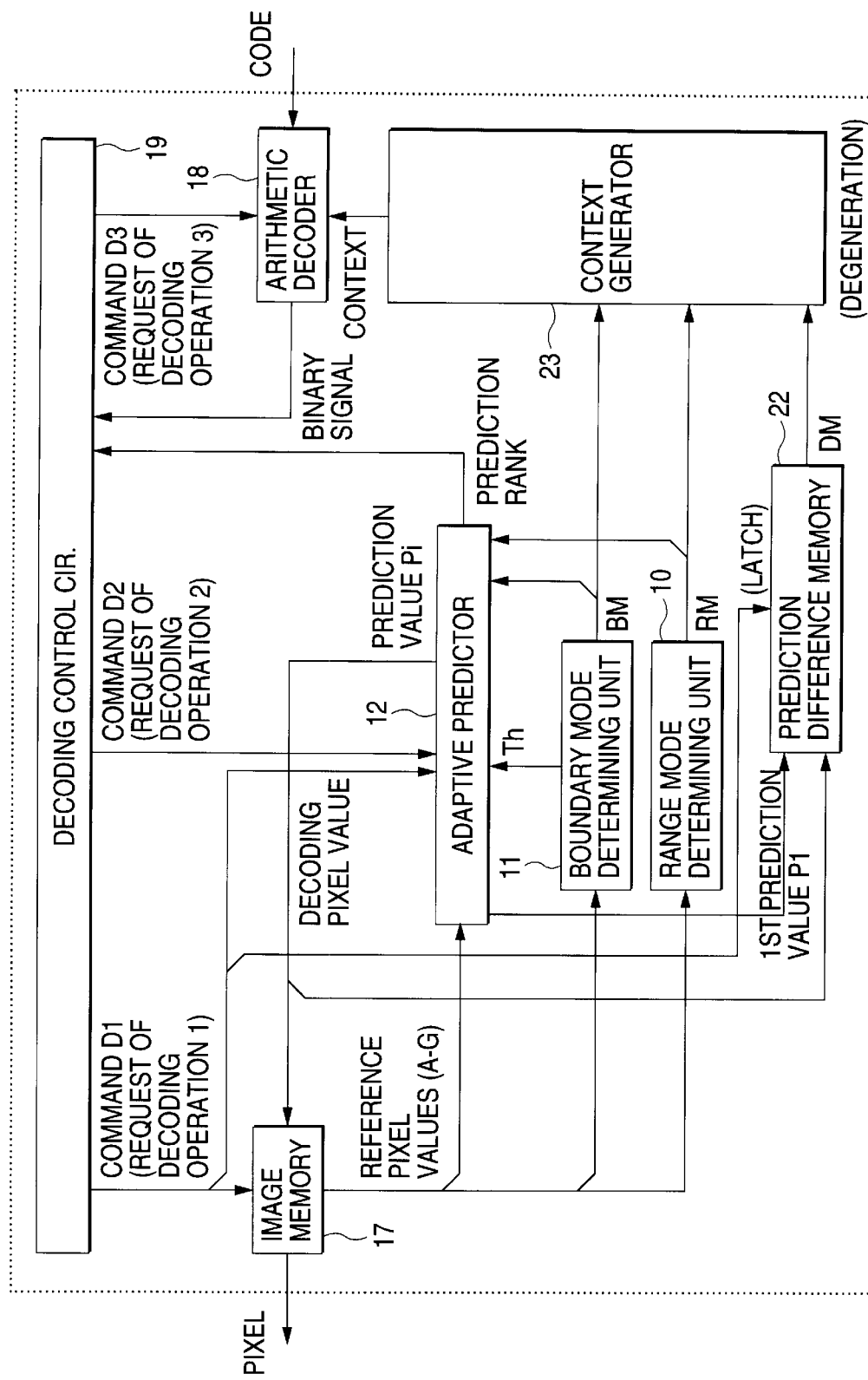
FIG. 42 is a block diagram of an image decoding apparatus according to the eighth and ninth embodiments of the invention.

Similarly, FIG. 42 shows a configuration of a decoding apparatus which is an embodiment of a further embodiment of the present invention. In the drawing, since the image memory 17, the range-mode determining unit 10, the boundary-mode determining unit 11, the adaptive predictor 12, the arithmetic decoder 18, and the decoding control circuit 19 perform the same functions and operation as those of the decoding apparatus in accordance with the seventh embodiment of the present invention, a description thereof will be omitted.

First, a description will be given of a configuration of this embodiment.

Reference numeral 22 denotes a prediction difference memory which calculates and stores the value of difference between the decoded pixel and the first prediction value, and outputs the accumulated difference value after transforming it into a prediction difference mode when the pixel is referred to ("prediction-difference storing step").

Numeral 23 denotes a "context generator" for outputting the "context," i.e., a decoding index, to the arithmetic decoder 18 on the basis of the range mode outputted from the range-mode determining unit 10, the boundary mode outputted from the boundary-mode determining unit 11, and the prediction difference mode outputted from the prediction difference memory 22 ("context generating step").

The operation of the decoder in this embodiment is basically the same as that in the seventh embodiment. Processing is carried out by adding the "prediction difference memory," the "prediction difference," and "DM" in the flow diagram (FIG. 38) of the seventh embodiment. A description will be given of additions and differences in the processing in "decoding operation."

First, in the "decoding operation 1," the value of difference between the first prediction value and the encoding pixel is stored in the prediction difference memory 22 at the start of decoding an ensuing pixel. Here, the difference values are stored with a decreased number of levels in the same way as with the encoder (FIG. 40).

In this embodiment, the prediction difference mode DM, which is classified and processed in parallel with the range mode RM and the boundary mode BM as an attribute for the decoding pixel, is transformed by a function DM( ) on the basis of the prediction difference values Da and Db in the same way as with the decoder (FIG. 41, 4).

Next, in the "decoding operation 2," the range mode RM (4 bits) outputted from the range-mode determining unit 10, the boundary mode BM (3 bits) outputted from the boundary-mode determining unit 11, and the prediction difference mode DM (2 bits) are transformed into a 9-bit context by the context generator 23 in the same way as with the decoder (Formula 5).

In this embodiment, although a 7-bit context is used in the seventh embodiment on the basis of the range mode (4 bits) and the boundary mode (3 bits), the prediction difference mode (2 bits) is further introduced on the basis of the value of difference between the encoding or decoded pixel and the first prediction value. As the context is expanded into 9 bits, it becomes possible to more finely classify the state of distribution of the reference pixels. Hence, it is possible to obtain an advantage in that, as encoding or decoding which is more appropriate with respect to the probability of occurrence of each state can be applied, it is possible to improve the encoding efficiency.

Ninth Embodiment

In the eighth embodiment, a description has been given of the case where the value of difference between a prediction value and an encoding or decoded pixel value is stored in the form of two values (1 bit). The difference value corresponding to a bi-level pixel portion permits transformation into four prediction difference modes DM, and is used as it is in the form of 2 bits in the generation of the context.

In this embodiment, if it is assumed that the prediction value is stored in the form of three values, nine prediction difference modes DM would be present as combinations in the case of reference to two pixels. Here, a description will be given of a case where degeneration is carried out to obtain four prediction difference modes DM in the preparation of a context. As for the configurations of the encoder and the decoder, it is possible to give a description in the form of the above-described embodiments.

Figures 43, 44:
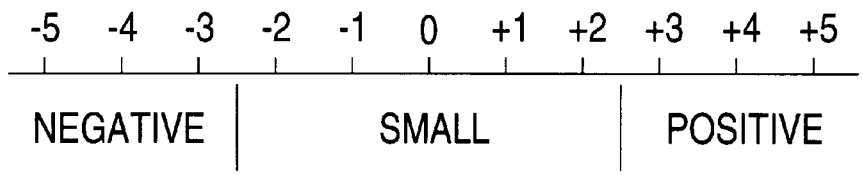
FIG. 43 illustrates how prediction difference values are classified (into three values) in the ninth embodiment of the invention.
FIG. 44 illustrates transformation from nine values into four values in the ninth embodiment of the invention.

FIG. 43 shows an example in which the prediction difference value is classified by three values into "small" in the vicinity of 0, a positive value "positive," and a negative value "negative" for other cases. It is assumed that "small" is 0, "positive" is 1, and "negative" is 2.

In the case where degeneration is not taken into consideration, if two pixels A and B are referred to in the same way as in the eighth embodiment and prediction difference values Da and Db transformed into three values are obtained, and if a function DM(Da, Db) for transformation into a prediction difference mode on the basis of the prediction difference values Da and Db is defined, then it can be seen from Formulae 4 and 5 that 11 bits are required for the context value CX.

If the prediction difference value based on the three values is adopted, for the reason of the restriction on the capacity of the memory (table) of the arithmetic encoder and decoder, a case is considered in which the context is generated in 9 bits in the same way as in the eighth embodiment. Here, the prediction difference mode in which 3 values multiplied by 3 values is 9 values in Formula 4 needs to be degenerated into four values (2 bits). FIG. 44 is a degeneration table which defines the assignment of four values in a table of 3×3=9 values. By referring to the two pixels Da and Db as the three-valued prediction difference, and by using the function DM(Da, Db) for transforming the prediction difference mode from nine values into four values, the 9-bit context value CX can be calculated in accordance with Formula 5.

In this embodiment, a description has been given of the case were the number of bits of the context is reduced by decreasing the number of prediction difference modes used for context generation with respect to the number of combinations of the prediction differences referred to, so as to reduce the memory of the arithmetic encoder and decoder.

10th Embodiment

In the above-described embodiments, the range mode RM, the boundary mode BM, and the prediction difference mode DM are used as data for generating the context. In this embodiment, a description will be given of a case where the prediction ranks at the time of adaptive prediction are used in the context generation.

In this embodiment, since 8-bit pixels are used as objects of encoding, prediction ranks are also of 8 bits.

Figure 45:
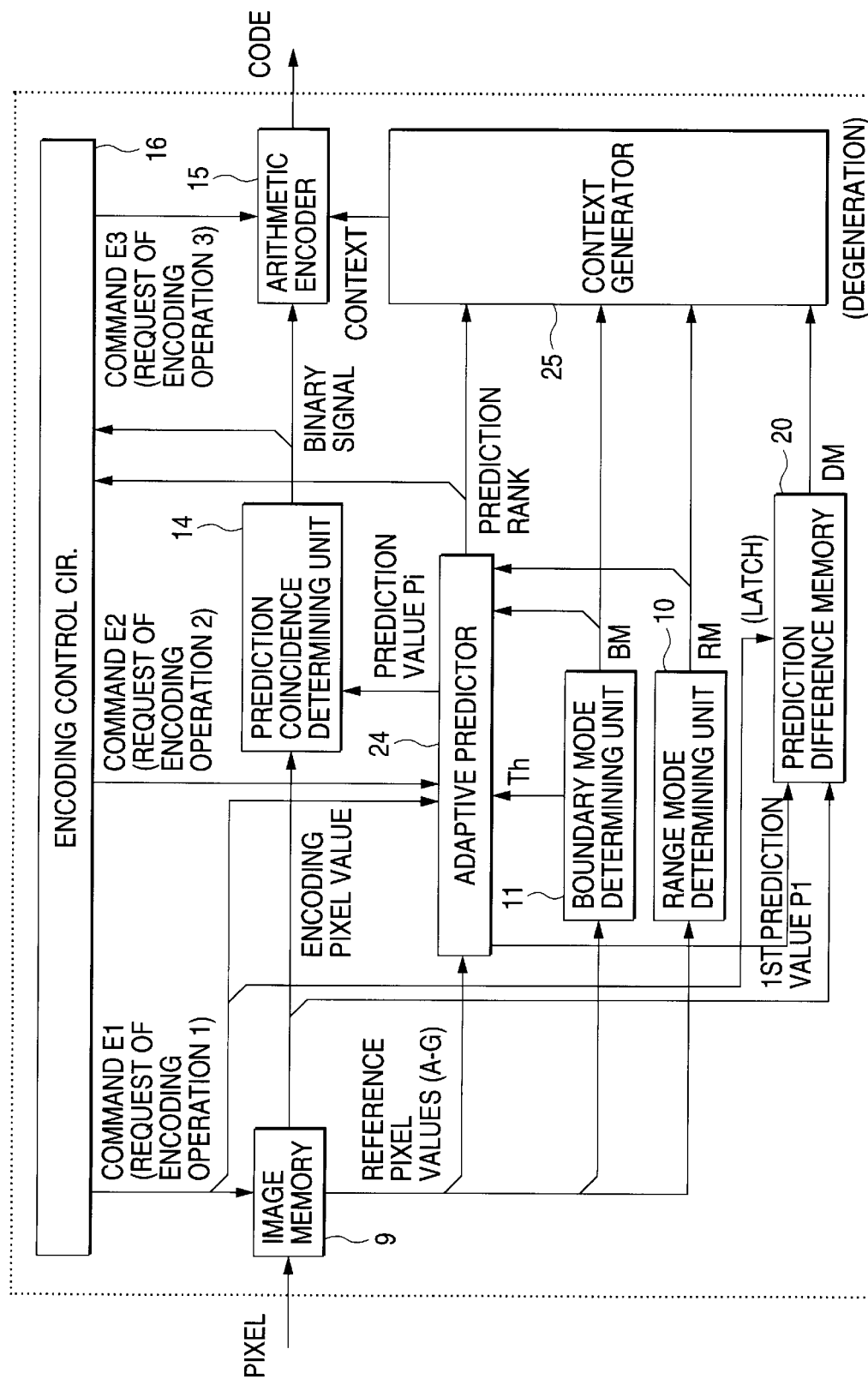
FIG. 45 is a block diagram of an image encoding apparatus according to 10th and 11th embodiments of the invention.

FIG. 45 illustrates a configuration of an image encoding apparatus which is a further embodiment of the present invention. In the drawing, since the image memory 9, the range-mode determining unit 10, the boundary-mode determining unit 11, the prediction-coincidence determining unit 14, the arithmetic encoder 15, the encoding control circuit 16, and the prediction difference memory 20 perform the same functions and operation as those of the image encoding apparatus in accordance with the seventh embodiment, a description thereof will be omitted.

First, a description will be given of constituent elements unique to this embodiment.

Reference numeral 24 denotes an adaptive predictor for outputting prediction ranks to the context generator (which will be described later) ("adaptive prediction step").

Numeral 25 denotes a "context generator" for outputting the "context," i.e., an encoding index, to the arithmetic encoder 15 on the basis of the range mode outputted from the range-mode determining unit 10, the boundary mode outputted from the boundary-mode determining unit 11, the prediction difference mode outputted from the prediction difference memory 20, and the prediction ranks outputted from the adaptive predictor 12 ("context generating step").

Figure 46:
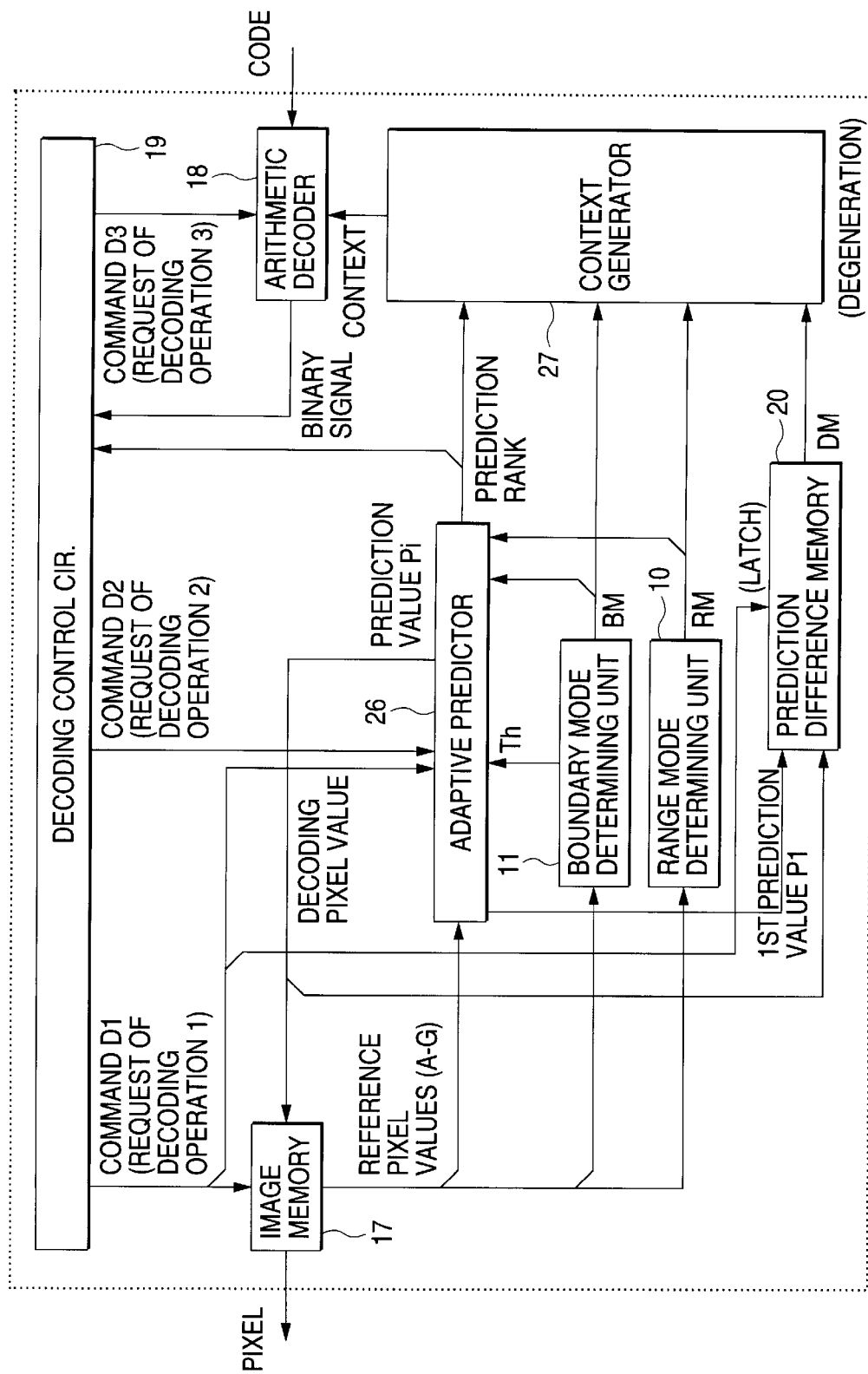
FIG. 46 is a block diagram of an image decoding apparatus according to the 10th and 11th embodiments of the invention.
Figure 48:
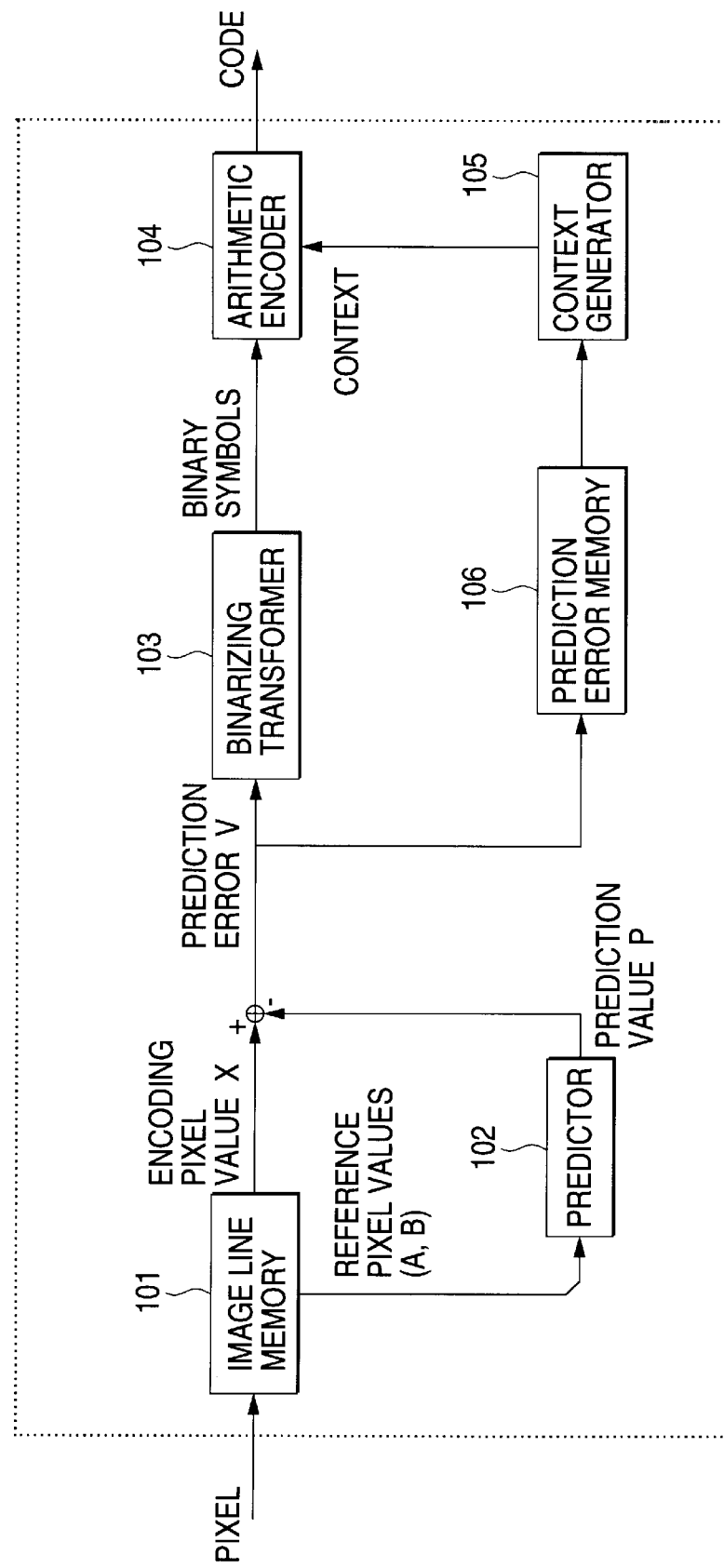
FIG. 48 is a block diagram of a conventional encoding apparatus.
Figure 49:
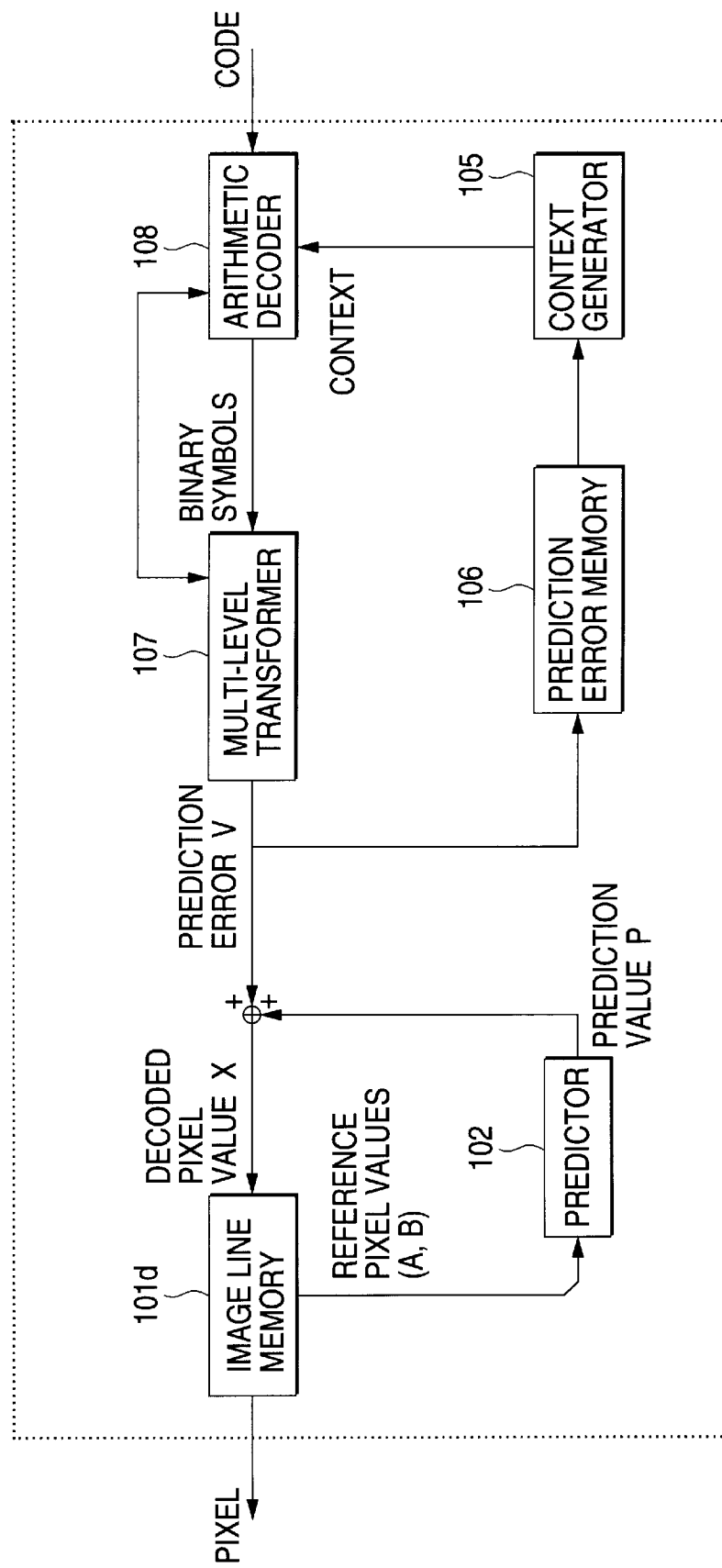
FIG. 49 is a block diagram of a conventional decoding apparatus.
Figures 50, 51:
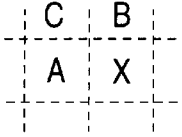
FIG. 50 shows prediction functions in the conventional example.
FIG. 51 shows Sz (=|v|−1) is grouped in the conventional example.
Figure 54A:
FIGS. 54A–54F show typical examples of applications of the encoding apparatus, the decoding apparatus, and the encoding and decoding apparatus of the invention.
Figure 54B:
Figure 54C:
Figure 54D:
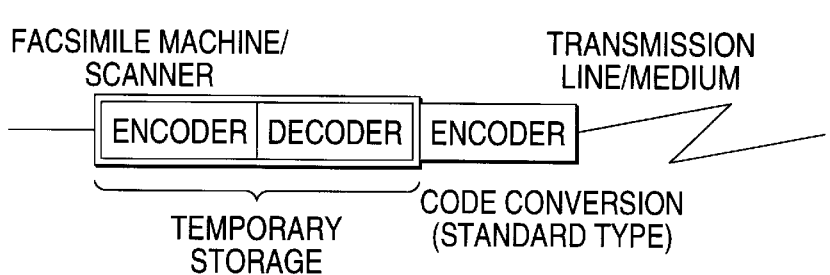
Figure 54E:
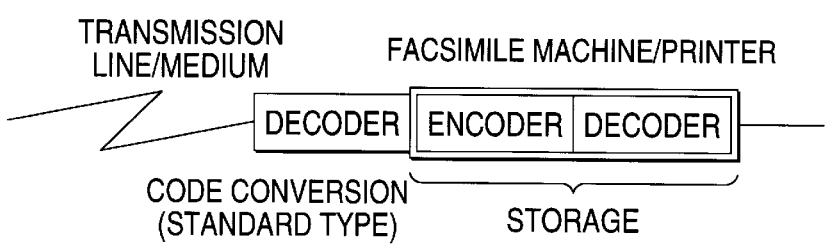
Figure 54F:
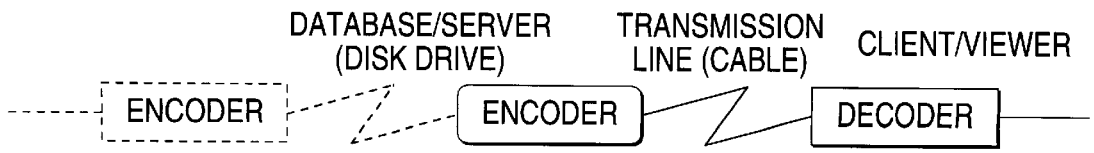

Similarly, FIG. 46 illustrates a configuration of an image decoding apparatus which is a further embodiment of the present invention. In the drawing, since the image memory 17, the range-mode determining unit 10, the boundary-mode determining unit 11, the arithmetic decoder 18, the decoding control circuit 19, and the prediction difference memory 20 perform the same functions and operation as those of the decoder in accordance with the ninth embodiment, a description thereof will be omitted.

First, a description will be given of constituent elements unique to this embodiment.

Reference numeral 26 denotes an adaptive predictor for outputting prediction ranks to the context generator (which will be described later) ("adaptive prediction step").

Numeral 27 denotes a "context generator" for outputting the "context," i.e., a decoding index, to the arithmetic decoder 18 on the basis of the range mode outputted from the range-mode determining unit 10, the boundary mode outputted from the boundary-mode determining unit 11, the prediction difference mode outputted from the prediction difference memory 20, and the prediction ranks outputted from the adaptive predictor 26 ("context generating step").

A description will be given of this embodiment as for the expansion of the above-described embodiments. The range mode RM (4 bits) outputted from the range-mode determining unit 10, the boundary mode BM (3 bits) outputted from the boundary-mode determining unit 11, the prediction difference mode (2 bits), and the prediction rank Rank (8 bits) outputted from the adaptive predictor in accordance with this embodiment are transformed into a 17-bit context by the context generator 27. This context value CX is calculated in accordance with the following formula (Formula 6):

$$CX = \{DM(Da, Db) << 15\} + (RM << 11) + (BM << 8) + \text{Rank} \qquad (6)$$

In this embodiment, although in the foregoing embodiments the context is a fixed value with respect to the encoding of a series of binary signal strings for one encoding or decoding pixel, the context in this embodiment differs for each prediction rank.

In this embodiment, although a 9-bit context is used in the above-described embodiment on the basis of the range mode (4 bits), the boundary mode (3 bits), and the prediction difference mode (2 bits), the prediction rank (8 bits) is further introduced. As the context is expanded into 17 bits, it becomes possible to more finely classify the state of the encoding or decoding pixel being processed, in accordance with the prediction rank. Hence, it is possible to obtain an advantage in that, as encoding or decoding which is more appropriate with respect to the probability of occurrence of each state can be applied, it is possible to improve the encoding efficiency.

11th Embodiment

In the 10th embodiment, a description has been given of the case where the 8-bit prediction rank is utilized as it is as the context in encoding or decoding an 8-bit pixel. In this embodiment, a description will be given of a case where the 8-bit prediction rank is degenerated into 3 bits with the configuration of the encoder shown in FIG. 45 and the decoder shown in FIG. 46 kept intact in accordance with the above-described embodiments.

In this embodiment, a function RK (Rank) is used for transforming the prediction rank Rank (8 bits) outputted by the adaptive predictor 26 in accordance with the above-described embodiment into 3 bits shown in FIG. 47 with respect to that value. The prediction rank Rank is transformed into a 12-bit context by the context generator 27. This context value CX is calculated in accordance with the formula shown below (Formula 7). Hereafter, the prediction rank which is degenerated will be referred to as the degenerated prediction rank.

$$CX=\{DM(Da, Db)<<10\}+(RM<<6)+(BM<<3)+Rk(\text{Rank}) \quad (7)$$

The degeneration of the prediction rank from 8 bits into 3 bits, which is shown in FIG. 47, may be carried out and outputted by the adaptive predictor 26, or the prediction rank may be inputted as it is in the form of 8 bits, and the degeneration thereof may be effected within the context generator 27. In the block diagrams shown in FIGS. 45 and 46, the latter case carried out. When the adaptive predictor 26 outputs the degenerated prediction rank to the context generator 27, it is necessary to distinguish this degenerated prediction rank from the prediction rank outputted to the encoding control circuit 16 or the decoding control circuit 14 in the block diagram.

In this embodiment, the prediction values are assigned by being distributed alternatively in the directions of large and small magnitudes with respect to the first prediction value, as shown in FIG. 22. For this reason, the "periodicity" is present in which the prediction values are similar at even numbers and odd numbers as the regularity in appearance (statistical characteristic) of prediction values. In this embodiment, degeneration is conducted by making use of the periodicity, but 0–5 which are low in the prediction rank are not subjected to degeneration so as to strictly distinguish the probability of prediction coincidence, and the remaining 6 and 7 are used for even numbers and odd numbers. Here, even if the portion of 6 and more which is higher in the prediction rank is subjected to degeneration, the decline in the encoding efficiency is doe not become so large as to present a problem.

In addition, if degenerated prediction ranks are set as 0 to n, with respect to a prediction string of a period m (<n), it suffices if the degeneration is not carried out for the range of 0 to n–m in terms of the prediction rank, and the degeneration is thereafter repeated with n–m+1, n–m+2, . . . , n.

In this embodiment, a description has been given of the case where the number of bits of the context is reduced by degenerating the prediction rank information used in context generation, so as to reduce the memory of the arithmetic encoder and decoder.

To simply describe the operation of the above-described first to 11th embodiments, a functional expression for determining a prediction value in correspondence with the state of distribution of pixels by referring to one or a plurality of neighboring pixel values for a multi-level encoding pixel or decoding pixel is changed over in the first to 11th embodiments, and the probability of coincidence of prediction toward ranges having high prediction ranks. Hence, the length of the binary signal string transformed into a decision value of prediction coincidence or non-coincidence can be shortened. In addition, as the binary signal is entropy-coded and decoded by imparting an optimum encoding or decoding index, it is possible to improve the encoding or decoding efficiency.

In addition, in the encoding apparatus and the encoding method in accordance with the present invention, the context is determined on the basis of the state of distribution of reference pixels neighboring the encoding pixel, thereby making it possible to improve the encoding efficiency.

FIGS. 54A–54G show typical examples of applications of the encoding apparatus, the decoding apparatus, and the encoding and decoding apparatus of the invention. That is, they are used in facsimile machines, scanners, printers, copiers, computers (dedicated use/general purpose; including personal computers and workstations), image databases, image servers/client apparatuses, viewers (i.e., image display apparatuses which process/edit image data and display a resulting image), etc., for such purposes as image transmission, direct communication, and image storage (temporary or long term). After the temporary storage, stored data is transmitted, recorded, or subjected to code conversion. The (temporary) storage of pixel data (see FIGS. 54D and 54E) are effective in saving the memory capacity.

As for the transmission of codes from the encoding apparatus to the decoding apparatus, they may be transmitted in digital or analog form by wireless or through wires, in other words, through a network (public or dedicated), cables, etc. Codes may be recorded electrically, magnetically, or optically in digital or analog form as characters or symbols. Further, they may be recorded in the form of holes or protrusions (braille points) of a paper tape, or the like. Recording media include cards, tapes, disks (FDs, CDs, Photo-CDs, MDs, etc.), RAMs, and ROMs.

A reproduced image may be output as a hard copy (for instance, a printed image on a sheet) or a soft copy (for instance, a displayed image).

The encoding apparatus, the decoding apparatus, and the encoding and decoding apparatus are implemented as software (a program, a driver, etc.) or hardware (a LSI, etc.). The LSI implementation includes a one-chip or multi-chip LSI, an ASIC, and a gate array.

In the encoding apparatus and the encoding method in accordance with the present invention, since prediction values are determined on the basis of the state of distribution of the reference pixels neighboring the encoding pixel, it is possible to improve the encoding efficiency.

Meanwhile, in the decoding apparatus and the decoding method in accordance with the present invention, since prediction values are determined on the basis of the state of distribution of the reference pixels neighboring the decoding pixel in the same way as encoding, the data encoded with high efficiency can be restored without a loss of information.

Further, in the encoding apparatus and the encoding method in accordance with the present invention, since the context is determined on the basis of the state of distribution of the reference pixels neighboring the encoding pixel, it is possible to improve the encoding efficiency.

Meanwhile, in the encoding and decoding apparatus and the encoding and decoding method in accordance with the present invention, since prediction values are determined on the basis of the state of distribution of the reference pixels neighboring the encoding pixel, the encoding efficiency can be improved, and decoding can be effected without a loss of information.

Furthermore, in the encoding and decoding apparatus and the encoding and decoding method in accordance with the present invention, since the context is determined on the basis of the state of distribution of the reference pixels neighboring the encoding pixel and on the basis of the state of distribution of the reference pixels neighboring the decoding pixel, the encoding efficiency can be improved, and decoding can be effected without a loss of information.

What is claimed is:

1. An encoding apparatus comprising:

pixel output means for storing a target encoding pixel and for outputting the target encoding pixel and a plurality of reference pixels within a predetermined vicinity of the target encoding pixel;

pixel distribution detecting means for determining pixel values of the reference pixels within the predetermined vicinity of the target encoding pixel, and detecting at least one pixel distribution state of a plurality of pixel distribution states of the reference pixels based on the determined pixel values of the reference pixels;

prediction value output means for determining a prediction value of the target encoding pixel from the determined pixel values of the reference pixels according to a process based on the at least one detected pixel distribution state;

comparing means for comparing the prediction value arid a value of the target encoding pixel, and outputting a comparison result representing a coincidence of the prediction value and the value of the target encoding pixel;

context generating means for generating a context for the target encoding pixel when the prediction value and the value of the target encoding pixel coincide; and encoding means for encoding the comparison result of the comparing means based on the generated context.

2. The encoding apparatus of claim 1, wherein the encoding means includes means, responsive to the comparing means outputting the comparison result indicating the prediction value and the value of the target encoding pixel do not coincide, for:

instructing the pixel distribution detecting means to detect a next pixel distribution state of the plurality of pixel distribution states;

instructing the prediction value output means to determine a next prediction value of the target encoding pixel from the determined pixel values of the reference pixels according to a process based on the next detected pixel distribution state; and instructing the comparing means to compare the next prediction vale and the value of the target encoding pixel, and output a next comparison result representing a coincidence of the next prediction vale and the value of the target encoding pixel.

3. An encoding method comprising:

outputting a target encoding pixel and a plurality of reference pixels within a predetermined vicinity of the target encoding pixel;

determining pixel values of the reference pixels within predetermined vicinity of the target encoding pixel, and detecting a pixel distribution state of the reference pixels based on the determined pixel values of the reference pixels;

determining a prediction value of the target encoding pixel from the determined pixel values of the reference pixels according to a process based on the detected pixel distribution state;

comparing the prediction value and a value of the target encoding pixel, and outputting a comparison result;

generating a context for the target encoding pixel; and encoding the comparison result of the comparing means based on the generated context.

4. A decoding apparatus comprising:

pixel output means for outputting a plurality of reference pixels within a predetermined vicinity of a decoded pixel prior to decoding the decoded pixel, and for storing a decoded pixel value of the decoded pixel;

pixel distribution detecting means for determining pixel values of the reference pixels within the predetermined vicinity of the decoded pixel, and detecting at least one pixel distribution state of a plurality of pixel distribution states of the reference pixels based on the determined pixel values of the reference pixels;

prediction value output means for determining a prediction value of the encoded pixel from the determined pixel values of the reference pixels according to a process based on the at least one detected pixel distribution state;

context generating means for generating a context for the prediction value of the decoded pixel;

decoding means for decoding an encoded signal based on the generated context, and producing a multi-valued signal based on a decoded signal; and decoding control means for causing the pixel output means to store the prediction value of the prediction value output means as the decoded pixel value when detecting a signal indicating coincidence from the multi-valued signal of the decoding means.

5. The decoding apparatus of claim 4, wherein the decoding control means includes means, responsive to detecting a second signal indicating non-coincidence from the multi-valued signal of the decoding means, for;

instructing the prediction value output means to determine a next prediction value of the decoded pixel from the determined pixel values of the reference pixels according to a process based on a next detected pixel distribution state;

instructing the context generating means to generate a next context for the next prediction value of the decoded pixel; and instructing the decoding means to decode the encoded signal based on the next generated context.

6. A decoding method comprising:

outputting a plurality of reference pixels within a predetermined vicinity of a decoded pixel prior to decoding the decoded pixel;

determining pixel values of the reference pixels within the predetermined vicinity of the decoded pixel, and detecting a pixel distribution state of the reference pixels based on the determined pixel values of the reference pixels;

determining a prediction value of the decoded pixel from the determined pixel values of the reference pixels according to a process based on the detected pixel distribution state;

generating a context for the prediction value of the decoded pixel;

decoding an encoded signal based on the generated context, and producing a multi-valued signal based on the decoded signal; and employing the prediction value of the decoded pixel as a decoded pixel value when detecting a signal indicating coincidence from the multi-valued signal.

7. An encoding and decoding apparatus comprising:

an encoding apparatus comprising:

pixel output means for outputting a target encoding pixel and a plurality of reference pixels within a predetermined vicinity of the target encoding pixel;

pixel distribution detecting means for determining pixel values of the reference pixels within the predetermined vicinity of the target encoding pixel, and detecting a pixel distribution state of the reference pixels based on the determined pixel values of the reference pixels;

prediction value output means for determining a prediction value of the target encoding pixel from the determined pixel values of the reference pixels according to a process based on the detected pixel distribution state;

comparing means for comparing the prediction value and a value of the target encoding pixel, and outputting a comparison result;

context generating means for generating a context for the target encoding pixel; and encoding means for encoding the comparison result of the comparing means based on the generated context, and outputting a first encoded signal to a transmission line; and a decoding apparatus comprising:

pixel output means for outputting a plurality of reference pixels within the predetermined vicinity of a encoding pixel prior to decoding the decoded pixel, and for storing a decoded pixel value of the decoded pixel;

pixel distribution detecting means for determining pixel values of the reference pixels within the predetermined vicinity of the decoded pixel, and detecting a pixel distribution state of the reference pixels based on the determined pixel values of the reference pixels;

prediction value output means for determining a prediction value of the decoded pixel from the determined pixel values of the reference pixels according to a process based on the detected pixel distribution state;

context generating means for generating a context for the prediction value of the decoded pixel;

decoding means for decoding a second encoded signal on the transmission line based on the generated context, and producing a multi-valued signal based on a decoded signal; and decoding control means for causing the pixel output means to store the prediction value of the pixel output means as the decoded pixel value when detecting a signal indicating coincidence from the multi-valued signal of the decoding means.

8. An encoding and decoding method comprising:

an encoding process comprising the steps of:

outputting a target encoding pixel and a plurality of reference pixels within a predetermined vicinity of the target encoding pixel;

determining pixel values of the reference pixels, and detecting a pixel distribution state of the reference pixels within the predetermined vicinity of the target encoding pixel based on the determined pixel values of the reference pixels;

determining a prediction value of the target encoding pixel from the determined pixel values of the reference pixels according to a process based on the detected pixel distribution state;

comparing the prediction value and a value of the target encoding pixel, and outputting a comparison result;

generating a context for the target encoding pixel;

encoding the comparison result of the comparing based on the generated context, and outputting a first encoded signal to a transmission line; and a decoding process comprising the steps of:

outputting a plurality of reference pixels within a predetermined vicinity of a decoded pixel prior to decoding the decoded pixel;

determining pixel values of the reference pixels within the predetermined vicinity of the decoded pixel, and detecting a pixel distribution state of the reference pixels based on the determined pixel values of the reference pixels, determining a prediction value of the decoded pixel from the determined pixel values of the reference pixels according to a process based on the detected pixel distribution state;

generating a context for the prediction value of the decoded pixel;

decoding a second encoded signal on the transmission line based on the generated context, and producing a multi-valued signal based on the decoded signal; and employing the prediction value of the decoded pixel as a decoded pixel value when detecting a signal indicating coincidence from the multi-valued signal.

9. An encoding apparatus comprising:

pixel output means for outputting a target encoding pixel and a plurality of reference pixels within a predetermined vicinity of the target encoding pixel;

pixel distribution detecting means for determining pixel values of the reference pixels within the predetermined vicinity of the target encoding pixel, and detecting at least one pixel distribution state of a plurality of pixel distribution states of the reference pixels based on the determined pixel values of the reference pixels;

prediction value output means for determining a prediction value of the target encoding pixel by performing a calculation on the determined pixel values of the reference pixels, wherein the calculation is based upon the at least one detected pixel distribution state;

comparing means for comparing the prediction value and a value of the target encoding pixel, and outputting a comparison result;

context generating means for generating a context based on the at least one detected pixel distribution state; and encoding means for encoding the comparison result of the comparing means based on the generated context.

10. The encoding apparatus according to claim 1 or 9, wherein the pixel distribution detecting means determines a maximum value and a minimum value of the plurality of reference pixels, determines a difference value between the maximum value and the minimum value, and detects the at least one pixel distribution state based on the difference value.

11. The encoding apparatus according to claim 1 or 9, wherein the pixel distribution detecting means determines a maximum value and a minimum value of the plurality of reference pixels, determines an average value of the maximum value and the minimum value, compares respective reference pixel values with the average value to produce comparison results, detects a boundary in the target encoding pixel and the reference pixels based on the comparison results, and detects the al least one pixel distribution state based on the detected boundary.

12. An encoding method comprising:

outputting a target encoding pixel and a plurality of reference pixels within a predetermined vicinity of the target encoding pixel;

determining pixel values of the reference pixels within the predetermined vicinity of the target encoding pixel, and detecting a pixel distribution state of the reference pixels based on the determined pixel values of the reference pixels;

determining a prediction value of the target encoding pixel by performing a calculation on the determined pixel values of the reference pixels, wherein the calculation is based upon the detected pixel distribution state;

comparing the prediction value and a value of the target encoding pixel, and outputting a comparison result;

generating a context based on the pixel distribution state; and encoding the comparison result of the comparing means based on the generated context.

13. A decoding apparatus comprising:

pixel output means for outputting a plurality of reference pixels within a predetermined vicinity of a decoded pixel prior to decoding the decoded pixel, and for storing a decoded pixel value of the decoded pixel;

pixel distribution detecting means for determining pixel values of the reference pixels within the predetermined vicinity of the decoded pixel, and detecting at least one pixel distribution state of plurality of distribution states of the reference pixels based on the determined pixel values of the reference pixels;

prediction value output means for determining a prediction value of the decoded pixel by performing a calculation on the decoded pixel values of the reference pixels, wherein the calculation is based upon the at least one detected pixel distribution state;

context generating means for generating a context based on the at least one detected pixel distribution state;

decoding means for decoding an encoded signal based on the generated context, and producing a multi-valued signal based on a decoded signal; and decoding control means for causing the pixel output means to store the prediction value of the prediction value output means as the decoded pixel value when detecting a signal indicating coincidence from the multi-valued signal of the decoding means.

14. The decoding apparatus according to claim 4 or 13, wherein the pixel distribution detecting means determines a maximum value and a minimum value of the plurality of reference pixels, determines a difference value between the maximum value and the minimum value, and detects the at least one pixel distribution state based on the difference value.

15. The decoding apparatus according to claim 4 or 13, wherein the pixel distribution detecting means determines a maximum value and a minimum value of the plurality of reference pixels, determines an average value of the maximum value and the minimum value, compares respective reference pixel values with the average value to produce comparison results, detects a boundary in the decoded pixel and the reference pixels based on the comparison results, and detects the at least one pixel distribution state based on the detected boundary.

16. A decoding method comprising:

outputting a plurality of reference pixels within a predetermined vicinity of a decoded pixel prior to decoding the decoded pixel;

determining pixel values of the reference pixels within the predetermined vicinity of the decoded pixel, and detecting a pixel distribution state of the reference pixels based on the determined pixel values of the reference pixels;

determining a prediction value of the decoded pixel by performing a calculation on the determined pixel values of the reference pixels, wherein the calculation is based upon the detected pixel distribution state;

generating a context based on the pixel distribution state;

decoding an encoded signal based on the generated context, and producing a multi-valued signal based on a decoded signal; and employing the prediction value of the decoded pixel as a decoded pixel value when detecting a signal indicating coincidence from the multi-valued signal.

17. The decoding method according to claim 6 or 16, wherein the multi-valued signal is a binary signal.

18. An encoding and decoding apparatus comprising:

an encoding apparatus comprising:

pixel output means for outputting a target encoding pixel and a plurality of reference pixels within a predetermined vicinity of the target encoding pixel;

pixel distribution detecting means for determining pixel values of the reference pixels and detecting a pixel distribution state of the reference pixels based on the determined pixel values of the reference pixels;

prediction value output means for determining a prediction value of the target encoding pixels by performing a calculation on the determined pixel values of the reference pixels, wherein the calculation is based upon the detected pixel distribution state;

comparing means for comparing the prediction value and a value of the target encoding pixel, and outputting a comparison result;

context generating means for generating a context based on the pixel distribution state; and encoding means for encoding the comparison result of the comparing means based on the generated context, and outputting a first encoded signal to a transmission line; and a decoding apparatus comprising:

pixel output means for outputting a plurality of reference pixels within a predetermined vicinity of a decoded pixel prior to decoding the decoded pixel, and for storing a decoded pixel value of the decoded pixels;

pixel distribution detecting means for determining pixel values of the reference pixels, and detecting a pixel distribution state of the reference pixels based on the determined pixel values of the reference pixels;

prediction value output means for determining a prediction value of the decoded pixel by performing a calculation on the determined pixel values of the reference pixels, wherein the calculation is based upon the detected pixel distribution state;

context generating means for generating a context based on the pixel distribution state;

decoding means for decoding a second encoded signal on the transmission line based on the generated context, and producing a multi-valued signal based on a decoded signal; and decoding control means for causing the pixel output means to store the prediction value of the prediction value output means as the decoded pixel value when detecting a signal indicating coincidence from the multi-valued signal of the decoding means.

19. The encoding and decoding apparatus according to claim 7 or 18, wherein the pixel distribution detecting means determines a maximum value and a minimum value of the plurality of reference pixels, determines a difference value between the maximum value and the minimum value, and detects the pixel distribution state based on the difference value.

20. The encoding and decoding apparatus according to claim 7 or 18, wherein the pixel distribution detecting means determines a maximum value and a minimum value of the plurality of reference pixels, determines an average value of the maximum value and the minimum value, compares the respective reference pixel values with the average value to produce comparison results, detects a boundary in the target encoding pixel and the reference pixels based on the comparison results, and detects the pixel distribution state based on the detected boundary.

21. The encoding and decoding apparatus according to claim 7 or 18, wherein the multi-valued signal is a binary signal.

22. A facsimile machine comprising the encoding and decoding apparatus according to claim 7 or 18.

23. A printer comprising the encoding and decoding apparatus according to claim 7 or 18 for storage of pixel data.

24. A scanner comprising the encoding and decoding apparatus according to claim 7 or 18 for temporary storage of pixel data.

25. A copier comprising the encoding and decoding apparatus according to claim 7 or 18.

26. A computer comprising the encoding and decoding apparatus according to claim 7 or 18.

27. An encoding and decoding method comprising:
an encoding process comprising the steps of:
outputting a target encoding pixel and a plurality of reference pixels within a predetermined vicinity of the target encoding pixel;
determined pixel values of the reference pixels, and detecting a pixel distribution state of the reference pixels based on the determined pixel values of the reference pixels;
determining a prediction value of the target encoding pixel by performing a calculation on the determined pixel values of the reference pixels, wherein the calculation is based upon the detected pixel distribution state;
comparing the prediction value and a value of the target encoding pixel, and outputting a comparison result;
generating a context based on the pixel distribution state;
encoding the comparison result of the comparing means based on the generated context, and outputting a first encoded signal to a transmission line; and
a decoding process comprising the steps of:
outputting a plurality of reference pixels within a predetermined vicinity of a decoded pixel prior to decoding the decoded pixel;
determining pixel values of the reference pixels, and detecting a pixel distribution state of the reference pixels based on the determined pixel values of the reference pixels;
determining a prediction value of the decoded pixel by performing a calculation on the determined pixel values of the reference pixels, wherein the calculation is based upon the detected pixel distribution state;
generating a context based on the pixel distribution state;

decoding a second encoded signal on the transmission line based on the generated context, and producing a multi-valued signal based on a decoded signal; and
employing the prediction value of the decoded pixel as a decoded pixel value when detecting a signal indicating coincidence from the multi-valued signal.

28. The encoding and decoding method according to claim 8 or 27, wherein the multi-valued signal is a binary signal.

29. An encoding apparatus comprising:
pixel output means for outputting a target encoding pixel and a plurality of reference pixels within a predetermined vicinity of the target encoding pixel;
a boundary mode determining circuit for determining a maximum value and a minimum value of the plurality of reference pixels, determining an average value of the maximum value and the minimum value, comparing the respective reference pixel values with the average value to produce comparison results, detecting a boundary in the target encoding pixel and the reference pixels based on the comparison results, and detecting a first pixel distribution state of the reference pixels based on the detected boundary;
a range mode determining circuit for determining a maximum value and a minimum value of the plurality of reference pixels, determining a difference value between the maximum value and the minimum value, and detecting a second pixel distribution state of the reference pixels based on the difference value;
an adaptive predictor for calculating a prediction value and prediction rank information of the target encoding pixel by performing calculations on the plurality of reference pixels based on a function corresponding to the first pixel distribution state detected by the boundary mode determining circuit, a function corresponding to the Second pixel distribution state detected by the range mode determining circuit, and the plurality of reference pixels;
prediction difference calculating means for determining a difference value between the prediction value and a value of the target encoding pixel;
a prediction coincidence determining unit for comparing the prediction value and the target encoding pixel value, and outputting a comparison result as a multi-valued signal;
a context generator for generating a context based on the first pixel distribution state detected by the boundary mode determining circuit, the second pixel distribution state detected by the range mode determining circuit, the difference value determined by the prediction difference calculating means, and the prediction rank information calculated by the adaptive predictor; and
encoding means for encoding the multi-valued signal based on the context.

30. The encoding apparatus according to claim 29, further comprising:
a context generator for generating a context for encoding by referring to a degenerated result of the prediction rank by utilizing regularity of appearance of the prediction value.

31. A decoding apparatus comprising:
pixel output means for outputting a plurality of reference pixels within a predetermined vicinity of a target decoding pixel prior to decoding the target decoding pixel, and for storing a decoded pixel value of the target decoding pixel;

a boundary mode determining circuit for determining a maximum value and a minimum value of the plurality of reference pixels, determining an average value of the maximum value and the minimum value, comparing the respective reference pixel values with the average value to produce comparison results, detecting a boundary in the target decoding pixel and the reference pixels based on the comparison results, and detecting a first pixel distribution state of the reference pixels based on the detected boundary;

a range mode determining circuit for determining a maximum value and a minimum value of the plurality of reference pixels, determining a difference value between the maximum value and the minimum value, and detecting a second pixel distribution state of the reference pixels based on the difference value;

an adaptive predictor for calculating a prediction value and prediction rank information of the target decoding pixel by performing calculations based on a function corresponding to the first pixel distribution state detected by the boundary mode determining circuit, a function corresponding to the second pixel distribution state detected by the range mode determining circuit, and the plurality of reference pixels;

prediction difference calculating means for determining a difference value between the prediction value and the decoded pixel value;

a context generator for generating a context based on the first pixel distribution state detected by the boundary mode determining circuit, the second pixel distribution state detected by the range mode determining circuit, the difference value determined by the prediction difference calculating means, and the prediction rank information calculated by the adaptive predictor;

decoding mean for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

32. The decoding apparatus according to claim 31, further comprising:

a context generator for generating a context for decoding by referring to a degenerated result of the prediction rank by utilizing regularity of appearance of the prediction value.

33. An encoding apparatus comprising:

pixel output means for outputting a target encoding pixel and a plurality of reference pixels within a predetermined vicinity of the target encoding pixel;

a boundary mode determining circuit for determining a maximum value and a minimum value of the plurality of reference pixels, determining an average value of the maximum value and the minimum value, comparing respective reference pixel values with the average value to produce comparison results, detecting a boundary in the target encoding pixel and the reference pixels based on the comparison results, and detecting a pixel distribution state of the reference pixels based on the detected boundary;

an adaptive predictor for calculating a prediction value of the target encoding pixel by performing a calculation based on a function corresponding to the pixel distribution state detected by the boundary mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context, based on the pixel distribution state detected by the boundary mode determining circuit and the difference value determined by the prediction difference calculating means; and encoding means for encoding the multi-valued signal based on the context.

34. A decoding apparatus comprising:

pixel output means for outputting a plurality of reference pixels with a predetermined vicinity of a target decoding pixel prior to decoding the target decoding pixel, and for storing a decoded pixel value of the target decoding pixel;

a boundary mode determining circuit for determining a maximum value and a minimum value of the plurality of reference pixels, determining an average value of the maximum value and the minimum value, comparing the respective reference pixel values with the average value to produce comparison results, detecting a boundary in the target decoding pixel and the reference pixels based on the comparison results, and detecting a pixel distribution state of the reference pixels based on the detected boundary;

an adaptive predictor for calculating a prediction value of the target decoding pixel by performing a calculation based on a function corresponding to the pixel distribution state detected by the boundary mode determining circuit and the plurality of reference pixels;

prediction difference calculating means for determining a difference value between the prediction value and the decoded pixel value;

a context generator for generating a context based on the pixel distribution state detected by the boundary mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

35. An encoding apparatus comprising:

pixel output means for outputting a target encoding pixel and a plurality of reference pixels within a predetermined vicinity of the target encoding pixel;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value of the target encoding pixel by performing a calculation based on a function corresponding to the pixel distribution state detected by the range mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the range mode determining circuit and the difference value determined by the prediction difference calculating means; and encoding means for encoding the multi-valued signal based on the context.

36. The encoding apparatus according to claim 29, 33 or 35, wherein the multi-valued signal is a binary signal.

37. A scanner comprising the encoding apparatus according to any one of claims 1, 9, 29, 33 and 35.

38. An image database comprising the encoding apparatus according to any one of claims 1, 9, 29, 33 and 35.

39. An image server comprising the encoding apparatus according to any one of claims 1, 9, 29, 33 and 35.

40. A computer comprising the encoding apparatus according to any one of claims 1, 9, 29, 33 and 35.

41. A decoding apparatus comprising:

pixel output means for outputting a plurality of reference pixels within a predetermined vicinity of a target decoding pixel prior to decoding the target decoding pixel, and for storing a decoded pixel value of the target decoding pixel;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value of the target decoding pixel by performing a calculation based on a function corresponding to the pixel distribution state detected by the range mode determining circuit and the plurality of reference pixels;

prediction difference calculating means for determining a difference value between the prediction value and the decoded pixel value;

a context generator for generating a context based on the pixel distribution state detected by the range mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

42. The decoding apparatus according to any one of claims 4, 13, 31, 34 and 41, wherein the multi-valued signal is a binary signal.

43. A printer comprising the decoding apparatus according to any one of claims 4, 13, 31, 34 and 41.

44. An image client apparatus comprising the decoding apparatus according to any one of claims 4, 13, 31, 34 and 41.

45. An image viewer comprising the decoding apparatus according to any one of claims 4, 13, 31, 34 and 41.

46. A computer comprising the decoding apparatus according to any one of claims 4, 13, 31, 34 and 41.

47. An encoding and decoding apparatus comprising:

an encoding apparatus comprising:

pixel output means for outputting a target encoding pixel and a plurality of reference pixels within a predetermined vicinity thereof;

a boundary mode determining circuit for determining a maximum value and a minimum value of the plurality of reference pixels, determining an average value of the maximum value and the minimum value, comparing the respective reference pixel values with the average value to produce comparison results, detecting a boundary in the target encoding pixel and the reference pixels based on the comparison results, and detecting a first pixel distribution state of the reference pixels based on the detected boundary;

a range mode determining circuit for determining a maximum value and a minimum value of the plurality of reference pixels, determining a difference value between the maximum value and the minimum value, and detecting a second pixel distribution state of the reference pixels based on the difference value;

an adaptive predictor for calculating a prediction value and prediction rank information by performing calculations on the plurality of reference pixels based on a function corresponding to the first pixel distribution state detected by the boundary mode determining circuit, a function corresponding to the second pixel distribution state detected by the range mode determining circuit, and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the first pixel distribution state detected by the boundary mode determining circuit, the second pixel distribution state detected by the range mode determining circuit, the difference value determined by the prediction difference calculating means, and the prediction rank information calculated by the adaptive predictor; and encoding means for encoding the multi-valued signal based on the context; and a decoding apparatus comprising:

pixel output means for outputting a plurality of reference pixels prior to decoding, and for storing a decoded pixel value;

a boundary mode determining circuit for determining a maximum value and a minimum value of the plurality of reference pixels, determining an average value of the maximum value and the minimum value, comparing the respective reference pixel values with the average value to produce comparison results, detecting a boundary in a target decoding pixel and the reference pixels based on the comparison results, and detecting a first pixel distribution state of the reference pixels based on the detected boundary;

a range mode determining circuit for determining a maximum value and a minimum value of the plurality of reference pixels, determining a difference value between the maximum value and the minimum value, and detecting a second pixel distribution state of the reference pixels based on the difference value;

an adaptive predictor for calculating a prediction value and prediction rank information by performing calculations based on a function corresponding to the first pixel distribution state detected by the boundary mode determining circuit, a function corresponding to the second pixel distribution state detected by the range mode determining circuit, and the plurality of reference pixels;

prediction difference calculating means for determining a difference value between the prediction value and the decoded pixel value;

a context generator for generating a context based on the first pixel distribution state detected by the boundary mode determining circuit, the second pixel distribution state detected by the range mode determining circuit, the difference value determined by the prediction difference calculating means, and the prediction rank information calculated by the adaptive predictor;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

48. The encoding and decoding apparatus of claim 47, wherein:

the context generator of the encoding apparatus generates a context for encoding by referring to a degenerated result of the prediction rank calculated by the adaptive predictor of the encoding apparatus by utilizing regularity of appearance of the prediction value calculated by the adaptive predictor of the encoding apparatus; and the context generator of the decoding apparatus generates a context for decoding by referring to a degenerated result of the prediction rank calculated by the adaptive predictor of the decoding apparatus by utilizing regularity of appearance of the prediction value calculated by the adaptive predictor of the decoding apparatus.

49. An encoding and decoding apparatus comprising:

an encoding apparatus comprising:

pixel output means for outputting a target encoding pixel and a plurality of reference pixels within a predetermined vicinity thereof;

a boundary mode determining circuit for determining a maximum value and a minimum value of the plurality of reference pixels, determining an average value of the maximum value and the minimum value, comparing respective reference pixel values with the average value to produce comparison results, detecting a boundary in the target encoding pixel and the reference pixels based on the comparison results, and detecting a pixel distribution state of the reference pixels based on the detected boundary;

an adaptive predictor for calculating a prediction value by performing a calculation based on a function corresponding to the pixel distribution state detected by the boundary mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the boundary mode determining circuit and the difference value determined by the prediction difference calculating means; and encoding means for encoding the multi-valued signal based on the context; and a decoding apparatus comprising:

pixel output means for outputting a plurality of reference pixels prior to decoding, and for storing a decoded pixel value;

a boundary mode determining circuit for determining a maximum value and a minimum value of the plurality of reference pixels, determining an average value of the maximum value and the minimum value, comparing the respective reference pixel values with the average value to produce comparison results, detecting a boundary in a target decoding pixel and the reference pixels based on the comparison results, and detecting a pixel distribution state of the reference pixels based on the detected boundary;

an adaptive predictor for calculating a prediction value by performing a calculation based on a function corresponding to the pixel distribution state detected by the boundary mode determining circuit and the plurality of reference pixels;

prediction difference calculating means for determining a difference value between the prediction value and the decoded pixel value;

a context generator for generating a context based on the pixel distribution state detected by the boundary mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

50. An encoding and decoding apparatus comprising:

an encoding apparatus comprising:

pixel output means for outputting a target encoding pixel and a plurality of reference pixels within a predetermined vicinity thereof;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value by performing a calculation based on a function corresponding to the pixel distribution state detected by the range mode determining circuit and the plurality of reference pixels;

prediction difference calculating means for determining a difference value between the prediction value and a value of the target encoding pixel;

a prediction coincidence determining unit for comparing the prediction value and the target encoding pixel value, and outputting a comparison result as a multi-valued signal;

a context generator for generating a context based on the pixel distribution state detected by the range mode determining circuit and the difference value determined by the prediction difference calculating means; and encoding means for encoding the multi-valued signal based on the context; and a decoding apparatus comprising:

pixel output means for outputting a plurality of reference pixels prior to decoding, and for storing a decoded pixel value;

a range mode determining circuit for determining a maximum value and a minimum value of the plurality of reference pixels, determining a difference value between the maximum value and the minimum value, and detecting a pixel distribution state of the reference pixels based on the difference value;

an adaptive predictor for calculating a prediction value by performing a calculation based on a function corresponding to the pixel distribution state detected by the range mode determining circuit and the plurality of reference pixels;

prediction difference calculating means for determining a difference value between the prediction value and the decoded pixel value;

a context generator for generating a context based on the pixel distribution state detected by the range mode determining circuit and the difference value determined by the prediction difference calculating means;

decoding means for decoding an encoded signal based on the generated context, and outputting a multi-valued signal based on a decoded signal; and decoding control means for causing the pixel output means to store the prediction value of the adaptive predictor as the decoded pixel value when detecting a signal indicating coincidence from the multi-valued signal of the decoding means.

51. An encoding method comprising:

outputting a target encoding pixel and a plurality of reference pixels within a predetermined vicinity thereof;

determining pixel values of the reference pixels, and detecting a pixel distribution state of the reference pixels based on the determined pixel values;

determining a prediction value from the reference pixels according to a process based on the detected pixel distribution state;

comparing the prediction value and a value of the target encoding pixel, and outputting a comparison result;

generating a context for the target encoding pixel; and encoding the comparison result of the comparing means based on the generated context;

wherein the comparison result is a multi-valued binary signal.

52. An encoding method, comprising:

outputting a target encoding pixel and a plurality of reference pixels within a predetermined vicinity thereof;

determining pixel values of the reference pixels, and detecting a pixel distribution state of the reference pixels based on the determined pixel values;

determining a prediction value by performing a calculation on the reference pixels, wherein the calculation is based upon the detected pixel distribution state;

comparing the prediction value and a value of the target encoding pixel, and outputting a comparison result;

generating a context based on the pixel distribution state; and encoding the comparison result of the comparing means based on the generated context;
wherein the comparison result is a multi-valued binary signal.

* * * * *